United States Patent [19]

Hutner

[11] 4,016,549
[45] Apr. 5, 1977

[54] SCANNING AND SELECTION METHODS AND APPARATUS THEREFOR

[75] Inventor: Mark A. Hutner, Glenview, Ill.

[73] Assignee: Xerox Corporation, New York, N.Y.

[22] Filed: Feb. 3, 1976

[21] Appl. No.: 654,899

Related U.S. Application Data

[62] Division of Ser. No. 409,679, Oct. 23, 1975, Pat. No. 3,975,715.

[52] U.S. Cl. .......................................... 340/172.5
[51] Int. Cl.[2] ........................................ G06F 3/12
[58] Field of Search ................ 340/172.5; 445/1; 235/61.9; 355/14

[56] References Cited

UNITED STATES PATENTS

| | | | |
|---|---|---|---|
| 3,379,106 | 4/1968 | Hewes et al. | 355/14 |
| 3,815,094 | 6/1974 | Smith | 340/172.5 |
| 3,834,805 | 9/1974 | Griffin, Jr. | 355/14 |
| 3,860,793 | 1/1975 | Roe et al. | 235/61.9 R |
| 3,940,210 | 2/1976 | Donohue | 355/14 |

Primary Examiner—Harvey E. Springborn
Attorney, Agent, or Firm—Bacon & Thomas

[57] ABSTRACT

Scanning and selection methods and apparatus as well as an electrophotographic printing system employing such scanning and selection apparatus are provided in accordance with the teachings of the present invention. In an exemplary embodiment of the invention a plurality of coded data records containing selection information and a plurality of coded data records to be classified for selection purposes are scanned by code sensing devices. Code information from each of the plurality of coded data records containing selection information is loaded in sequence into memory apparatus to store therein the selection conditions to be imposed upon the plurality of coded data records to be classified for selection purposes. The selection information obtained being directed to a plurality of selection considerations and such sequence being arranged in a manner so that each of the plurality of selection considerations is defined in different areas of the memory apparatus. Subsequently code information from each of the plurality of coded data records to be classified is loaded in comparing apparatus for comparison with the selection conditions to be imposed as stored in the memory apparatus, the comparing apparatus acting to impose each of the plurality of selection considerations upon code information from each of the plurality of coded data records to be classified and provide a classification signal for each of the plurality of coded data records to be classified for selection purposes based upon all of the selection considerations imposed.

4 Claims, 8 Drawing Figures

WRITE / READ
MEMORY ADDRESS
&
SELECTION CONTROL

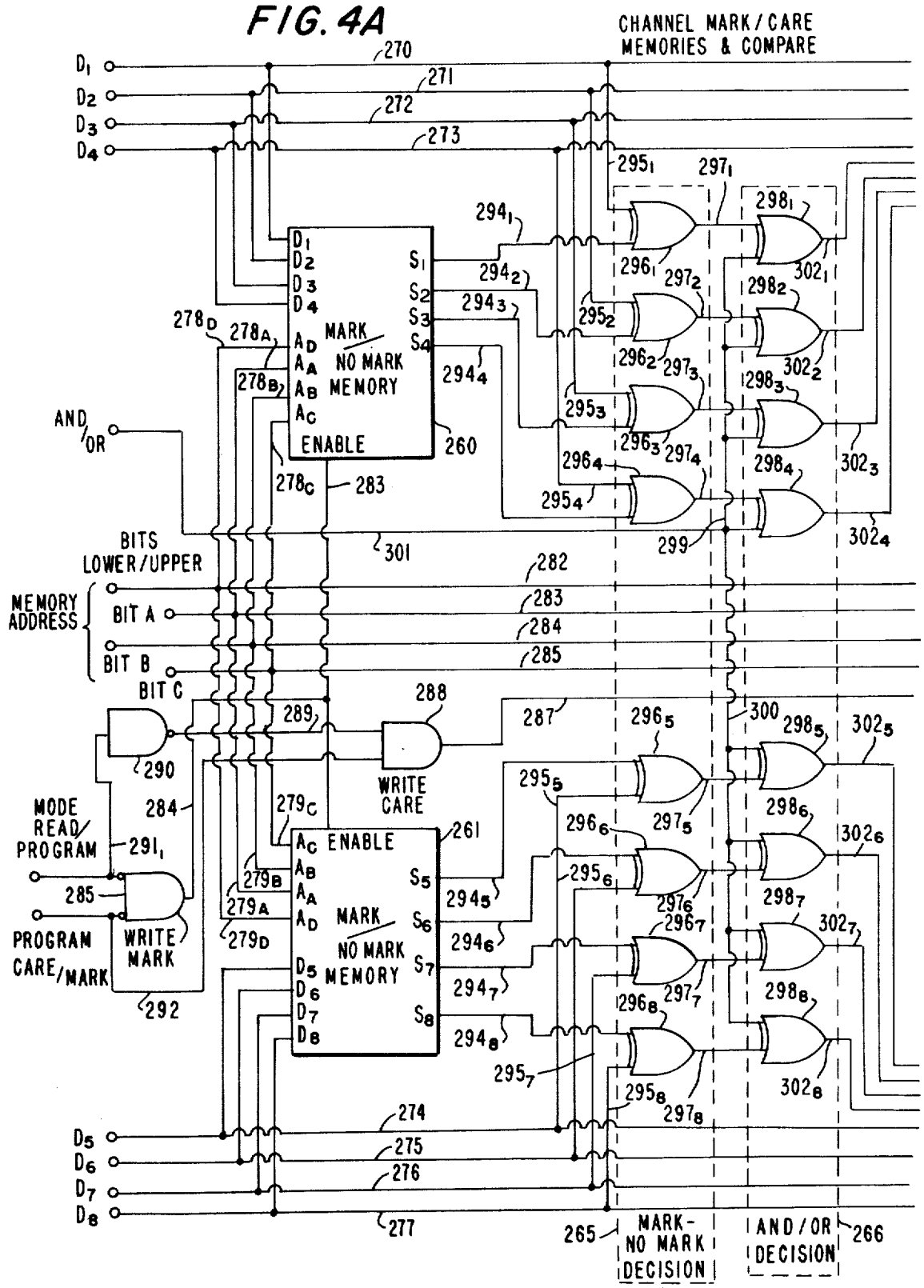

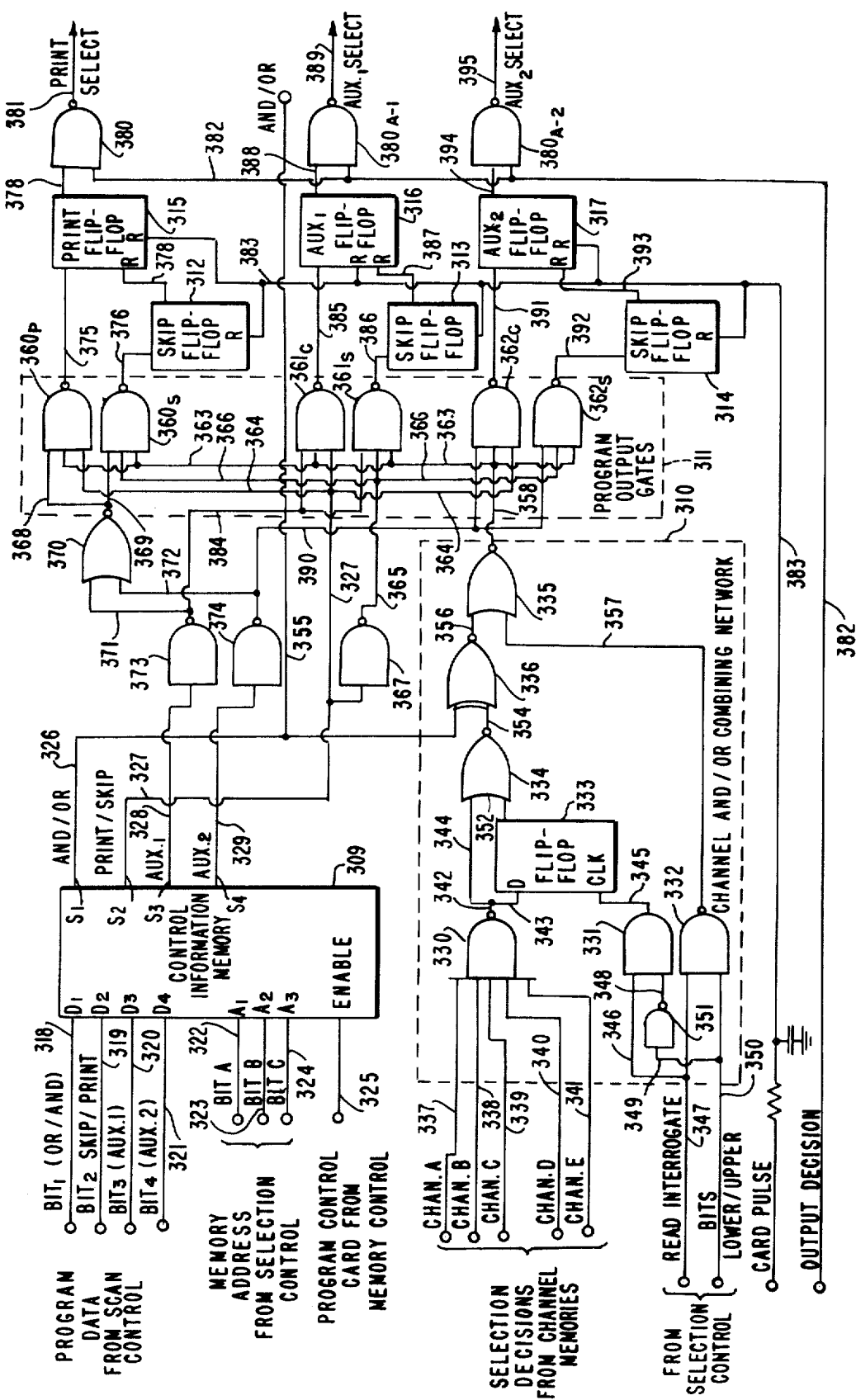
FIG. 5 CONTROL MEMORY & DECISION

SCANNING AND SELECTION METHODS AND APPARATUS THEREFOR

This is a division, of application Ser. No. 409,679, filed Oct. 23, 1975, now U.S. Pat. No. 3,975,715.

This invention relates to scanning and selection techniques and more particularly to scanning and selection systems wherein desired conditions for selection may be programmed and a plurality of coded records selectively printed, counted, accessed and/or omitted whenever the coded conditions of any of such plurality of coded records meet the desired selection conditions established.

In U.S. Pat. No. 3,700,324, which issued on Oct. 24, 1972 to Mark A. Hutner et al. and is assigned to the Xerox Corporation, whose disclosure is specifically incorporated by reference herein, there is disclosed an electrophotographic printing system wherein a plurality of coded data records containing document information are scanned by code sensing means and presented to electrophotographic imaging means whereat the document information from each data record is imaged upon a photosensitive member and processed according to continuous electrophotographic techniques for subsequent presentation to a transfer station. Code information from each of the plurality of data records scanned, as provided by the code sensing devices, is logically processed in accordance with selected conditions for printing which may be established and print and skip information is generated in sequence therefrom. The sequence of print and skip information is propagated through logic circuitry at a rate corresponding to the rate at which document information from each of the plurality of coded data records is electrophotographically processed in such manner that each bit of information in the print and skip information sequence is present at an output of the logic circuitry at a time when document information from the data record associated therewith is presented to the transfer station. Additionally such bit information in the print and skip information sequence may be employed to control the energization of various stations within the continuous electrophotographic processing equipment.

At the transfer station, a transfer member which is normally maintained in a position displaced from the photosensitive member is continuously charged by an ion charging device and a specially adapted transfer member assembly is provided to selectively bring the transfer member from its displaced position into a transfer relationship with the photosensitive member in response to the presence at a predetermined output of the logic circuitry of a bit in the sequence representing a print signal. Thus, in this manner, the electrophotographic printing system disclosed in U.S. Pat. No. 3,700,324 allows a plurality of coded data records containing document information to be scanned while the document information present thereon is processed according to highly efficient electrophotographic processing techniques; however, only the document information in the form of a toner image from coded data records having code information meeting the selected conditions for printing established are transferred to a transfer member. Therefore, while highly efficient continuous electrophotographic processing techniques are used throughout the system set forth, printing takes place on the basis of a selective transfer of document information from data records coded in accordance with the selected criteria established.

The electrophotographic printing systems disclosed in conjunction with U.S. Pat. No. 3,700,324 are highly advantageous because coded data records may take any convenient form such as data cards, microfiche or any other suitable record format capable of being coded and having suitable document information such as address data, business data or employment information provided thereon while the selective transfer operation disclosed employs corona charging techniques and hence produces high quality toner images on a transfer member without being adversely affected by humidity conditions or toner clogging problems. Furthermore, the scanning and selection circuitry set forth as a part of the electrophotographic printing system disclosed in U.S. Pat. No. 3,700,324 provides a wide ambit of selectivity wherein a plurality of coded indicia on each coded record may be scanned and a selection of individual coded data records made for the purpose of printing or skipping on the basis of the coded condition of all or some of the coded indicia scanned. For instance, in one embodiment of the scanning and selection circuit disclosed in conjunction with FIG. 3 of the exemplary electrophotographic printing systems described in U.S. Pat. No. 3,700,324, data cards having address information suitable for the printing of envelope address labels or the like are provided with a physical format that includes a row of identical bit locations aligned transversely to the direction of card travel for pre-coding such cards in accordance with a predetermined code applied to the data card with the address information. Although 12 such bit locations are provided, only 3 selected bit locations are optically scanned for mark and no-mark information when the data card is processed. The exemplary scanning and selection circuitry illustrated in FIG. 3 of U.S. Pat. No. 3,700,324 allows the operator to establish a plurality of print and/or skip conditions based upon the relationship of the coded condition of the indicia scanned to a plurality of sets of conditions set into the system and such relationship may be developed as a function of OR and/or AND operations. Thus, in the exemplary scanning and selection circuit set forth, two AND and one OR module are disclosed and the condition of each bit location scanned is applied to each module. Each module includes circuitry for designating a "Mark", "No-Mark" or "Don't Care" condition for each of the three bit locations of each data card scanned as well as appropriate circuitry for achieving the AND or OR function associated with that module. Furthermore, the operator may also specify that when the input conditions of a data card being scanned compare favorably through an ANDing or ORing operation with the bit location conditions established at a given module, an output designating a "Print" (select) or "Skip" operation is to be produced so that the document information in the data card being read in either printed or skipped and because a plurality of selection modules are employed a skip output from one selection module is given priority over print outputs from other modules whereupon document information associated with a given data card is printed if one or more print signals are obtained and no skip signal is produced, while document information from a data card is skipped anytime a skip output is provided by one of the selection modules. In addition, the logical arrangement and symmetry of the scanning and selection circuitry disclosed in U.S. Pat. No. 3,700,324 is such that additional bit location scanning apparatus and AND and/or OR selection modules may readily be incorporated into the exemplary electrophotographic printing system to meet specialized requirements or applications without requiring a substantial modification of the system disclosed or the addition of a disproportionate amount of additional circuitry. Thus, it will be appreciated by those of ordinary skill in the art that the exemplary electrophotographic printing systems disclosed in U.S. Pat. No. 3,700,324 provide highly flexible selective printing systems enabling document information contained on coded records to be selectively printed wherein selection is automatically achieved and carried out on the basis of wide range of selection conditions which may be specified by an operator while high quality selective printing is assured due to the continuous electrophotographic printing techniques employed. Furthermore, the logical organization and symmetry of the scanning and selection circuitry disclosed in conjunction with FIG. 3 of U.S. Pat. No. 3,700,324 is sufficiently flexible to assure that the selection conditions established by an operator may be simply and readily expanded or reduced to meet specific or specialized applications or requirements without the addition of a disproportionate amount of circuitry or the insertion of undue complexity in the scanning and selection circuitry employed.

Although the logical organization and symmetry of the scanning and selection circuitry disclosed in conjunction with FIG. 3 of U.S. Pat. No. 3,700,324 is highly flexible and hence can be readily expanded to meet specific requirements or applications, it will be appreciated by those of ordinary skill in the art that the scanning and selection circuitry described contemplates, at its threshold design level, the scanning of a relatively few bit locations on data records to be scanned for selective printing purposes. Thus, even though expansion of the scanning and selection circuitry disclosed may be readily accomplished in accordance with the teachings of the patent to accommodate a need for a scanning and processing of additional bit information from data records from which selective printing is to occur, it will be recognized that expansions of the scanning and selection circuitry to accommodate a substantial number of bits would result in an uneconomical design due to the cascaded network arrangement wherein selection modules are arranged in parallel and receive and process all bit information read from a data record in parallel. Therefore, while expansion of the scanning and selection circuitry disclosed in U.S. Pat. No. 3,700,324 is clearly practical to a point to accommodate a requirement for the scanning and processing of additional bit information; it will be readily appreciated that should a need arise to scan and process a larger amount of bit information such as 16 or even 80 bits, the expansion of the scanning and selection circuitry disclosed in association with FIG. 3 of U.S. Pat. No. 3,700,324 would be impractical as unduly complex. Similarly, the symmetry and mode of organization of the scanning and selection circuitry disclosed in U.S. Pat. No. 3,700,324 is such that added selectability may readily be provided to an operator by the cascading of additional AND and/or OR selection modules in the manner plainly described in the patent; however, as will be readily recognized, this technique is only practical to a point for many of the same reasons outlined above in connection with expansions to accommodate the scanning and processing of additional bit information. Furthermore, as will be readly appreciated by those of ordinary skill in the art, any alteration of the scanning and selection circuitry illustrated in FIG. 3 of U.S. Pat. No. 3,700,324 to accommodate a scanning and processing of a substantial amount of additional bit information would usually be attended by a desire to increase selectability and hence act to compound the impracticability associated with substantial expansions in the scanning and selection circuitry depicted in FIG. 3 of U.S. Pat. No. 3,700,324.

A further problem which attaches to substantial expansions in the capability of the scanning and selection circuitry illustrated in FIG. 3 of U.S. Pat. No. 3,700,324 is that while the Mark, No Mark, Don't Care (OFF), Print (SELECT) and/or skip settings required for each selection module are quite simply achieved by an operator together with a choice of appropriate AND and/or OR selection modules to establish desired selective printing when the amount of bit information to be scanned and the selectability provided are within the realm contemplated in the patent, this is quite clearly not the case for substantial expansions in the scanning and selection circuitry considered. This view is taken, as will be readily appreciated by those of ordinary skill in the art, because the choice of appropriate AND and/or OR selection modules together with the imposition of appropriate Mark, No Mark, Don't Care, Print and Skip settings can become quite complex upon a substantial expansion of the scanning and selection circuit illustrated in FIG. 3 of U.S. Pat. No. 3,700,324 and is often beyond the skill of an operator who is not relatively sophisticated in programming techniques. Furthermore, when the number of Mark, No Mark, Don't Care, Print and Skip settings which must made by an operator of an electrophotographic printing system is substantially increased, the probability of error in such settings is substantially increased and it will be appreciated that erroneous settings in the selection conditions imposed can be quite costly since such errors would not ordinarily be discovered until a selective printing operation has been completed or probably, in the case of the selective printing of the address labels considered in U.S. Pat. No. 3,700,324, an erroneous mailing initiated. Accordingly, for cases where a substantial increase in the bit scanning and processing capability and/or selectability in electrophotographic printing apparatus of the kind considered in U.S. Pat. No., 3,700,324 is required, it would be more desirable if the modes through which selection was achieved as well as the coded bit format appropriate to each mode of selection employed were established by a party skilled in the necessary program arts and once the selection modes and code bit format appropriate therefor ascertained and checked such modes of selection and associated bit format specification, loaded into the electrophotographic printing apparatus through a programming technique whose nature tends to preclude operator injected error.

Therefore, it is an object of the present invention to provide improved electrophotographic printing systems which enable high speed selective printing of document information present on coded data records which may take any conventional format.

It is a further object of the present invention to provide programmable selection apparatus and methods of selection therefor wherein a wide ambit of selection conditions may be loaded on coded selection records and thereafter coded data records, whose format resembles said coded selection records, classified for the purposes of selection in accordance with selection conditions imposed by the loading of said coded selection records.

It is an additional object of the present invention to provide improved scanning and selection apparatus wherein coded data records containing substantial bit information may be employed to establish a plurality of selection conditions and similar coded data records containing substantial bit information scanned and selected according to the plurality of selection conditions established.

It is another object of the present invention to provide improved scanning and selection apparatus for scanning coded bit information arranged in a column format and programming a plurality of memories therefrom and thereafter scanning coded bit information arranged on coded data records to be selected and comparing the coded information obtained with the bit content stored in said memories to obtain selection information.

It is a further object of the present invention to provide improved selection apparatus for comparing the bit content of a plurality of coded records with the stored contents of a plurality of memories, each of said plurality of memories storing different aspects of selection conditions imposed so that highly flexible and versatile conditions for selection may be established and a substantial number of bits may be compared to one or more sets of selection conditions while highly efficient circuit organization is preserved and untoward circuit duplication avoided.

It is another object of the present invention to provide improved scanning and selection apparatus for scanning a plurality of coded record cards and comparing the coded contents thereof with selection requirements stored in a plurality of memories, one of said plurality of memories storing at least an appropriate bit content for each bit to be scanned on said coded record card, another of said plurality of memories storing an indication as to whether a given condition for each bit to be scanned is to be considered in a given selection routine and another of said plurality of memories storing an indication as to whether the selection routine initiated is to be conducted according to an AND or an OR logical operation.

It is an additional object of the present invention to provide improved selection apparatus capable of logically processing selection information of a differing nature according to whether an AND or OR operation is in progress and producing a uniform select or inhibit signal regardless of whether an AND or an OR operation is in progress.

Other objects and advantages of the present invention will become clear from the following detailed description of an exemplary embodiment thereof, and the novel features will be particularly pointed out in conjunction with the claims appended hereto.

The improved scanning and selection apparatus to be set forth as one aspect of the instant invention may be incorporated into the electrophotographic printing systems disclosed in U.S. Pat. No. 3,700,324 as an alternative to the scanning and selection circuitry disclosed in conjunction with FIG. 3 thereof to yield a programmable, selective electrophotographic printing system capable of scanning and performing selective printing operations on coded records having a substantial amount of bit information employed for coding. In addition, such improved scanning and selection apparatus may be employed per se in sorter or other record processing configurations where appropriate outputs therefrom may be relied upon to actuate sorting deflectors or the like. However, as the novel combination yielded by the substitution of this apparatus for the scanning and selection apparatus illustrated in FIG. 3 of U.S. Pat. No. 3,700,324 is viewed as plainly illustrating a prime example of the high degree of utility thereof, the disclosure of U.S. Pat. No. 3,700,324 is specifically incorporated by reference herein and this specification shall proceed, for the exemplary embodiment disclosed, as if such scanning and selection apparatus was employed in electrophotographic printing systems of the type disclosed in U.S. Pat. No. 3,700,324. Thus, although the instant specification shall no disclose in specie the record feeding apparatus, the electrophotographic processing apparatus, the selective transfer apparatus or the machine control apparatus described in detail in U.S. Pat. No. 3,700,324; it will be appreciated that the scanning and selection apparatus disclosed herein may be directly substituted for the scanning and selection circuit depicted in FIG. 3 of the patent and acts to provide similar signals to the remaining portions of the apparatus disclosed therein or to obvious alternatives therefor in a manner which will be apparent to those of ordinary skill in the art. Similarly, as will also be apparent to those or ordinary skill in the art, although any coded record capable of containing code information for classification purposes and document information for selective printing purposes may be employed in conjunction with the instant invention, the exemplary embodiment disclosed herein shall be described as if coded data cards, containing label information or the like, were employed as in the exemplary case set forth in U.S. Pat. No. 3,700,324. Therefore, it will be appreciated that although the scanning and selection apparatus disclosed herein admits of a plurality of applications a principal application thereof which yields novel combinations is a modification of the electrophotographic printing systems disclosed in U.S. Pat. No. 3,700,324.

In accordance with the teachings of the present invention, scanning and selection methods and apparatus therefor, as well as an electrophotographic printing system employing such scanning and selection apparatus are provided wherein a plurality of coded data records containing selection information and a plurality of coded data records to be classified for selection purposes are scanned by code sensing means; code information from each of said plurality of coded data records containing selection information is loaded in sequence into memory means to store therein selection conditions to be imposed upon said plurality of coded data records to be classified for selection purposes, said selection information being directed to a plurality of selection considerations and said sequence being arranged in such manner that each of said plurality of selection consideration is defined in different areas of said memory means; and subsequently code information from each of said plurality of coded data records to be classified is loaded into comparing means for comparison with selection conditions to be imposed as stored in said memory means, said comparing means acting to impose each of said plurality of selection considerations upon said code information from each of said plurality of coded data records to be classified and provide a classification signal for each of said plurality of coded data records to be classified for selection purposes based upon all of the selection considerations imposed.

The invention will be more clearly understood by reference to the following detailed description of an exemplary embodiment thereof in conjunction with the accompanying drawings in which:

FIGS. 4A and 4B show in combination, exemplary Mark/Care memory and comparison apparatus suitable for the embodiment of the scanning and selection apparatus illustrated in the generalized block diagram of FIG. 1; and FIG. 5 depicts exemplary control memory and decision apparatus suitable for embodiment of the scanning and selection apparatus illustrated in the generalized block diagram of FIG. 1.

Each of FIGS. 2A and 2B, 3A and 3B and 4A and 4B are adapted to be interconnected with the A figure on the left and the B figure on the right to fully illustrate the exemplary apparatus set forth. Therefore, this assembly by a reader for viewing purposes is assumed and these figures are referred to as FIGS. 2, 3 and 4 hereinafter.

Figure 1:
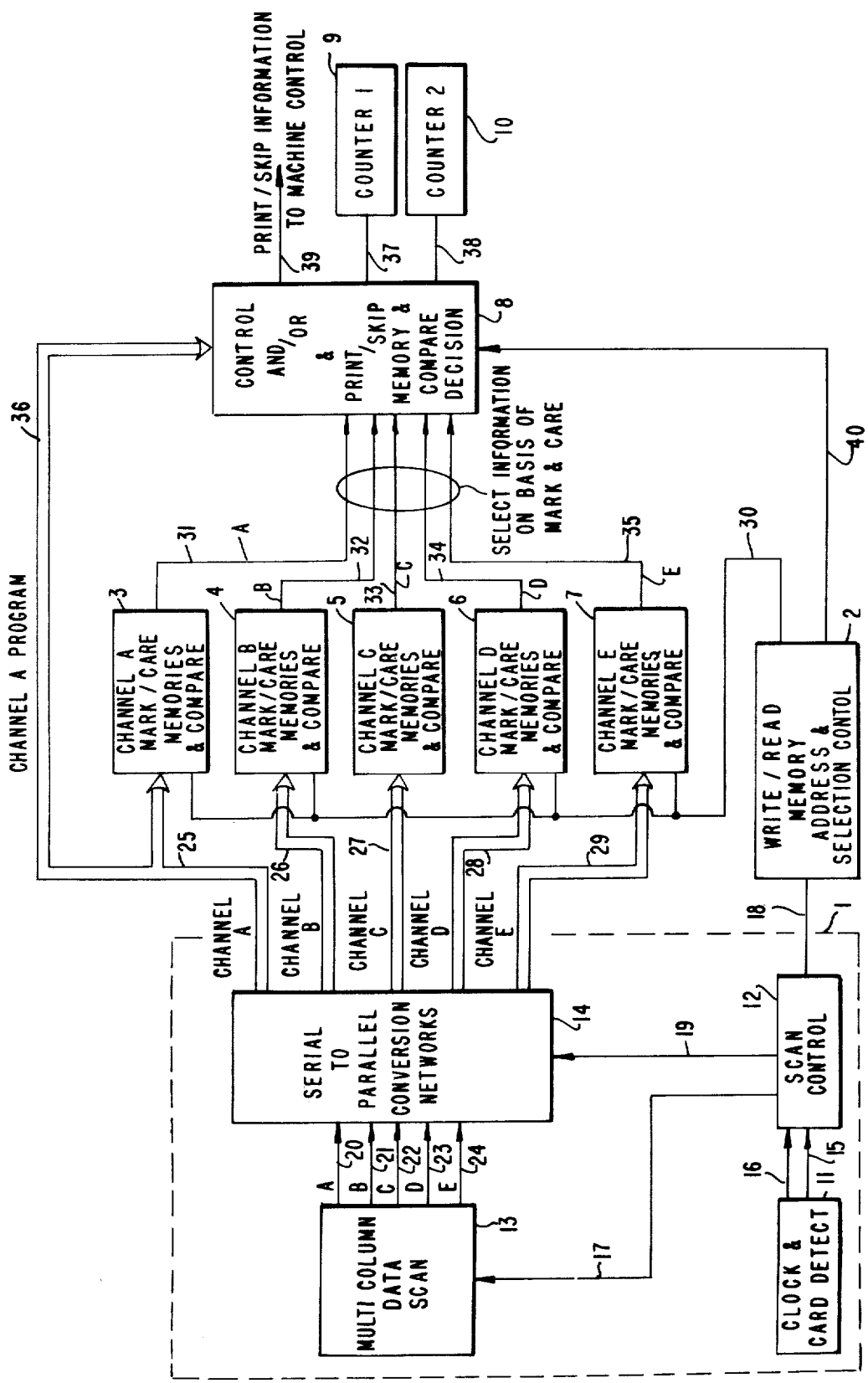
FIG. 1 is a generalized block diagram schematically illustrating an exemplary embodiment of scanning and selection methods and apparatus in accordance with the teachings of the present invention.
Figure 2A:
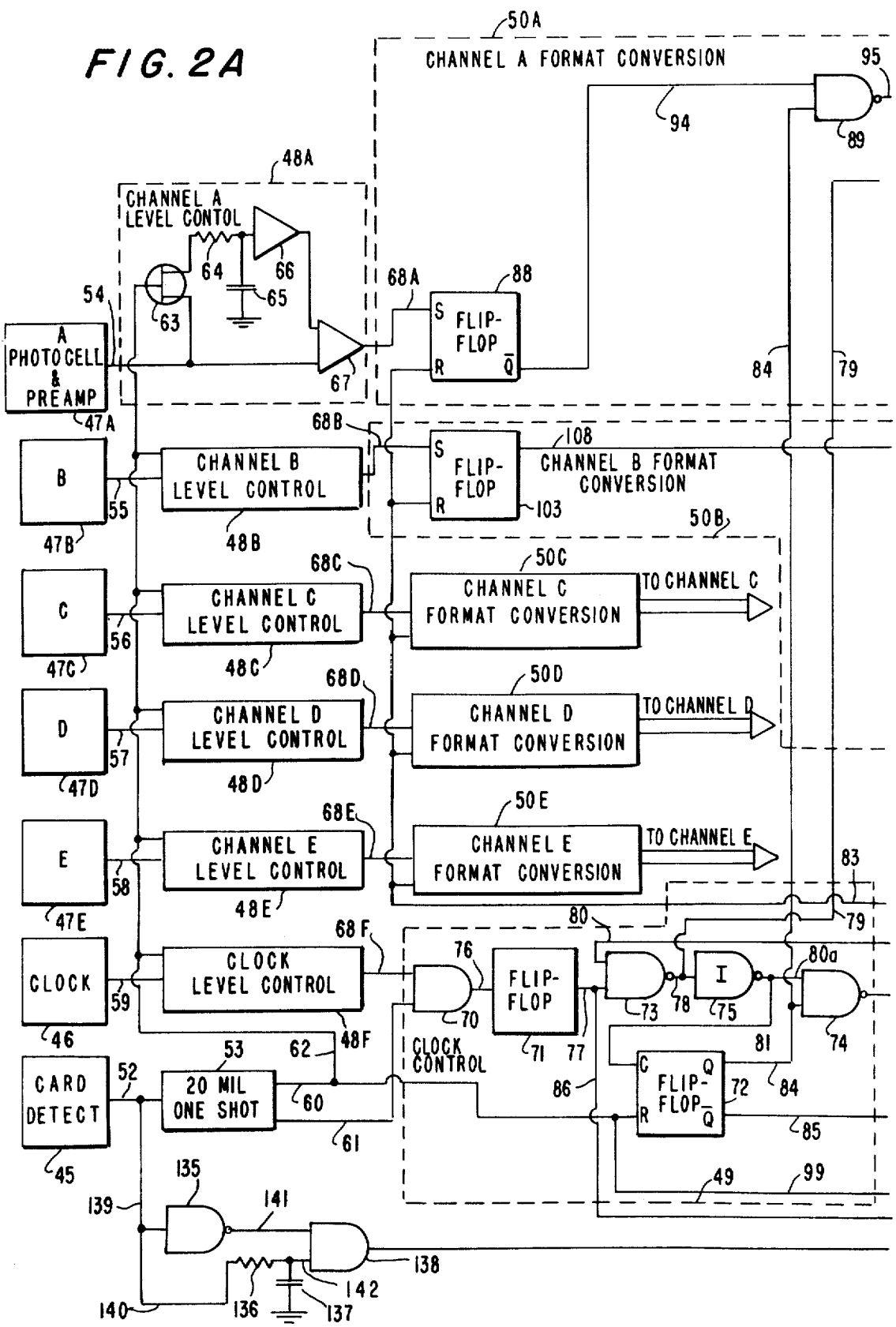
FIGS. 2A and 2B illustrate, in combination, exemplary scanning, scan control and data conversion apparatus suitable for the instant embodiment of the scanning and selection apparatus depicted in the generalized block diagram of FIG. 1.
Figure 2B:
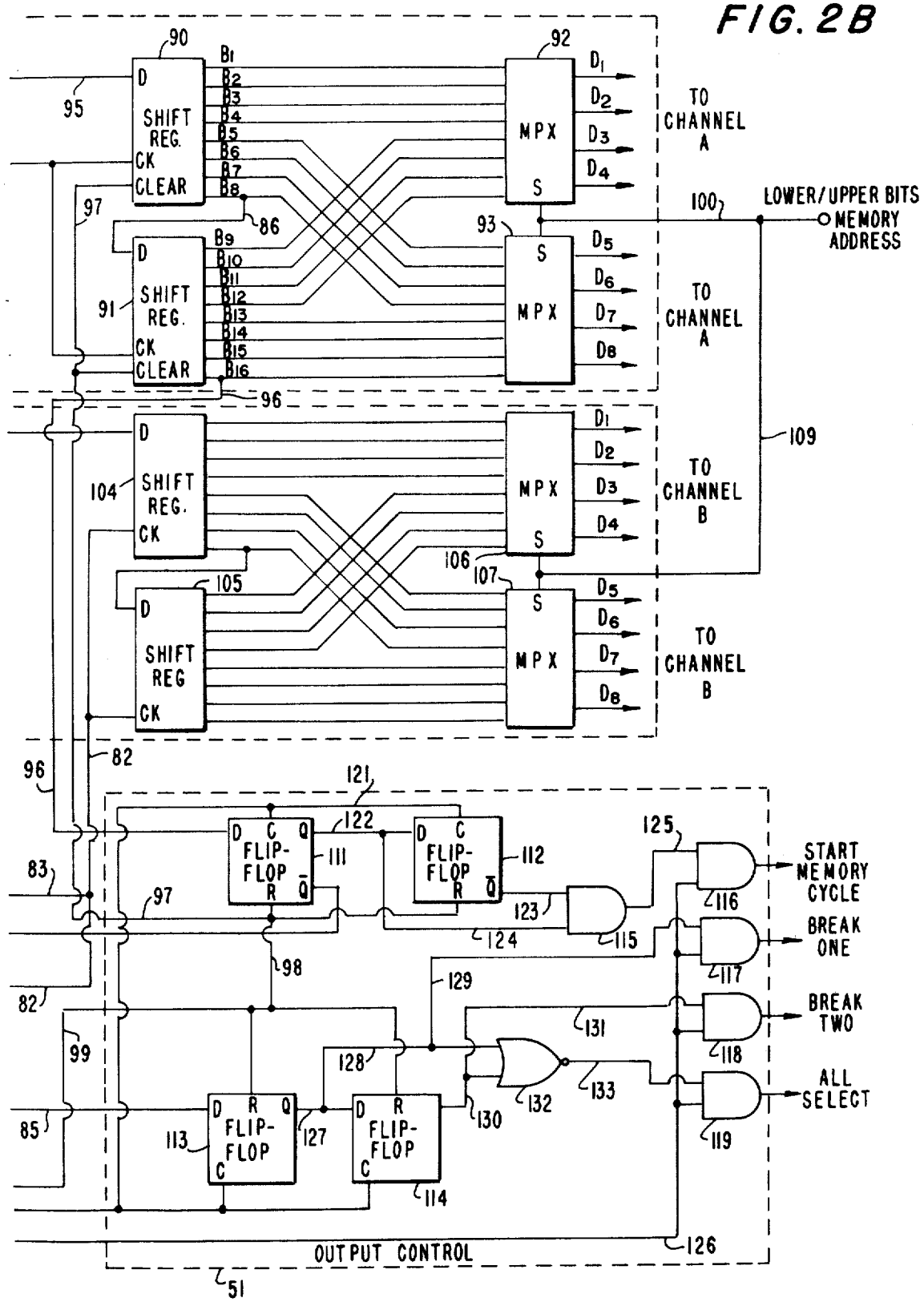
Figure 3A:
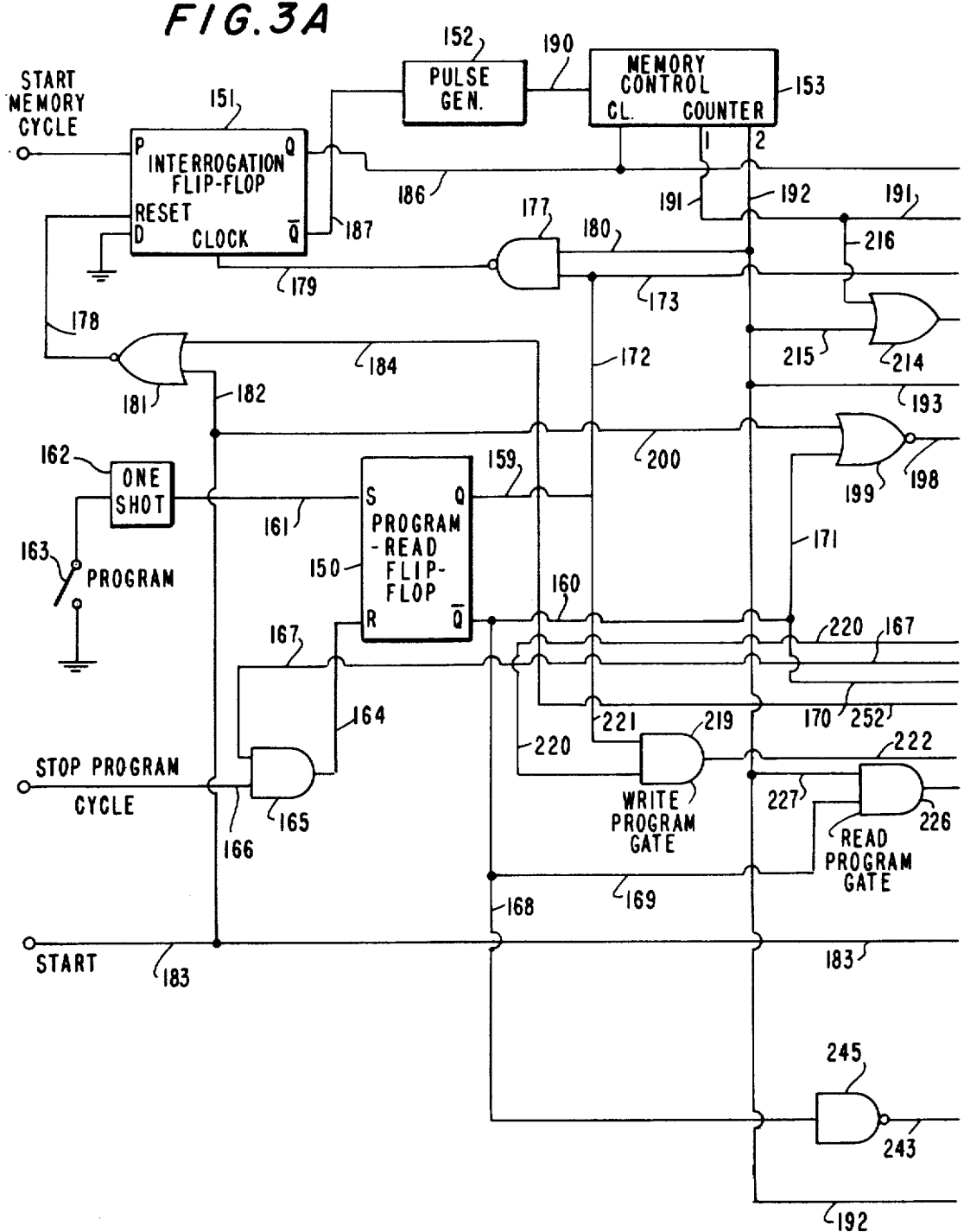
FIGS. 3A and 3B depict, in combination, exemplary memory address and selection apparatus suitable for the embodiment of the scanning and selection apparatus illustrated in the generalized block diagram of FIG. 1.
Figure 3B:
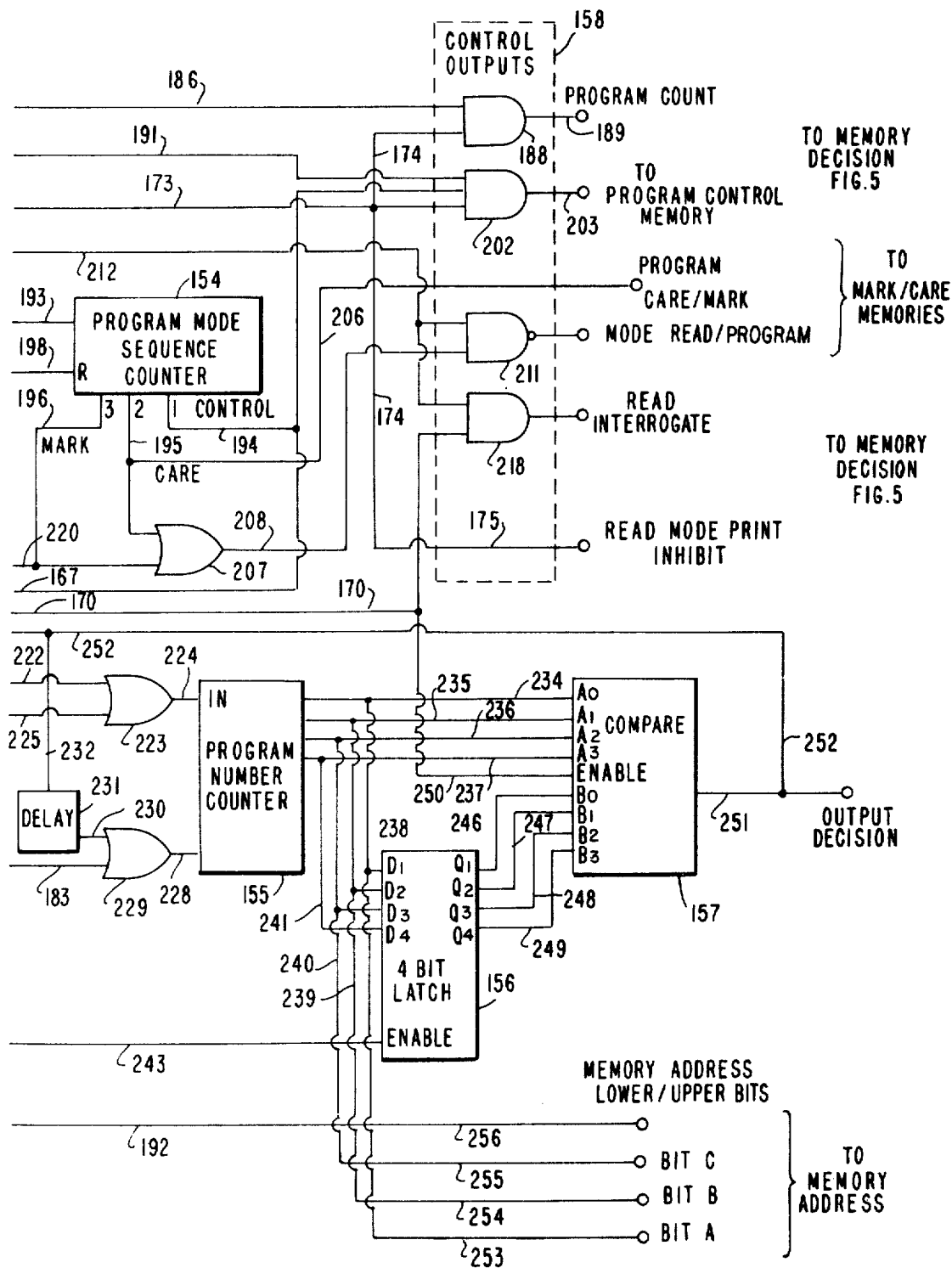
Figure 4B:
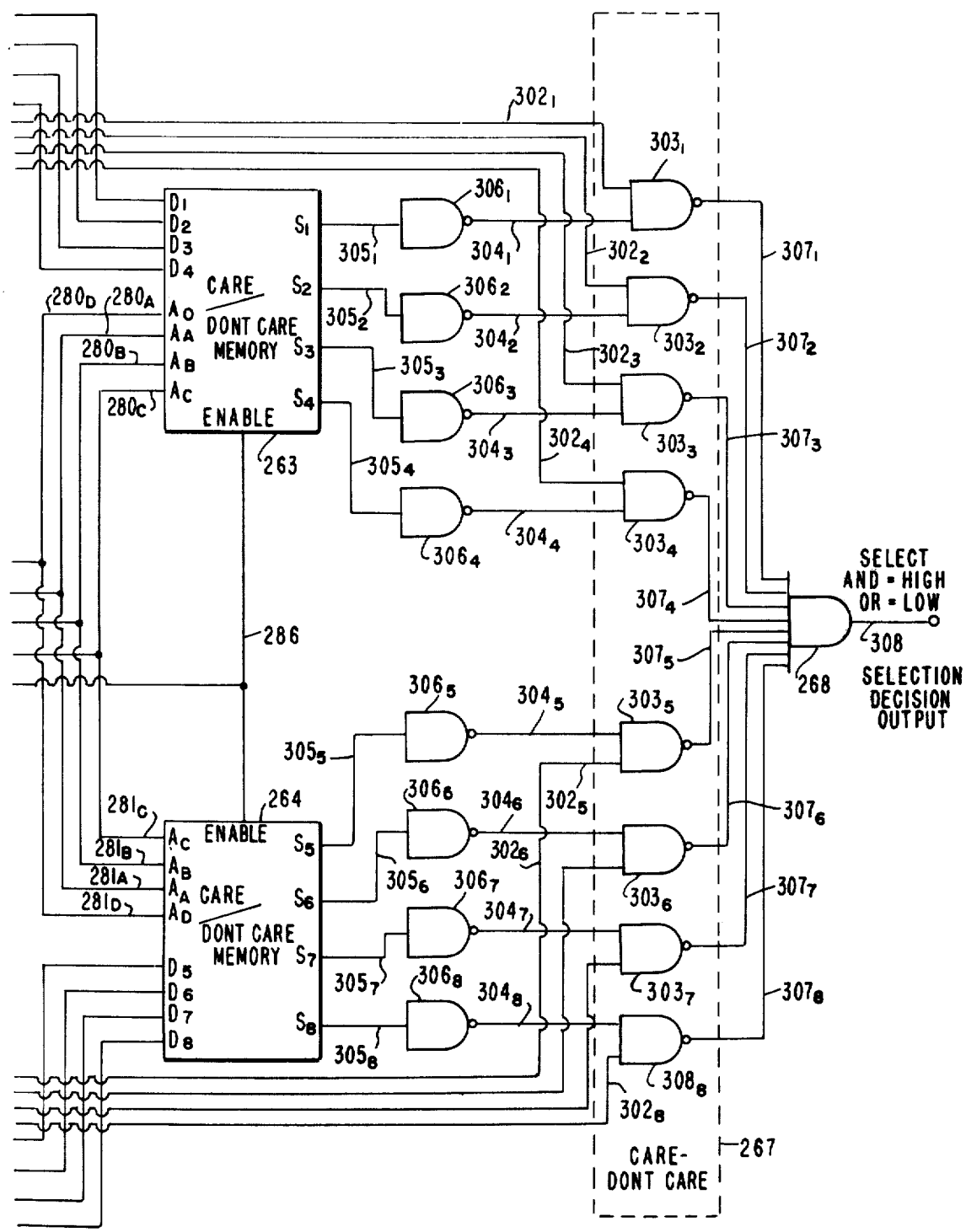

Referring now to the drawings and more particularly to FIG. 1 thereof, there is shown a generalized block diagram schematically illustrating an exemplary embodiment of the scanning and selection methods and apparatus according to the teachings of the present invention. As will be recalled, the instant invention is set forth in the exemplary embodiment considered herein as if the same were to be incorporated within the electrophotographic printing systems disclosed in U.S. Pat. No. 3,700,324. Therefore, prior to a description of the exemplary embodiment of the scanning and selection methods and apparatus depicted in FIG. 1, a brief description of the electrophotographic printing systems disclosed in U.S. Pat. No. 3,700,324 is considered appropriate to direct the reader's attention to the nature of the subject matter in which the exemplary embodiment of this invention is to be incorporated. Briefly, the electrophotographic printing systems disclosed in U.S. Pat. No. 3,700,324 envision a system wherein coded data cards containing discrete mark and no mark information as well as document information to be selectively printed, are loaded into a reader tray and individually fed past a data scanning station, a document information imaging station and finally into a restack tray. As each card is fed, the mark and no mark code information thereon is optically scanned and thereafter, when the data card reaches the imaging station, the document information therefrom is imaged upon a photo-sensitive drum for continuous electrophotographic processing. Thereafter, the card is fed to the restack tray while the code information is processed in the scanning and selection circuit depicted in FIG. 3 and the document information from each card is electrophotographically processed through the well known steps of charging a portion of the photosensitive drum and imaging information from the data card, onto a charged portion of the photosensitive drum to form a latent electrostatic image of the document information on each card fed. Thereafter, each latent electrostatic image formed is rotated through the continuous electrophotographic processing system employed past a development station wherein charge toner particles may be cascaded thereover to establish a toner image on the photosensitive drum suitable for transfer purposes and subsequently, the developed toner image is rotated to a transfer station whereat a transfer member may be selectively engaged to cause the transfer of the toner image formed for subsequent fusing. These continuous electrophotographic processing steps are employed for the document information on each data card fed so that, as will be readily appreciated by those of ordinary skill in the art, a series of latent electrostatic images are continuously formed on the surface of the photosensitive drum and rotated through the continuous electrophotographic processing steps employed to a development station and a transfer station so as to be available at the transfer station for selective transfer to a web to achieve selective printing.

While the electrophotographic processing steps described above are being carried out for each data card fed, the coded data from each card is scanned and applied to the scanning and selection circuit depicted in FIG. 3 of the patent. In this scanning and selection circuit, predetermined selection conditions are established so that data cards having desired code markings thereon may be selectively printed and/or skipped. More particularly, the data code present on each card, in the form of mark and no mark information is scanned and compared in the circuitry depicted in FIG. 3 of the patent with the mark and no mark conditions established and once appropriate comparisons are achieved, the results thereof are subjected to an AND and/or an OR logical operation as specified by the operator. Whenever appropriate mark and no mark conditions are detected on the given data card for the AND and/or OR operations specified a print or skip signal indication, depending upon the conditions specified by the operator is provided at the output of the scanning and selection circuit illustrated in FIG. 3. It should be recognized that a plurality of AND and/or OR operations may be simultaneously conducted and for this reason, the scanning and selection circuit depicted in FIG. 3 of the patent is provided with a priority output arrangement such that any time one of the AND and/or OR selection modules provides a print output signal, a print output signal will be provided at the output of the scanning and selection circuit depicted in FIG. 3 so long as a skip signal is not present; however, when a skip signal is obtained, such skip signal will have priority and a skip output will be provided by the illustrated scanning and selection circuitry regardless of how many of the other AND and/or OR selection modules provide a print signal. Thus, for each data card fed, a print or skip signal will be provided by the scanning and selection circuit depicted in FIG. 3 and such print or skip signal is representative of the selection conditions established for the document information on the card processed.

The skip or print signal thus obtained for each data card fed is supplied to the logic and control circuit depicted in FIG. 4 of U.S. Pat. No. 3,700,324 and logically processed in such a manner that a print signal will cause the transfer member to be selectively engaged at a point in time when the document information on the card from which the subject print signal was derived is present at such transfer station so that the toner image developed therefrom is selectively transferred onto such transfer member. Conversely, whenever a skip signal is supplied to the logic and control circuit depicted in FIG. 4 the logical processing associated therewith will result in the maintenance of the transfer member at a position displaced from the photosensitive drum when the document information associated with the card from which the skip signal was developed is present at such transfer station. In addition, as will be appreciated by those of ordinary skill in the art from a consideration of the disclosure of U.S. Pat. No. 3,700,324, the print and skip signals provided by the scanning and selection circuit depicted in FIG. 3 of the patent are also employed in the logic and control circuit shown in FIG. 4 thereof to cause selective actuation of the developer station, apparatus at the transfer station and the fuser station so that highly efficient selective transfer operations for the continuous electrophotographic processing techniques employed may be achieved.

In the disclosure of the present exemplary embodiment of the instant invention, it shall also be assumed, for the purposes of description, that an electrophotographic printing system such as disclosed in U.S. Pat. No. 3,700,324 is being employed for the processing of coded data cards containing document information representing labels or the like even though, as will be readily appreciated by those of ordinary skill in the art from the portions of this disclosure set forth hereinafter that any form of coded record containing both discrete code markings and document information for selected printing purposes may be employed and the appropriate processing thereof in accordance with the teachings of U.S. Pat. No. 3,700,324 may simply be achieved through appropriate modification of the feeding mechanism therefor as well as corresponding modifications in the electrophotographic processing system to accommodate the document information presented. In addition, as will be apparent to those of ordinary skill in the art, the scanning mechanism for the coded data on any record format employed should be appropriately positioned for the scanning thereof. Although the disclosure of the instant invention assumes, for the purposes of reader convenience, that coded data cards containing label document information are employed, the nature of the coded information will vary from that considered in U.S. Pat. No. 3,700,324 and in addition, a clock track will be provided on each record card to be logically processed for selection purposes; however, as shall be apparent as this disclosure proceeds, the record cards considered in U.S. Pat. No. 3,700,324 may be processed in apparatus according to the instant invention should it be desired to obtain a printing of the document information from each card without the initiation of a desired selection process.

More particularly, the data cards employed, for the purposes of the exemplary embodiment being considered are specially adapted to contain a substantial amount of coded information and all of such coded information is to be employed for selection purposes.

Thus, it may be assumed for the purposes of the instant disclosure that a standard record card containing document information is utilized and in addition to such document information a clock track and a plurality of bit columns adapted to receive selective markings by conventional coding techniques are employed. For instance, in the exemplary embodiment of the invention disclosed, it will be assumed that optical coding techniques are employed and 5 columns of bit locations adapted to receive mark and no mark information are disposed in a direction parallel to the direction in which the card is fed. Each column may be considered to include 16 bit locations so that in the exemplary embodiment of the invention set forth, 80 bit locations in the form of 5 columns having 16 bit locations each are arranged to be optically scanned in a serial manner by the scanning and selection apparatus depicted in FIG. 1 and may be coded by the placement of appropriate mark or no mark information in each of the bit locations provided. Thus, if a standard 7⅜ × 3¼ data card is considered, an end portion thereof which is approximately 1⅝ inches wide may be reserved for the 5 columns of bit locations and the clock track described above, while the remaining portions thereof may be appropriated for receiving document information to be printed. As each column of bit locations is here considered to be provided with 16 boxes or the like appropriate for the reception of mark or no mark information, it will be appreciated by those of ordinary skill in the art that the clock track employed may take the form of 17 equally spaced marks arranged in a column adjacent to the 5 columns of bit locations and disposed in such manner that each bit location within the 5 columns of bits available is disposed intermediate two marks of the clock track. Thus, in this manner, as is well known to those of ordinary skill in the art, if each column of bit locations is sequentially scanned in series, a clock pulse will be produced prior to the reading of each bit location and subsequent to the reading of the last bit location in a column.

Various alternative card formats as to bit location and selective rearrangement of the space relationship of the scanning means therefor, to be described below, will be apparent to those of ordinary skill in the art and it will be appreciated that any convenient arrangement appropriate to the disposition of code markings and document information on a record media may be employed. It should be noted however that a serial scanning approach to the reading of column information from a record is here preferred, because when each data record to be selectively processed is to contain a substantial amount of bit information such a serial scanning technique avoids the use of a large number of optical scanners. It should be noted, however, that should a parallel scanning arrangement utilizing only a single transversely disposed column of information be employed, the use of a clock track to introduce each bit read as well as indicate a point where reading of bit information terminates is unnecessary since the feeding of the card could be employed to open a scanning window in much the same manner disclosed in U.S. Pat. No. 3,700,324. Although the disclosure of the instant invention contemplates the employment of data cards having five columns available for the acceptance of coded bit information in the form of optically scanned mark or no mark information, it will be readily appreciated by those of ordinary skill in the art that the instant invention, due to the symmetry employed therewith, will admit of a rapid expansion to allow more columns of data to be read or, alternatively, a sharp reduction for scanning only one or two columns of serially presented information is readily available and specifically contemplated herein. Furthermore, although optical coding and scanning techniques will be here described, it will be readily appreciated by those of ordinary skill in the art that magnetic spot coding or punch coding techniques may be readily employed and suitable sensors therefor readily substituted for the optical sensors contemplated herein.

Turning now to FIG. 1, the generalized block diagram schematically illustrating an exemplary embodiment of the scanning and selection methods and apparatus contemplated by the instant invention will be employed to acquaint the reader with the structure, function and logical techniques which may be utilized in the illustrative embodiment of the exemplary scanning and selection apparatus contemplated by the instant invention while the details of the generalized blocked elements therein will be considered in detail in conjunction with the remaining figures set forth. It should be noted at the outset, however, that the exemplary embodiment of the scanning and selection apparatus depicted in FIG. 1 is initially programmed to perform predetermined selection operations on data cards and each time such apparatus is enabled at the beginning of a processing cycle and such programming is established, the scanning and selection apparatus depicted in FIG. 1 will provide the same outputs to the electrophotographic printing system disclosed in U.S. Pat. No. 3,700,324 as the scanning and selection circuit shown in FIG. 3 of the patent. However, as shall be apparent as this disclosure continues, a much greater amount of selection information may be efficiently processed while selectivity, in terms of the number of programs through which selection may occur, is substantially increased.

THE GENERALIZED SCANNING AND SELECTION TECHNIQUES

The generalized exemplary embodiment of the scanning and selection techniques employed in accordance with the teachings of the instant invention, as illustrated in FIG. 1, comprises scanning, control and conversion means indicated by the dashed block 1, write/read address and selection control means 2, a plurality of mark/care memories and compare means 3 – 7, control memory and decision means 8 and first and second counter means 9 and 10. The scanning control and conversion means indicated by the dashed block 1 comprises clock and card detect means 11, scan control means 12, multicolumn data scan means 13 and serial to parallel conversion means 14. As mentioned briefly above, the data cards contemplated by the exemplary embodiment are fed by the feed means such as disclosed in U.S. Pat. No. 3,700,324 or similar conveyancing means past a scanning station in such manner that each column of bit locations located thereon as well as the clock track is optically scanned in a serial manner. The clock and card detect means 11 and the multicolumn data scan means 13, as shall be more fully described in connection with FIG. 2, include optical sensors appropriate for serially scanning each of the columns of bit information and the clock track and in addition, a further optical sensor is provided in much the same manner as disclosed in U.S. Pat. No. 3,700,324 to detect the entrance of a data card at the location of the optical sensors in the feed path. More particularly, the clock and card detect means 11 includes the optical sensors for reading the clock track in series and detecting the leading edge of the data card being fed. Signals representing the detection of a data card are supplied through conductor 15 to the scan control means 12 while each pulse read by the optical scanner for the clock track is suitably amplified and supplied through conductor 16 to the scan control means 12.

The scan control means 12 is responsive to the receipt of a card detect signal through conductor 15 to supply, as shall be described in detail in conjunction with FIG. 2, a sample and hold interval to the multicolumn data scan means 13 during which the threshold level of the preamplifiers employed to amplify mark and no mark information read from each column of a data card is set to a threshold level which essentially corresponds to the ambient white level of the card prior to any scanning of mark or no mark information. This sample and hold signal which is applied to the multicolumn data scan means through a conductor 17 from the scan control means 12 has a duration of approximately twenty milliseconds (20ms) and is sufficiently short to assure that the threshold level of the optical scanner preamplifier means present in the multicolumn data scan means 13 may be appropriately set between the detection of an edge for the data card being read and the appearance of the first bit of information or clock mark in the data columns and clock track being read. In addition, as shall also be seen in conjunction with FIG. 2, the termination of the card detect signal applied to the scan control means 12 through conductor 15 is employed to provide a gating signal which is effective to gate a start memory signal from the output of the scan control means 12 through conductor 18 to the write/read address and selection control means 2.

The clock pulses read from the data card being scanned and supplied from the clock and card detect means 11 through conductor 16 to the scan control means 12 are employed to gate each bit of data read by the multicolumn data scan means 13 through the serial to parallel conversion means 14 and to increment various control features, as further described in conjunction with FIG. 2, which are employed to assure that only data from properly coded data cards is processed by the scanning and control apparatus depicted in FIG. 1 or alternatively, to provide various indications that improperly coded data cards are being scanned. Here, however, it is sufficient to appreciate that as a clock track employing seventeen clock marks is associated with the data columns on the data card being read and each clock pulse is arranged to introduce and follow an appropriately located bit of no mark or mark information in a column, such clock pulses may be employed to cause the logic to look for mark or no mark information between clock pulses and in addition to gate the mark and no mark information read through shifting configurations to achieve a serial to parallel conversion of the column data read from each data card. The clock pulse data supplied to the scan control means 12 through conductor 16 is applied through conductor 19 to the serial to parallel conversion means 14 where a serial to parallel conversion for each column of data read from the data cards is achieved and as shall be seen in conjunction with FIG. 2 is further employed to assure that appropriately coded data cards are being read or alternatively specific marker cards have been detected.

The multicolumn data scan means 13 may comprise an optical scanner and suitable preamplfication means therefor for each column of data to be read from data cards being sorted or selectively processed in electrophotographic printing apparatus in accordance with the teachings of the present invention. More particularly, it will be recalled, that data cards having five columns of bit locations wherein each column contains 16 individual bit locations are employed in the exemplary embodiment of the invention here under discussion. Accordingly, if the five columns of data are arbitrarily designated columns A – E, it will be appreciated by those of ordinary skill in the art that the multicolumn data scan means 13 may comprise five optical scanners appropriately disposed to read mark and no mark information from corresponding ones of the data columns on a data card being fed. Each optical scanner in turn is connected to suitable preamplifier means therefor so that as each of the five columns of bit locations are read from a data card, mark and no mark information in the form of pulses or the absence of pulses will be applied through conductors 20 – 24 to the serial to parallel conversion means 14. Thus, for each data card being scanned, under the exemplary conditions for the data cards here defined, 16 bits of information will be supplied through each of conductors 20 – 24 to the serial to parallel conversion means 14 wherein the data conveyed through each of the conductors 20 – 24 represents the mark or no mark information associated with a given one of the data columns on the data card being scanned. Therefore, if for the purposes of illustration, the column of 16 data locations furthest removed from the clock track is designated channel A while the column of data location closest to said clock track is designated as column E, it will be appreciated, as indicated in FIG. 1, that 16 bits of mark and no mark information will be read from column A and supplied through conductor 20 to the serial to parallel converter means 14 for each data card read while similar sequences of 16 bits of information are read by the multicolumn data scanning means 13 for data columns B – E on the data card and supplied through conductors 21 – 24 to the serial to parallel conversion means 14.

Therefore, it will be appreciated by those of ordinary skill in the art that as each data card is fed and detected at the scanning station at which the multicolumn data scan means 13 and the clock and card detect means 11 are located, the detection of the leading edge of the card will result in a sample and hold interval as established on conductor 17 which terminates prior to the appearance of any mark or no mark information to be scanned and thereafter the mark and no mark information contained in each of columns A – E will be read in sequence by the optical scanning means present in the multicolumn data scan means 13 and supplied in series through conductors 20 – 24 to the serial to parallel conversion means 14. In addition, clock pulses as scanned by the clock and card detect means 11 are read from the clock track and supplied through conductors 16 and 19 to the serial to parallel conversion means 14. Of course, should it be desired to either increase or decrease the number of columns in which bit locations for coding purposes are provided, the optical scanning means and channel conductors 20 – 24 associated therewith would be appropriately expanded or reduced to accommodate the desired number of columns of bit locations. However, should it be desired to modify the number of bit locations employed within each coiumn, a modification of the clock pulses and subsequent processing apparatus associated with the parallel conversion and logical manipulation thereof would be performed in a manner which will become apparent to those of ordinary skill in the art as this description proceeds. It should be noted, however, that 8, 16 or another appropriate multiple of eight bits is a preferred columnar length due to the structure of conventional logical circuitry commonly available in the marketplace.

The serial to parallel conversion means 14 as further described in conjunction with FIG. 2, acts to convert the 16 bits of serial information applied through each of conductors 20 – 24 from the multicolumn data scan means 13 to a parallel format while maintaining the individual integrity of each channel scanned and subsequently transformed from a serial to parallel format. Thus, in essence, the serial to parallel conversion means 14 may include one 16 bit serial in, parallel out shifting configuration for each of the five channels on a data card scanned and hence, one such shifting configuration will be associated with each of conductors 20 – 24 so as to be individually associated with each of the channels A – E. In addition, as shall be seen below, the exemplary embodiment of the instant invention presently being set forth acts to convey parallel channel information on the basis of 8 bits per cycle and for this reason two cycles of operation are necessary in the processing of channel information from an individual data record being scanned. For this reason, each of the shifting configurations associated with a channel of information as aforesaid in the serial to parallel conversion means 14 additionally includes, as also disclosed in conjunction with FIG. 2, a pair of eight input, four output multiplexer devices to that the parallel output of the shifting configuration which, when fully loaded, includes 16 bits, may be further processed in the form of two 8 bit passes as controlled by the gating of such multiplexer means.

The serial to parallel conversion means 14 is provided with five output cables 25 – 29, each of which is associated with one of the channels of column information read from the data cards being processed and, for this reason, are designated channel A - channel E in FIG. 1. Therefore, it will be appreciated by those of ordinary skill in the art that the individual columns of data present on coded record cards being scanned are separately read at the multicolumn data scan means 13 and separately maintained through the serial to parallel conversion means 14 so as to be supplied on the parallel output cables 25 – 29 in an independent, parallel channel format. Each of the output cables 25 – 29 contains eight parallel conductors for conveying 8 bits of parallel data from its associated channel to various ones of the channel mark/care memories and compare means 3 – 7 while output cable 25 is additionally connected, as illustrated in FIG. 1, to an input of the control memory and decision means 8. Only eight parallel conductors are present within each of the output conductors 25 – 29 because, as mentioned above and described in detail hereinafter, channel information is processed in a parallel bit format within the instant invention on the basis of 8 bits per channel per cycle wherein the application of a given 8 bits of data to each of output cables 25 – 29 is controlled by the multiplexer means associated with each channel in the serial to parallel conversion means 14 as aforesaid. Thus, it will be appreciated by those of ordinary skill in the art that the scanning, control and conversion means indicated by the dashed block 1 acts to detect the leading and trailing edges of each data card to be scanned, causes the threshold level of the multicolumn data scan means 13 to be set, as soon as the leading edge of a card is detected, and thereafter allows the mark or no mark information present in each of columns A – E on the data card to be read in sequence to provide a serial representation of the mark and no mark information in each data channel of a card. Thereafter the serial format of the mark and no mark information developed from each channel is transferred to a parallel representation under timing supplied from the clock track of the record being scanned while being independently maintained on a per channel basis.

The channel mark/care memories and compare means 3 – 7 are each associated, as indicated in FIG. 1, with an individual column or channel of information read from the coded data record cards and processed within the scanning and selection apparatus according to the present invention. For this reason, each of the channel mark/care memories and compare means 3 – 7 is connected to an individual one of the output cables 25 – 29 so as to receive channel information read from a data card being scanned and transformed by the serial to parallel conversion means 14 into a parallel format which is separately maintained with regard to its channel association. More particularly, each of the channel mark/care memories and compare means 3 – 7 performs two primary functions within the instant invention. The first such function is to store appropriate selection information for each selection program for the channel of information associated therewith. The second primary function is to compare the selection information stored with mark and no mark information read from a corresponding channel of each data card scanned to ascertain whether the portion of the selection information therein for any program stored corresponds to that derived from the card and to provide an indication when an appropriate comparison results. The first primary function of storing an appropriate portion of the selection information for each program through which channel information associated therewith is to be tested is achieved by two memory configurations, the first of which stores mark and no mark information and the second of which stores care and don't care information for each program routine through which the mark and no mark information contained in a given column of a card to be scanned is to be processed.

In essence, as shall be seen below, the instant embodiment of the present invention provides a capability for imposing up to eight sets or program routines of selection information. For this reason, both the mark and no mark and the care and don't care memory configurations provide at least 128 bits of storage so that eight sets of 16 bit selection conditions may be stored within each memory configuration. For example, the mark and no mark memory configuration stores one sixteen bit word for each program and each 16 bit word defines whether or not each of the 16 bits read from a record card being scanned is to be a mark or no mark bit. Thus, once this information is stored in the mark and no mark memory configuration, and a given channel of information is read from a data card being scanned, the 16 bits read for that channel of the data card may be compared on a one to one basis with the mark or no mark information stored in the mark and no mark configuration and up to eight such comparisons may be run for the eight sets of 16 bit mark or no mark selection requirements stored for each 16 bits of channel information read from a data card being scanned. Similarly, the care and don't care memory configuration present within each of the channel mark/care memories and compare means 3 – 7 may store eight 16 bit words or programs and each 16 bit word defines whether or not each of the sixteen bits read from the record card being scanned is a bit whose condition is to matter for that program in the selection operation being run. For example, in a typical selection operation, a programmer desirous of causing the printing of document information from specific record cards may typically devise one or more programs where only certain ones of the 16 bits of a given channel of information on a data card to be scanned are definitive of the selection conditions to be imposed. Under these conditions such a program would cause the mark or no mark memory configuration to store appropriate mark or no mark information for such definitive ones of the bit positions in that channel. However, the bit positions which are not definitive as to the selection operation to be run would be left blank and the care and don't care memory configuration would be programmed in such manner that the 16 bit word associated with the subject program would have care indications stored in the bit positions corresponding to the definitive bit positions for the channel to be read while the bit positions which are not definitive of the selection requirements imposed would be placed in a condition to indicate a don't care state. Thus, once this information is stored in an appropriate care and don't care memory configuration and a given channel of information is read from a data card being scanned, the 16 bits read from that channel may also be compared on a one to one basis with the care and don't care information stored and up to eight comparisons may be run for the eight sets of 16 bit care or don't care selection requirements which may be loaded for each 16 bits of channel information read from a data card being scanned. Accordingly, it will be appreciated by those of ordinary skill in the art that the first of the two primary functions carried out by the channel mark/care memories and compare means 3 – 7 is achieved through the storage of up to eight different sets of mark and no mark information and care and don't care information in the mark and no mark and the care and don't care memory configurations present therein.

Each of the channel mark/care memory and compare means 3 – 7 is connected through a multiconductor cable 30 to an output of the write/read address and selection control means 2. The write/read address and selection control means 2 will be briefly described below and in great detail in conjunction with FIG. 3; however, it is here sufficient to appreciate that each of the mark and no mark and care and don't care memory configurations within each of the channel mark/care memory and compare means 3 – 7 may be independently addressed for the storage and reading of up to eight programs through a plurality of address inputs supplied from the write/read memory address and selection control means 2 through the multiconductor cable 30 and in addition thereto is conditioned for a write or read operation from a further input in the multiconductor cable 30. Thus, both the selective programming and reading of up to eight programs into or from the mark and don't mark memory configuration and the care and don't care memory configuration within each of the channel mark/care memory and compare means 3 - 7 is controlled by the input supplied thereto through the multiconductor cable from the write/read memory address and selection control means 2.

The second primary function of each of the channel mark/care memory and compare means 3 - 7 is to read out in sequence the mark and no mark information and the care and don't care information for all of the programs stored in the mark and no mark and the care and don't care memory configurations and compare such information in sequence with the 16 bit channel information from each record card being scanned. This second primary function of the channel mark/care memory and compare means 3 - 7, will be described in great detail in conjunction with FIG. 4, however, it is here sufficient to note that each set of program conditions stored in the mark and no mark and the care and don't care memory configurations are read out in sequence under the control of the address information supplied on the multiconductor cable 30 and compared with the 16 bit channel information supplied on appropriate ones of the output cables 25 - 29 and an appropriate output signal is provided on conductors 31 - 35 indicative of whether or not a favorable comparison has been achieved for each program set of conditions imposed.

In actuality, it will be recalled that channel information is conveyed through the instant invention on the basis of 8 bits in parallel rather than 16 and hence the actual select or non-select signals applied to conductors 31 - 35 are signals based on the results of comparisons obtained for the first or second 8 bits of data read and hence two comparison operations for each 8 bits of data are run for each program stored in the mark and no mark and care and don't care memory configurations present within the channel mark/care memories and compare means 3 - 7. Thus it will be appreciated by those of ordinary skill in the art that information may be stored in each of the mark and no mark and care and don't care memory configurations within each of the channel mark/care memories and compare means 3 - 7 whenever a write operation is defined on the multiconductor cable 30 and up to 8 programs or sets of input conditions may be stored in each of said mark and no mark and care and don't care memory configurations due to the address supplied by the write/read address and selection means 2 through the multiconductor cable 30. Furthermore, once appropriate program information has been stored in all of the desired addresses of the mark and no mark and care and don't care memory configurations, data cards to undergo a selection process may be scanned and the channel information from each column thereon supplied to the channel mark/care memories and compare means 3 - 7 through output conductors 25 - 29. Thus channel information from each column then may be compared with each of the eight sets of mark and no mark selection words and care and don't care selection words stored in the mark and don't mark and care and don't care memory configurations present in each of the channel mark/care memory and compare means 3 - 7 and the results of each comparison will be supplied on a per channel basis to the control memory and decision means through appropriate ones of the conductors 31 - 35 associated with channels A - E in the manner indicated in FIG. 1.

The control memory and decision means 8 like the channel mark/care memories and compare means 3 - 7 acts to perform two principle functions within the scanning and selection control apparatus illustrated in FIG. 1. The first of such functions is to accept program selection information from the program card being scanned and to store such selection information while the second principle function thereof is to initiate the read out of such stored selection information upon the scanning of record cards to be selectively processed and to impose the selection information stored therein for each program or set of selection conditions upon information resulting from a reading of the data card scanned. However, the control memory and decision means 8, unlike the channel mark/care memory and compare means 3 - 7, does not act directly upon column or channel information read from each data card scanned but instead acts to impose the stored selection information therein upon the results of the initial comparison information provided by the channel mark/care memories and compare means 3 - 7 for each card read on a per program basis. Thus, as indicated in FIG. 1, the comparison operations for stored program information in the control memory and decision means 8 is performed on the basis of a comparison with the partial selection information for each channel supplied thereto for each program through the conductors 31 - 35. Therefore, the control memory and decision means 8 may be organized on a per card basis rather than a per channel basis as were the channel mark/care memories and compare means 3 - 7 and for this reason the memory configuration therein, to be described in detail in conjunction with FIG. 5, may include substantially less storage than was necessary for the channel mark/care memories and compare means 3 - 7.

More particularly, as shall be discussed in great detail in conjunction with FIG. 5, the control memory and decision means 8 is required to only store 4 bits of information for each program stored therein. Therefore, as the instant disclosure of the present exemplary embodiment of this invention has assumed a storage capability for eight programs, it will be appreciated that the memory configuration within the control memory and decision means 8 need only provide 32 bits of storage wherein four bits define a program and such program is organized on a per card basis rather than a per channel basis. Thus, the programming of the memory configuration within the control memory and decision means 8 may be achieved through a scanning of program information on a program card which is associated with only a single column or channel on the program card being read and for this reason, as plainly illustrated in FIG. 1, only the input from the first column or channel A on a data card is provided thereto through the multiconductor cable 36 which connects to the multiconductor cable 25 associated with channel A and is employed as an input to the channel A mark/care memory and compare means 3. The first of the four bits of program information stored within the control memory and decision means 8 for each program, define whether or not the partial selection information supplied to the control memory and decision means 8 for each of channels A - E through conductors 31 - 35 is to undergo and AND or an OR operation while the remaining three bits of information associated with each program and define whether a resulting selection signal is to result in a print or skip operation or a counting operation at one of the first and second counter means 9 and 10. Thus, it will be seen by those of ordinary skill in the art that each of the eight programs stored in the control memory and decision means 8 define whether the partial selection information supplied thereto on a per channel and per program basis through conductors 31 – 35 is to be ANDed or ORed for a given program while the remaining bits of information defined therein are determinative as to whether or not the data card passing the selection conditions imposed is to have the document information present thereon printed or whether this card is to be skipped or counted at one of the first and second counter means 9 and 10.

As each of the channel mark/care memories and compare means 3 – 7 as well as the control memory and decision means 8 in the exemplary embodiment of the invention being set forth is capable of cycling through a set of selection information or programs for coded bit information obtained from each card undergoing a selection operation, an additional function of the control memory and decision means 8 is to accumulate the results of the selection operation performed by each of the programs established and to provide only a single processing signal upon the completion of all of the programs stored. Thus, the control memory and decision means 8 awaits the completion of all of the program routines established for the selection process in progress and then provides either a print or skip signal for the data card presently being scanned or alternatively will provide a count increment signal on one or more of the conductors 37 or 38 connected to the first and second counter means 9 and 10.

The output of the control memory and decision means applied to conductor 39, as plainly indicated in FIG. 1, is a print or skip signal which, under the exemplary application being assumed here, may be applied to the logic and control circuit disclosed for the electrophotographic printing systems in FIG. 4 of U.S. Pat. No. 3,700,324 to cause the printing or skipping of document information on the card being scanned upon the arrival of such document information at the transfer station within the controlled electrophotographic printing operation. The outputs on conductors 37 and 38 of the control memory and decision means 8 are employed to selectively increment the first and second counter means 9 and 10 and are employed in applications where it is desired to ascertain the number of cards within a given deck undergoing selection which have the requisite conditions for which the various selection programs were imposed. For instance, if a case wherein a program deck of coded label cards was loaded where the substantial coding available was employed to define information regarding an employee or customer which included the number of years such customer or employee was associated with a given company; the program selection requirements could be established so that only employees or customers with an affiliation of two years were selected, excluding all others in the deck and such record cards could be counted at one of the first and second counters 9 and 10 while no printing of the document information on those cards would take place. This same example would act to fully illustrate the use of the instant invention within a sorting configuration wherein it is desired to obtain the record card per se rather than document information contained thereon and hence, the selective signals on one or more of the conductors 37 – 39 of the control memory and decision means 8 could be utilized to provide outputs to deflectors within a sorting arrangement. The first and second counter means 9 and 10 may take the form of conventional counters which act to be incremented each time a pulse is supplied on one of conductors 37 or 38 and is reset each time a power on or program routine is initiated to begin a new selection processing operation. As the first and second counter means 9 and 10 are conventional they shall not be further described in specie herein; however, the logic inputs thereto shall be further described in conjunction with FIG. 5.

The condition of the control memory and decision means 8 as to reading or writing as well as the addressing thereof is controlled by the write/read address and selection control means 2 in much the same manner as these functions are controlled thereby for the channel mark/care memories and compare means 3 – 7. For this reason, the address and write control input to the memory configuration within the control memory and decision means 8 are shown as connected through a multiconductor cable 40 to corresponding ones of the outputs of the write/read address and selection control means 2 and it will be appreciated by those of ordinary skill in the art that each time a 3 bit address designation is supplied by the write/read address and selection control means 2 through the multiconductor cable 40 to the control memory and decision means 8 one of 4 bit storage locations will be defined and whether program information supplied through the multiconductor cable 36 is written into such storage location or stored program information is read therefrom will be determined by the condition of the write input to the control memory and decision means 8 as supplied through another discrete conductor within the multiconductor cable 40 and hence output of the write/read address and selection control means 2.

The write/read address and selection control means 2 will be described in great detail in conjunction with FIG. 3; however, here only the generalized function thereof need be considered. The write/read address and selection control means 2 acts in response to control signals supplied by the scan control means 12 through conductor 18 to place the memory configurations within the channel mark/care memories and compare means 3 – 7 and the control memory and decision means 8 in either a write or read mode, to control the addressing of each of these memory configurations and to provide signals indicative as to whether or not all comparison operations for all other programmed sets of selection conditions have been run and thereby supply an indication to the control memory and decision means 8 indicating that the cumulative selection for the card being scanned may be outputted in the form of a print or skip signal or a counter incrementing signal. More particularly, as shall be further described in conjunction with FIG. 3, whenever the exemplary embodiment of the instant invention is energized or alternatively, when a switch on the front panel of the equipment (not shown) is enabled, the write/read address and selection control means 2 will establish a program condition for the memory configurations within the channel mark/care memories and compare means 3 – 7 and the control memory and decision means 8. Thereafter, appropriate addressing information will be supplied through the multiconductor cable 40 so that as each of the appropriate parts for the various selection programs to be imposed are scanned the information derived therefrom will be loaded into appropriate ones of the memory configurations within the channel mark/care memories and compare means 3 – 7 and the control memory and decision means 8. The write/read address and selection control means 2 will also count the number of program sets loaded so that such count may be stored and later relied upon as various program routines are run during selection to identify when all the program routines have been tested and a collective decision for the data card being scanned may be made.

When all of the program routines to be established have been loded, the write/read address and selection control means 2 reverts to a selection or read mode of operation wherein coded data from record cards loaded is scanned and forwarded on a per channel basis to the channel mark/care memories and compare means 3 – 7 and the partial selection information therefrom is forwarded to the control memory and decision means 8 for selection purposes. The write/read address and selection control means 2 then causes the word selection sets of information to be read from each of the channel mark/care memories and compare means 3 – 7 and the control memory and decision means 8 so that appropriate comparisons for each program set stored may be made and thereafter, when comparison operations for each program have been completed, an indication is provided that a final selection decision for the card being scanned on the basis of the results of all of the comparisons for all of the programs stored is provided. Thus, in the manner the write/read address and selection means 2 controls the manner in which all coded data read from cards being scanned is processed as well as controlling the timing and sequencing through which all intermediate selection tests are made and additionally acts to provide an indication as to when all of the selection conditions imposed have been run.

Therefore, it will be appreciated by those of ordinary skill in the art that the exemplary scanning and control apparatus as well as the processing techniques therefor, as taught by the instant invention, acts to process a substantial amount of coded data from record cards being read while imposing substantial selection conditions thereon which may be widely varied at the option of a programmer. At the same time, the operator need only be supplied with a program deck which is to be loaded to thereby establish a recordation within the memory configurations of the channel mark/care memories and compare means 3 – 7 and the control memory and decision means 8 so that such operator need not be highly skilled in the program arts. In addition, the logic configurations and selection techniques employed in the environment of the invention illustrated in FIG. 1 are highly efficient and exhibit substantial flexibility because mark and no mark information associated with each column on a data card is independently processed and partial selection decision with respect to the selection requirements associated with that information is made on a per channel basis in independent memories associated therewith while selection decisions related to the entire coded content of the data card being scanned are made on a per card basis but as a function of the partial selection decisions made for each channel so that a highly efficient circuit design which avoids substantial redundancy may be employed. In addition, the symmetry and organization of the logic readily admits of expansion or reduction for applications which require either a greater or lesser degree of selectivity. Thus, the number of channel mark/care memories and compare means 3 – 7 may be readily expanded or reduced for scanning and selection apparatus adapted for specific applications as can the number of sets of program information for which selection conditions may be imposed. Accordingly, by merely adding to or reducing the number of channel mark/care memory and compare means 3 – 7 and expanding or reducing the memory content of the control memory and decision means 8 together with an appropriate modification in the addressing of the write/read address and selection control means 2, the instant invention may be readily modified to meet a specific application. For instance, in certain applications only a two channel system may be desired wherein coded data records employing only two columns of coded information are needed and similar modifications in the number of program cycles which may be imposed could be readily accommodated to meet other specific requirements.

PROGRAMMING SETS OF SELECTION CONDITIONS

The description of the generalized block diagram of the exemplary embodiment of scanning and selection methods and apparatus in accordance with the teachings of the present invention, as set forth in FIG. 1, has rendered it apparent that prior to the loading of coded data records for the purposes of selection, each of the memory configurations within the channel mark/care memories and compare means 3 – 7 and the control memory and decision 8 must be loaded with appropriate selection information and that up to eight sets of selection information may be loaded in the exemplary embodiment for imposition on each record card to be subsequently scanned. Thus, in the five channel embodiment of the invention being described up to eight sets of mark and no mark information may be loaded into each of the mark and no mark memory configurations present within the five channel mark/care memories and compare means 3 – 7 and similarly, up to eight sets of care and don't care information may be loaded into each of the care and don't care memory configurations within the channel mark/care memories and compare means 3 – 7. In addition, up to eight sets of four bit programs may be loaded into the memory configuration of the control memory and decision means which acts to define and AND/OR mode of selection on a per card basis and whether or not record cards meeting one or more of the eight programs of selection conditions which may be established is to be printed, skipped or counted in one or more of the first and second auxiliary counter means 9 and 10. Although, the write/read address and selection control means 2 automatically establishes a write mode or program mode whenever the apparatus depicted in FIG. 1 is energized or an appropriate switch is depressed to cause program information on cards loaded to be stored in various ones of the memory configurations within the channel mark/care memories and compare means 3 – 7 and the control memory and decision means 8, and the actual manner in which information is derived from such program cards is described in conjunction with FIGS. 4 and 5; a mode of providing program information to the exemplary embodiment of the instant invention set forth in conjunction with FIG. 1 will here be described to acquaint the reader with a typical mode of establishing various program sequences of selection information within the instant embodiment of the present invention to provide further insight into the nature of the selections performed and the vast flexibility which attaches to the selection capabilities of the instant invention.

It will be apparent to those of ordinary skill in the art from the description of the invention set forth in conjunction with FIG. 1 that information read from data cards undergoing selection is processed on a per channel basis until processing by the channel mark/care memories and compare means 3 – 7 has been completed and that each of the memory configurations present therein is therefor associated with only one column of information on a card to be scanned and provides storage on a per program basis indicative of a desired condition for each bit of data within a column. Furthermore, as eight programs have been described for the exemplary case being discussed, up to eight different conditions for a bit to be scanned may be defined and both a mark and no mark memory configuration and a care and don't care memory configuration is present within each of the channel mark/care memories and compare means 3 – 7. Thus, for each program associated with a given channel of information sixteen mark/no mark conditions for the 16 bit locations of a column may be specified for each program and similarly, 16 bits of care/don't care information may be specified for each program and each bit condition specified may be stored. In the control memory and decision means 8, however, only 4 bits per program are required as each program is performed on a per card basis and only one output decision per card will be made even though up to eight programs may be run. It should be noted that in the instant invention, a skip designation for a select signal has been given priority over a print signal so as to be consonant with the mode of operation selected in U.S. Pat. No. 3,700,324; however, as will be apparent to those of ordinary skill in the art, this priority arrangement may be modified to suit a designer's choice. For these reasons, the exemplary mode of programming selected for disclosure assumes that three coded record cards defining selection requirements are required for each program to be loaded and hence twenty four coded program record cards will be required to load a full eight programs into the exemplary scanning and selection apparatus set forth. To be consonant with the organization of the exemplary embodiment of the invention set forth herein, each of the coded program record cards required to store selection information for a given program will be referred to in a manner which generally corresponds to the memory configuration in which the contents thereof is loaded and it will be appreciated by those of ordinary skill in the art that the five mark and no mark and the five care and don't care memory configurations present within the channel mark/care memories and compare means 3 – 7 are loaded simultaneously on a per channel or per column basis while only channel A or one column of a program card is employed to load information into the memory configuration within the control memory and decision means 8 employed for programming purposes.

The three program record cards necessary in the programming of selection information into the embodiment of the invention depicted in FIG. 1 are referred to as the control card, the care/don't care card and the mark/no mark card wherein, as aforesaid, the information on each card is employed to store information into the corresponding memory configuration within the control memory and decision means 8 and the channel mark/care memories and compare means 3 – 7. The control card is the first card of the three card sequence required for the storage of a given program sequence and data therefrom is employed to store information within the control memory and decision means 8. As it will be recalled that the memory configuration within the control memory and decision means 8 stores data concerning a four bit program associated with card information, it will be appreciated by those of ordinary skill in the art that the control card for each program need only certain four bits of information regardless of the number of channels of information being employed. Thus, if the cards employed for programming purposes are assumed to take the standard five column, 16 bit location per column configuration described above, the control card need contain program information in only the column associated with channel A and only the first four bit locations in this channel are relevent from the standpoint of conveying program information.

Of the first four bit locations in a column associated with Channel A on the control program card, the first bit location on this card may be employed for an AND/OR decision, the second bit location may be employed for a print/skip decision, while the third and fourth bit locations on the card may be employed to designate an actuation of the first and second counter means 9 and 10, respectively. Thus, on the control program card, if the first bit location is left blank, a selection designation may be assigned an AND designation while a mark occuring in this location may be assigned as an OR designation. Similarly, the second bit location on the control program card may be employed to designate print/skip information in such manner that leaving the second bit location blank on the card may be interpreted as a print decision while a mark in such second bit location may be interpreted as a skip command. Normally, the second bit location on a card will be left blank if a selective printing operation within the normal meaning of this term is desired; however, one feature of the instant invention is the capability to delete from printing some portion of a selection category and hence the programmed group may be set up on the basis of printing everything but certain cards which are to be deleted and in this case, the second bit location on the control program card will be marked. The third and fourth bit locations in the column of the control program card which corresponds to column A, control the first and second counter means 9 and 10 and if either of these bit locations are marked, the appropriate counter will be incremented when the selection requirements which are otherwise established are met. It should also be noted, as shall become apparent below, that a marking of either the third or fourth bit locations on the control card will automatically inhibit printing. Accordingly, it will be appreciated by those of ordinary skill in the art that the control card which constitutes the first of a three card sequence necessary to store a program within the instant invention employs only the first four bit locations in a column of bit locations on the card which may be here be assumed to correspond to Channel A and the first bit location is employed to designate an AND/OR function, the second bit location is employed to define a print/skip function while the third and fourth bit locations, when marked, are employed to inhibit printing and designate that one or both of the first and second counter means 9 and 10 are to be incremented upon the detection of an appropriate select condition. There will be one control program card in a three card sequence for each program loaded and hence if, in the exemplary embodiment of the invention presently being set forth an eight program sequence is desired to be loaded eight program cards will be prepared and present in the 24 card program deck loaded. Information read from the control card, as shall be seen below, is read from the first four bit locations in channel A of the control card whenever a program mode of operation has been established by the write/read address and selection means 2 and applied to the memory configuration in the control memory and decision means 8 through the multiconductor cable 36, as plainly indicated in FIG. 1.

The second card in the three card program sequence is the care/don't care program card and is employed to store care don't care information in each of the care and don't care memory configurations within the channel mark/care memories and compare means 3 – 7. One care/don't care memory configuration is present within each of the channel mark/care memories and compare means 3 – 7 and hence is associated with each channel of information on a coded data record to undergo selection. Furthermore, it will be recalled that the care don't care memory configurations are to store sixteen bits of information associated with the 16 bits of information present in each channel for a record card undergoing a selection process. Therefore, it will be appreciated by those of ordinary skill in the art that the care/don't care program card which is the second of a three card sequence necessary for the storage of each program should be configured in the same manner as coded record cards to undergo selection in that there should be one column containing 16 bits of information for each 16 bit column on a record card to be scanned so that all of the care/don't care memory configurations can be loaded at once. Accordingly, as the exemplary embodiment of the instant invention contemplates a five column record card yielding the five channel exemplary embodiment depicted in FIG. 1, the care/don't care card should have five columns of information thereon and each column should contain 16 bits of information for storage in the care/don't care memory configurations associated with each channel of information within the channel mark/care memories and compare means 3 – 7.

A preferred coding for the care/don't care program card is the selection of marks for the care condition so that a mark is present only in the bit locations of each column for which the mark/no mark content of cards to be scanned is important whereupon a don't care designation is automatically provided for bit locations in each column which are left blank. It will be appreciated by those of ordinary skill in the art that in any system of coding regardless of whether a single channel of 16 bits of information is employed or five channels containing 80 bits of information are utilized, there will be bit locations which may not be utilized in coding and in addition, when an extensive amount of information is provided on a coded record card such as those employed to store data on company employee's and the like, there will be frequent instances when all of the information available therefrom is not relevant from the standpoint of a given selection operation. For instance, if coded record cards contain employee information such as age, sex, address, length of time with the company and the like, a selection regarding the duration of employment would be programmed in such manner that bit locations designating age, sex, address information and the like would not be relevant and hence no marks would be put on the care/don't care program card associated with these bit locations. Thus, although the care/don't care card will be provided with 16 bit locations for each channel of information which the system is desired to process, only the bit location containing information which is relevant for the selection program then being established would be marked to designate to the logic in a manner to be described below that the contents of a corresponding bit location in the record cards undergoing selection is relevant and should be considered in the selection program taking place. The care/don't care program card is the second card of the three card sequence necessary to establish each program and hence if a full eight program sequence is to be loaded into the logic, eight of these care/don't care program cards would be necessary and such care/don't care program cards should be loaded as the second card of each three card program sequence.

The care/don't care program card defines the bit locations within each column which are to be of interest in a given program and this information is stored on a per program basis within each of the care and don't care memory configurations within the channel mark/care memories and compare means 3 – 7. Once this information has been stored, it is necessary to establish mark and no mark conditions within each of the mark and no mark memory configurations in the channel mark/care memories and compare means 3 – 7 so that information which is definitive as to whether selection is to be carried out on the basis of a mark being present or absent is established. As each of the mark and no mark memory configurations is associated with a channel of information and stores one sixteen bit sequence of information for each column on coded record cards to be selected, in the same manner as the care/don't care program card, it will be appreciated by those of ordinary skill in the art that the mark/no mark program card, which is the third card in the three card sequence necessary to store each program, will have one sixteen bit column thereon for each channel so that a select mark or no mark condition may be stored in the mark and no mark memory configuration for each bit of each channel of information to be subjected to a selection processing operation. The mark/no mark program card is preferably coded in such manner that a mark appears in each bit location which is cared about and in which a mark is to appear while all bit locations which are not cared about and which are to be left blank are in a blank condition. Bit locations on the mark/no mark card for which don't care conditions have been stored are not relevant to selection; however, it is noted that such bit locations would ordinarily be left blank. Thus, in the record card previously described above, should it be desired to select only female employees, the bit location associated with female employees would be marked in the care/don't care program cards so as to designate that the condition of this bit location is important to selection and either the mark or blank condition chosen during coding for designating female employees would be placed in the appropriate bit location of an appropriate channel on the mark/no mark program card to load this condition into the appropriate channel of the mark/no mark memory configuration. As will be apparent to those of ordinary skill in the art, information read from the care/don't care and mark/no mark program cards is loaded into the care and don't care and mark and no mark memory configurations present within each of the channel mark/care memory and compare means 3 – 7 from the appropriate program card being scanned on a per channel basis, transformed into a parallel format and applied to the output cables 25 – 29. Thus, both the care/don't care and mark/no mark program cards define appropriate information for each channel in the system and such information is scanned from the program card associated therewith and simultaneously loaded in parallel into the appropriate memory configurations within the channel mark/care memories and compare means 3 – 7. The gating of appropriate information from the care/don't care and mark/no mark program cards into the appropriate one of the care and don't care and mark and no mark memory configuration within the channel mark/care memories and compare means 3 – 7 as well as the insertion of the information therefrom into the appropriate address for the program then being read is controlled by the write/read address and selection control means 2 in a manner to be described in detail in conjunction with FIG. 3.

To further facilitate an understanding of the programming techniques which may be employed within the scanning and selection apparatus and the techniques therefor set forth in conjunction with the present invention, an exemplary coding for record cards directed to employee classification within a company is set forth below together with several illustrative problems and the programmed solutions therefor which may be achieved with apparatus according to the instant invention. In the employee list set forth, only 21 bit locations are employed and hence it will be appreciated that either a two channel system may be utilized or if a five channel system such as disclosed herein is relied upon, all bit locations from 22 – 80, wherein the bit locations are numbered in order 1 – 16 in channel A, 17 – 32 in channel B and the like, are left blank when programmed in each care/don't care program card for each of the program routines considered.

EXEMPLARY EMPLOYEE LIST CLASSIFICATION
Bit
1  Sales Department
2  Service Department
3  Production Department
4  Accounting Department
5  Engineering Department
6  Personnel Department
7  Purchasing Department
8  Manager
9  More than 5 years of service
10  Hourly Paid
Weeks of vacation - encode from table below (Mark=M)
(Blank=B)

| | None | One | Two | Three | Four | Five | weeks |
|---|---|---|---|---|---|---|---|
| 11 | B | M | B | B | M | B | |
| 12 | B | B | M | B | M | M | |
| 13 | B | B | B | M | B | M | |

Year hired, assume 19AB. Bits 14, 15, 16 & 17 for A and 18, 19, 20, & 21 for B. Bit 17 will not be needed until 198-.

| | 0 | 1 | 2 | 3 | 4 | 5 | 6 | 7 | 8 | 9 |
|---|---|---|---|---|---|---|---|---|---|---|
| 14 | B | M | B | M | B | M | B | M | | |
| 15 | B | B | M | M | B | B | M | M | | |
| 16 | B | B | B | B | M | M | M | M | | |
| 17 | B | B | B | B | B | B | B | B | | |
| 18 | B | M | B | M | B | M | B | M | B | M |
| 19 | M | M | M | M | B | B | M | M | B | B |
| 20 | B | B | B | B | M | M | M | M | B | B |
| 21 | B | B | B | B | B | B | B | B | M | M |

Problem: Print all employees with 2 or more weeks of vacation. This would be an And selection because boxes 11, 12, and 13 must be looked at as a group and not individually; the selections are to be printed. The only boxes which are cared about are 11, 12, and 13. To make the selection four programs may be written, one each for 2, 3, 4 and 5 weeks.

Program 1
Control: Bit 1 blank for And
Bit 2 blank for Print
Bit 3, 4 blank for Print on output strip
Care: Bit 11, 12, and 13 marked, all others blank
Mark: Bit 12 marked-all others blank. This will select all employees, with two weeks vacation

Program 2
Control: Same as Program 1
Care: Same as Program 1
Mark: Bit 13 marked - all others blank. This will select all employees with three weeks vacation

Program 3
Control: Same as Program 1
Care: Same as Program 1
Mark: Bit 11 and 12 marked - all others blank. This will select all employees with four weeks vacation.

Program 4
Control: Same as Program 1
Care: Same as Program 1
Mark: Bit 12 and 13 marked - all others blank. This will select all employees with five weeks vacation.

Problem: Print all employees in Sales or Service. Count all managers with less than five years service on auxiliary counter 1. Printing of all employees in Sales or Service can be accomplished with one OR program. The managers with five years can be done with one And program.

Program 1
Control: Bit 1 marked for OR - this means each bit will be looked at individually.
Bit 2 - blank for Print
Bit 3 and 4 blank for Print on output strip
Care: Bit 1 and 2 marked - all others blank. This will cause only sales and service employees to be looked at.
Mark: Bit 1 and 2 marked - all others blank. This will cause any employee card with a mark in boxes 1 or 2, or both, to be printed.

Program 2
Control: Bit 1 - blank. For And - this is required, because two categories must be looked at together.
Bit 2 - blank for Print
Bit 3 mark - for operating auxiliary counter 1, this will inhibit printing on the output strip for this program.
Bit 4 - blank
Care: Bit 8 and 9 marked - all others blank. These are the only categories of interest.
Mark: Bit 8 marked - all others blank. A mark in Bit 8 will select all managers, a blank in Bit 9 will select all employees with less than five years service. A mark in Bit 9 would select all employees with more than five years service, since it is desired to select the opposite leaving the bit blank achieves the desired effect.

Problem: Print all hourly employees who were not hired in 1973. This problem is best implemented with a Skip program. If a Print program includes all years and a Skip program excludes 1973, the desired result is achieved.

Program 1
Control: Bit 1 - blank for And, since only one box is of interest an OR would also work.
Bit 2 - blank for Print. This will print any employee who is hourly paid.
Bit 3 and 4 - blank for Printing an output strip
Care: Bit 10 marked - all others blank. By not caring about the year none will be excluded.
Mark: Bit 10 marked - all others blank.

Program 2
Control: Bit 1 - blank for And, since 8 boxes must be looked at together.
Bit 2 - mark for Skip, since this program will delete 1973.
Bit 3, 4 - blank for "printing" an output strip. In this case printing really means skipping the output strip.
Care: Bit 14, 15, 16, 17, 18, 19, 20 & 21

-continued

| | |
|---|---|
| Mark: | marked - all others blank.<br>Bit 14, 15, 16, 18 & 19 marked - all others blank. This is the combination of marks and blanks which describe 73. Program 1 above will Print all hourly employees; Program 2 will Skip all those hired in 1973, therefore, only hourly people not hired in 1973 will be left. |
| Problem: | Print all sales or service employees but delete anyone who is in both sales and service and count separately. |

Program 1

| | |
|---|---|
| Control: | Bit 1 marked for OR.<br>Bit 2 blank for Print<br>Bit 3, 4 blank for Printing output strip. |
| Care: | Bit 1, 2 marked - all others blank. |
| Mark: | Bit 1, 2 marked - all others blank. |

This program will print all sales or service employees on the output strip.

Program 2

| | |
|---|---|
| Control: | Bit 1 - blank for And<br>Bit 2 marked for Skip<br>Bit 3 and 4 blank for "printing" on output strip. |
| Care: | Bit 1, 2 mark - all others blank. |
| Mark: | Bit 1, 2 mark - all others blank. |

This problem will skip all employees who are in sales and service and delete them from the output strip.

Program 3

| | |
|---|---|
| Control: | Bit 1 - blank for And<br>Bit 2 - blank for Print<br>Bit 3 - marked for operating auxiliary counter 9<br>Bit 4 - blank |
| Care: | Bit 1 & 2 marked - all others blank |
| Mark: | Bit 1 & 2 marked - all others blank. |

This program will provide the auxiliary count of all combination sales and service employees.

Thus it will be seen that the instant invention allows selected ones of a plurality of coded record cards to be selected on the basis of one or more sets of coded conditions thereon and such conditions may be determined through an AND or OR operation while a plurality of selection programs may be run for each card scanned. Furthermore, the manner in which program selection conditions may be imposed by the feeding of a program deck which may be prepared by a skilled programmer and loaded without error into the various memories employed within the instant invention allows sophisticated programming techniques to be employed therewith while a multitude of bit locations are examined for selection purposes without undue risk of operator error. Various details and exemplary logic configurations for the apparatus generally described in FIG. 1 are set forth in conjunction with FIGS. 2 - 5; however, as shall be readily apparent to those of ordinary skill in the art, such exemplary logic configurations as are set forth herein are provided by way of illustration and should in no ways be construed as limiting in nature. Thus, in the description of FIGS. 2 - 5 which follow, it has been assumed that conventional, commercially available TTL logic is utilized throughout for each of the gates, inverters, registers and flip flops employed, while conventional integrated circuit operational amplifiers are relied upon for the amplifiers shown. Therefore, as will be apparent to those of ordinary skill in the art, complementary logic such as elements having inverted outputs are frequently relied upon to accomplish AND and/or OR functions so that design requirements can be optimized both in terms of a reliance upon logic elements which are readily available in the marketplace as well as the utilization of a minimum number of components. Accordingly, it will be appreciated by those of ordinary skill in the art that any of the specific logic components or arrangements described in conjunction with FIGS. 2 - 5 may be replaced by other components or groups thereof which produce similar output conditions in response to similar input conditions even though the mode of logical operation employed thereby differs at the component level from that set forth in conjunction with FIGS. 2 - 5 so long as the resulting modification is calculated to achieve the same result or a slightly varied result directed to the same purpose. Furthermore, although TTL logic and integrated circuit operational amplifiers, as mentioned above, are assumed to be utilized throughout the exemplary circuit embodiments described in conjunction with FIGS. 2 - 5, MSI, individual circuit components or MOS implemented circuit chips may be readily substituted without any deviation from the inventive teachings contained herein.

SCANNING, CONTROL AND CONVERSION NETWORKS

Referring now to FIG. 2 of the drawings there is shown exemplary scanning, control and conversion apparatus suitable for incorporation into the embodiment of the instant invention illustrated in the generalized block diagram of FIG. 1 and more particularly suitable for incorporation into that portion of FIG. 1 identified by the dashed block 1 and referred to above as the scanning, control and conversion means. The exemplary scanning, control and conversion apparatus depicted in FIG. 2 comprises card detector means 45, clock track sensor means 46, a plurality of column scanning means 47A - 47E, wherein the letter annotation associated therewith defines the channel scan, a plurality of level control networks 48A - 48F, a clock control network identified by the dashed block 49, a plurality of channel format conversion networks 50A - 50E and an output control network identified by the dashed block 51. In a consistent manner with the description of the exemplary embodiment of the instant invention described in conjunction with FIG. 1, it has been assumed that the raw data input contains document information to be selectively printed, separated or the like and takes the form of individual coded data cards containing, in addition to visible document information, five columns of bit information wherein each column has 16 bit loctions, and a clock track containing 17 clock marks and related to each column of bit information in such manner that each of the bit locations therein is disposed intermediate a pair of clock marks on such clock track.

The card detector means 45, the clock track sensor means 46, and the plurality of column scanning means 47A - 47E are therefor to be understood as disposed in a portion of the data card feed path in such relation to each card that the clock track is scanned by the clock track sensor means 46, each of the five columns of bit information is scanned by an associated one of the plurality of column scanning means 47A - 47E and the leading and trailing edges of each card fed may be sensed by the card detector means 45. The card detector means 45, the clock track sensor means 46 and each of the plurality of column scanning means 47A - 47E may each take the form of individual photosensitive devices such as phototransistors, photodiodes or the like, physically positioned over the data card feed path at appropriate locations to detect the information sought. In addition, each of the card detector means 45, the clock track sensor means 46, and the plurality of column sensing means 47A – 47E may additionally include, as indicated in FIG. 2, suitable preamplification stages so that the output level of the photosensitive device employed is raised to an appropriate level so the same may be logically operated upon. Furthermore, the preamplification stages present in each of the card detector means 45, the clock track sensor means 46, and the plurality of column scanning means 47A – 47E may be assumed for the purposes of explanation, to perform a phase inversion of any input signal applied thereto by the photosensor employed. Therefore, it will be appreciated by those of ordinary skill in the art, that the photosensors present in each of the card detector means 45, the clock track sensor means 46 and the plurality of column scanning means 47A – 47E, each produce a negatively going signal, in the conventional manner, whenever a coded data card placed in the feed path passes the scanning station occupied thereby, due to the radiation reduction achieved, and any time a mark such as a mark in a coded bit location or a mark on the clock track is read, a signal having an increased negative magnitude is produced by the photosensor in response to the substantially decreased input radiation available thereto. Thus, as will be readily appreciated by those of ordinary skill in the art, each of the photosensors present in the card detector means 45, the clock track sensor means 46, and the plurality of column scanning means 47A – 47E produce a negative signal in response to the entry of a card at the scanning station and pulses of increased negative magnitude which are subsequently inverted are produced each time a mark in the track or column being scanned is read.

The output of the card detector means 45 is connected to a conductor 52 which in turn connects to the input of a one shot or monostable flip flop 53 while the output of each of the plurality of column scanning means 47A – 47E and the clock track sensor means 46 are connected through conductors 54 – 59 to the inputs of one of the plurality of level control networks 48A – 48F associated therewith in the manner shown in FIG. 2. Therefore, as the negatively directed outputs of the photosensors here employed for scanning purposes are amplified and inverted by the preamplifier networks contained within the card detector means 45, the clock track sensor means 46 and each of the plurality of column scanning means 47A – 47E, it will be appreciated by those of ordinary skill in the art, that a positive output signal will reside on each of conductors 52 – 59 whenever a data card to be scanned is fed and arrives at the scanning station at which the photosensors are positioned and whenever mark information is read by one of such photosensors, a pulse of increased positive magnitude will be applied to the level control network associated therewith. Although not described herein, the preamplification means employed within each of the card detector means 45, the clock track sensor means 46, and the plurality of column scanning means 47A – 47E may also include suitable noise traps such as d.c. shunts to ground to reduce noise and avoid spurious output signals. Furthermore, although it has been stated that a phase inversion is produced within the preamplification networks employed, so that the instant disclosure may proceed on the basis of a positive going input from the scanning means, it will be appreciated that the negative going outputs of photosensors such as phototransistors may be directly employed as input signals for later modification such as in the channel level control networks or may be directly employed in cases where negative going input signals are desired.

The monostable flip flop 53 connected to the output of the card detector means 45 through conductor 52 may take the form of a conventional one shot which here produces a 20 millisecond pulse and thereafter automatically resets in the manner well known to those of ordinary skill in the art. The function of the monostable flip flop 53 is to establish a sample and hold interval for setting a threshold level in each of the plurality of level control networks 48A – 48F whenever a record card to be scanned reaches the scanning station. As will be appreciated by those of ordinary skill in the art, the card detector means 45 is disposed to scan only a blank portion of the card and hence, whenever a data card to undergo scanning reaches the scanning station a positive going pulse will be produced on conductor 52 and such positive going pulse will persist on conductor 52 until the trailing edge of the card being scanned has passed from the scanning station. Thus, whenever a data card to be scanned reaches the scanning station, a positive pulse is produced on conductor 52 upon the detection of the leading edge thereof due to the radiation blockage achieved by the card being scanned.

It should be noted that the magnitude of the pulse produced during the interval that a card being scanned is at a scanning station may vary due to such facts and imperfections in the color or texture of the card or possibly unintentional markings in the area being scanned. However, as the feed rate with which cards are provided and conveyed in the feed path is such that no information, be it legitimate mark information or not will appear within an interval of 20 milliseconds from the time the leading edge of a card is detected, such imperfections of the data card will not hamper the operation of the instant invention. Upon the detection of the leading edge of each card fed, a positive pulse will be applied through conductor 52 to the input of the monostable flip flop 53. Therefore, as well known to those of ordinary skill in the art, each time the leading edge of a card is detected, the positive input on conductor 52 will trigger the monostable flip flop 53 to place a high level on conductor 60 which is maintained thereon for an interval of 20 milliseconds until the monostable flip flop 53 automatically resets whereupon the level on conductor 60 goes low and the level on conductor 61 goes high. The output of the monostable flip flop 53 is connected as shown in FIG. 2 through the conductor 60 and 62 to the inputs of each of the plurality of level control networks 48A – 48F.

Since the composition of each of the plurality of level control networks 48A – 48F may be assumed to be identical, the apparatus employed therein has only been illustrated in detail in conjunction with level control network 48A. As shown within the dashed block 48A, each of the plurality of level control networks 48A – 48F is connected to the output of an associated one of the plurality of column scanning means 47A – 47E and to the output of the clock track sensor means 46 through an associated one of conductors 54 – 59. Furthermore, as also shown within the dashed block 48A, each of the plurality of level control networks 48A – 48F includes a switching device 63, an RC network formed by a resistor 64 and capacitor 65, an amplifying stage 66 and a threshold device 67. The output of the column scanning means 47A is applied directly through conductor 54 to one input of the threshold device 67 while this input is also connected through the switching device 63, the RC circuit formed by the resistor and capacitor 64 and 65 and the amplifier stage 66 to the other input thereof to set, the threshold level thereof. More particularly, the threshold device 67 may comprise a conventional comparator, differential amplifier, or threshold amplifier which acts in the well known manner to apply an input signal which exceeds a level applied to the threshold input thereof to its output while producing no output for signals which do not exceed the threshold set. Thus, as will be apparent from FIG. 2, whenever the positive pulses produced on conductor 54 exceed the threshold level established for the threshold device 67 at the output of the amplifier stage 66, an output pulse will be produced on conductor 68A while when the input signal applied on conductor 54 does not exceed this level, no output or a low will be present on conductor 68A. As will be apparent to those of ordinary skill in the art, an output or positive level on conductor 68A is indicative of mark information while a low during scanning is representative of no mark information.

The switching device 63, the RC network formed by resistor 64 and capacitor 65 and the amplifier stage 66 form a threshold setting network which acts, as will be appreciated by those of ordinary skill in the art, to set a threshold at the threshold input of the threshold device 67 each time a record card to be scanned is detected at the scanning station so that the ambient or no mark level for each card being scanned is established and utilized as a threshold level whereupon mark information may be readily sensed and spurious outputs avoided. In essence, each time the leading edge of a card is detected at the scanning station, a positive pulse will be produced on each of conductors 54 – 59 and 52 which level effectively indicates the ambient background or no mark level of the card being scanned in the same manner described for the card detector means 45. Furthermore, no mark information will appear with the feed rates here assumed until an interval which exceeds 20 milliseconds has elapsed. Therefore, when a positive pulse is produced on conductor 62 by the monostable flip flop 53, the switching device 63, which may take the form of an FET device as shown or similar gating devices such as a silicon controlled rectifier or regular transistor, the positive level on conductor 54 is gated through the switching device 63 to the input of the RC circuit formed by the resistor 64 and the capacitor 65. Under these conditions, the capacitor 65 will charge to a level representative of the ambient background level on the card to thereby establish a no mark level for the threshold devices 67. The amplifier stage 66 may comprise a conventional amplifier exhibiting extremely high input impedance and a gain which approaches unity or one-half. Thus, so long as a high level is applied to conductor 62 to place the switching device 63 in an on condition, the capacitor 65 will charge to a level representing the no mark or ambient background level of the card and more particularly, the portion thereof to be scanned; however, upon the expiration of the 20 millisecond interval established by the monostable flip flop 53, a low will be applied to conductor 62 to place the switching device 63 in an off or high impedence state. Therefore, the ambient or no mark level associated with the card being scanned is established on the capacitor 65 and applied to the threshold input of the threshold device 67 through amplifier stage 66 while the switching device 63 opened upon the automatic resetting of the monostable flip flop 53 prior to a time when any information to be scanned would appear on the data card presently at the scanning station.

Once the switching device 63 is in an off condition, the output of the column scanning means 47A is applied through conductor 54 to the input of the threshold device 67 and compared with the threshold established at the output of the amplifier stage 66. If such an input exceeds the threshold set, it will be applied as a high level to output conductor 68A and hence may be clearly assumed to represent mark information as no mark information would not exceed the threshold level set. Thus, it is seen that each of the plurality of level control networks 48A – 48F acts to establish a threshold level representative of the ambient background or no mark level on each card presented to the scanning station and will only produce an output, a high level on an associated one of conductors 68A – 68E, when the threshold level is exceeded by the scanning of marked information on the card. Hence, an output level on one of conductors 68A – 68F may clearly be assumed to be mark or clock mark information as spurious outputs associated with the ambient background of the card are avoided by the threshold techniques employed.

The output of the level control network 48F which is associated with a clock channel is applied through conductors 68F to the clock control network indicated by the dashed block 49. The clock control network indicated by the dashed block 49 comprises an AND gate 70, flip flops 71 and 72, AND gates 73 and 74 having inverted outputs and an inverter 75. The function of the block control network 49, is to employ the clock signals read from the clock track to separately and appropriately clock data read from channel A and data read from the remaining plurality of columns or channels B – E on each data card being scanned so that such data may be transformed from the serial format in which it is presented on conductors 68A – 68E to a parallel format at the output of each of the channel format conversion networks 50A – 50E as shall be seen below. It will be recalled from the description of a data card scanned, as set forth above, that a 17 mark clock track is employed wherein the relationship of each mark in the track to through the 16 bit locations in each column of data to be read is such that bit locations are disposed between adjacent clock marks and hence the logic circuitry employed may be adapted to look for data between the appearance of clock pulses.

The AND gate 70 may take any of the conventional forms of this well known class of device which acts in the well known manner to produce a high at the output thereof connected to conductor 76 whenever both of the inputs thereto are high while producing a low on conductor 76 under all other input conditions. A first input to the AND gate 70 is connected through conductor 68F to the output of the clock track level control network 48F and hence a high level will be applied on conductor 68F whenever a clock mark is scanned while a low level will reside on conductors 68F intermediate the scanning of the seventeen clock marks as well as prior and subsequent thereto. The second input to the AND gate 70 is connected through conductor 61 to the complementary output of the monostable flip flop 53. The monostable flip flop 53, it will be recalled, acts to produce a 20 millisecond pulse on conductor 60 whenever the leading edge of a card being scanned is detected and automatically resets upon the expiration of this interval. Therefore, the complementary output thereof connected to conductor 61 and to the input of AND gate 70 will go low upon the detection of the leading edge of each card being scanned and will stay low for the 20 millisecond interval established. Thereafter, a high level will be applied to conductor 61 to effectively enable the AND gate 70 transmit mark information applied to conductor 68F. Thus it will be appreciated by those of ordinary skill in the art that the input to AND gate 70 on conductor 61 effectively disables the AND gate during the 20 millisecond interval at which threshold levels are established in each of the plurality of level control networks 48A – 48F to prevent a transmission of sporious outputs from the clock track level control 48F and upon the expiration of this threshold setting interval, enables the AND gate 70 so that mark information as represented by a high level applied to conductor 68F and no mark information as represented by a low level on conductor 68F is effectively reflected at the output of the AND gate 70 which then follows the input thereto.

Upon the expiration of the 20 millisecond interval established by the monostable flip flop 53, each clock pulse read from the clock track will be represented by a high level on conductor 76 while intervals intermediate clock pulses will be represented by a low level on conductor 76. The conductor 76 is connected to the input to the flip flop 71 which may take any of the well known forms of this conventional device or alternatively may be formed by a pair of OR gates having their inputs and outputs cross coupled in the well known manner. The flip flop 71 may here be assumed to be connected in such manner that the output goes high upon the application of a high or setting level to conductor 76 and reset to a low level whenever a low resides on conductor 76. Therefore, it will be appreciated by those of ordinary skill in the art that the flip flop 71 acts to apply an output signal to the output thereof connected to conductor 77 which follows the input thereto on conductor 76 and thereby acts to regenerate mark information to a fixed logic level. Thus as each mark is read from the clock track being scanned by the clock track sensor means 46 and applied through the clock track level control 48F, highs representing mark information are applied in sequence through conductor 68F and reflected at the output of the AND gate 70 and the flip flop 71 whenever the AND gate 70 is enabled by a high level on conductor 61 signaling the end of the threshold level established. Accordingly, as a high level on conductor 77 is indicative of mark information while a low level is indicative that clock information is not presently being read, during the reading of a typical data card 17 highs will be applied to conductor 77 interspaced by lows during which the reading of discrete bits of data in each of the various channels a – E may be anticipated.

The output of the flip flop 71 on conductor 77 is applied to one input of AND gate 73 whose output is inverted. The AND gate 73 whose output is inverted may take any of the well known forms of this conventional form of gating device which acts in the well known manner to produce a low at the output thereof only when both inputs thereto are high while presenting a high at the output thereof under all other sets of input conditions. The output of the AND gate 73 is connected to conductors 78 and 79 and acts as an input to the inverter 75 and through conductors 79 to supply clock signals for the channel A format conversion network indicated by the dashed block 50A. As will be seen below, a low signal is produced at the output of AND gate 73 each time one of the 17 clock marks on a conventional data card being scanned is read and such low levels are supplied through conductor 79 to clock data through a shifting configuration in the channel A format conversion network indicated by the dashed block 50A. Thus, 17 discrete clock pulses are ordinarily produced on conductors 78 and 79 and it is only the channel A format conversion network indicated by the dashed block 50A which is clocked thereby, the remaining channel format conversion networks 50B – 50E, as shall be seen below, being clocked by only the last 16 clock marks read. The purpose for clocking the channel A format conversion network 50A with 17 clock pulses, as shall be seen below, is that a special purpose bit is loaded thereinto and retrieved after seventeen clock pulses to indicate the complete reading of a card. The remaining channel format conversion networks 50B – 50E are concerned solely with legitimate mark and no mark information read from channels B – E on the data card and hence required only 16 pulses for clocking purposes. These 16 pulses are derived from the last 16 marks read from the clock tracks so that effectively, bit information is read and presented to the conversion networks 50B – 50E and subsequently clocked therethrough. The second input to the AND gate 73 is supplied on conductor 80 from an output of the output control control network indicated by the dashed block 51. As shall be seen below, a high level is present on conductor 80 to thereby enable AND gate 73 to complement the input thereto on conductor 77 until 17 clock pulses have been read; thereafter, the level on conductor 80 goes low to thereby disable the AND gate 73 and hence prevent the further application of clock pulses to the shift registers within the channel format conversion network 50A. It should be noted however, that should additional clock pulses, more than seventeen be present on a data card being scanned due to the improper preparation of the card or the like, such additional clock pulses will be supplied to the output control network indicated by the dashed block 51 as the output of the flip flop 71 is supplied thereto, as further discussed below, through the conductor 79.

The output of the AND gate 73 is applied through conductor 78 to the input of inverter 75. The inverter 75 acts in the conventional manner to produce a high at the output thereof, connected to conductor 80, whenever the input supplied thereto is low while providing a low output on conductor 80 whenever a high input is provided at the output of AND gate 73. Therefore it will be appreciated by those of ordinary skill in the art that whenever a low is present at the output of the AND gate 73, representing the reading of a clock mark when the AND gate 73 is enabled, as aforesaid, a high level will be present at the output of inverter 75. The output of the inverter is applied through conductor 80 to one input of AND gate 74 whose output is inverted and through conductor 81 to an input of flip flop 72.

The AND gate 74 may take the same form as AND gate 73 and thus acts to provide a low level at the output thereof connected to conductor 82 whenever both of the inputs thereto are high while providing a high level at the output thereof for all other sets of input conditions. The output of the AND gate 74 is employed to clock information through the serial to parallel conversion apparatus present in the channel format conversion networks 50B – 50E and is also employed for resetting purposes within all of the channel format conversion networks 50A – 50E and for these purposes is applied to the channel format conversion networks 50A – 50E through the conductors 82 and 83 as plainly illustrated in FIG. 2.

The clock pulses applied to the channel format conversion networks 50B – 50E, as aforesaid, are arranged so that only low levels representing clock pulses are applied for the last 16 clock marks read in the clock channel so that, in effect, the initial clock pulse read is skipped even though the same is applied through conductor 79 to the channel format conversion network 50A associated with channel A information. The skipping of the initial clock pulse read from each card scanned is effected through the operation of the flip flop 72. More particularly, the flip flop 72, which may take any of several well known forms of this device, has the setting input thereof connected to the output of the inverter 75 through conductor 81 while the reset input thereto is connected to the output of the monostable flip flop 53 through conductors 60. The Q or directed output of the flip flop 72 is connected through conductor 84 to a second input of AND gate 74 and in addition, as will be further described above, is connected through conductor 84 to an input of the channel A format conversion network 50A where it serves to establish an initial high or one condition which is shifted into to a serial to parallel conversion network upon the appearance of the initial clock pulse read from the clock pulse track. Additionally, the complemented output of the flip flop 72 is connected through conductor 85 to an input of the output control network indicated by the dashed block 51 for counting purposes.

If the operation of the monostable flip flop 53 is recalled, it will be appreciated that a high level is placed on conductor 60 for a 20 millisecond interval upon the detection of the leading edge of each card scanned to thereby establish a threshold setting interval. This same high level applied to the reset input of flip flip 72 causes this flip flop to be placed in a reset condition whereupon a low level is established on output conductor 84. Thus, when the first clock pulse is read from a data card being scanned the low level applied to conductor 78 and 79 results in a high level at the output of the inverter 75 which in turn is applied to the first input to AND gate 74 on conductor 80. However, as the output of flip flop 72 is in a reset conditions and hence is low, AND gate 74 is not enabled and no low level will be applied to the output thereof connected to conductor 82. The high level present at the output of inverter 75 is applied to the clock input of flip flop 72 through conductor 81 and hence when the first clock pulse read from the card returns low it will cause the flip flop 72 to be placed in a set condition whereupon a high level is then applied to conductor 84 to prime the input of AND gate 74 so that each succeeding clock pulse read, results in the application of a low to conductor 82, which is connected to the output OF AND gate 74. Thus, after the first clock pulse read from a data card has been employed to set the flip flop 72 and hence prime the lower input of AND gate 74 connected to conductor 84 each succeeding high input applied to conductor 80, the last 16 clock marks in a clock track, will result in a low or clock pulse being applied to conductor 82 which thereby serves as clocking information for each channel conversion network except that associated with channel A which, receives 17 clock pulses. Therefore, it will be appreciated by those of ordinary skill in the art that the clock network represented by the dashed block 49 acts, once it is properly enabled by the termination of the threshold interval to apply clock pulse representations in the form of hours to conductor 79 and hence to the channel format conversion network associated with channel A for each clock pulse read from a given clock track on a data card being scanned while similarly acting to apply the last 16 clock pulses read to the remaining channel format conversion networks 50B – 50E through conductor 82. Additionally, as will be described below, selected data is applied for control purposes to the output control network indicated by the dashed block 51.

The channel A format conversion network indicated by the dashed block 50A comprises a flip flop 88, an AND gate 89 whose output is inverted, first and second shift register means 90 and 91 and first and second multiplexer means 92 and 93. The flip flop means 88 may comprise any of the well known conventional forms of bistable flip flop devices which act in the well known manner to toggle in response to a high level applied to the set input thereof and reset in response to the application of a low level to the reset input thereof. The set input of the flip flop 88 is connected to the output of the channel A level control network indicated by the dashed block 48A through conductors 68A and hence if the operation of the channel A level control network is recalled, it will be appreciated by those of ordinary skill in the art that a high level is applied to conductor 68A each time a mark bit location in column A of a data card being scanned is read while a low level is applied to conductor 68A each time no mark or blank bit location is read. Therefore, it will be appreciated that each time a data card is read, a sequence of 16 bits of information will be applied to conductor 68A wherein a high level represents mark information and low levels represent no mark information. The reset input to the flop flop 88 is connected through conductors 83 and 82 to the output of AND gate 74 within the clock control network indicated by the dashed block 49. Therefore, if it is recalled that a low level is applied to conductors 82 and 83 at the output of AND gate 74 each time one of the last 16 clock marks of the clock track read is scanned, and that each of these clock marks is disposed so as to follow in relative scan location the appearance of a bit location in the column being scanned, it will be appreciated that the input conditions on the flip flop 88 are such that the data bit in the form of a high representing mark information or a low representing no mark information is applied to conductor 68A and is immediately followed by the application of a low level to conductor 83 to reset the condition of the flip flop 88. Thus, it will be appreciated by those of ordinary skill in the art, that as each bit of data from column A is read, such bit of data is employed to either set the flip flop 88 or retain it in its reset condition and thereafter a clock pulse from the output of the AND gate 74 is applied through conductors 82 and 83 to reset condition of the flip flop 88 in anticipation of the scanning of the next bit of information from the data card being read. Although resetting is here accomplished as a function of the output of AND gate 74, it will be readily appreciated that such resetting may be achieved as a function of the output of AND gate 73 which is applied to conductor 79.

The complemented output of the flip flop 88 is applied through conductor 94 to an input of the AND gate 89 whose output is inverted as aforesaid. The AND gate 89 may take the conventional format described in association with AND gates 73 and 74 and hence acts to provide a low level at the output thereof when both of the inputs thereto are high while producing a low level for all other input conditions applied thereto. Thus, as the complemented output of the flip flop 88 is connected through conductor 94 to one input of the AND gate 89, it will be appreciated by those of ordinary skill in the art that a low level is applied thereto whenever a mark bit location has been read while a high level is applied to conductor 94 whenever an unmarked or blank level for a bit location is scanned. The second input to AND gate 89 is connected through conductor 84 to the output of flip flop 72. The operation of the flip flop 72 was described in relationship to a gating arrangement for AND gate 74 which insured that the first clock applied was not applied as a clocking level on conductor 82 while each succeeding clock pulse read resulted in the application of a low clock pulse level to conductor 82. Furthermore, it will be recalled that this was achieved via a resetting of flip flop 72 by the high level applied to conductor 60 when a threshold setting interval is established and that the first clock pulse read results in the application of a high level to conductor 81 to thereby cause the output of flip flop 72 connected to conductor 84 to go high. This means, that a low level will reside on conductor 84 and hence, the input of AND gate 89 connected thereto until the first clock pulse from the clock track has been read whereupon the level on conductor 84 goes high. As the output of AND gate 89 will be high whenever a low level is applied to either of the inputs thereto, it will be appreciated by those of ordinary skill in the art that the application of a low level on conductor 84 effectively acts to set the output of AND gate 89 at a high level until the first clock pulse is read and thereafter, the output of the AND gate 89 will represent the complement of the level on conductor 94. Accordingly, if it is recalled that mark information read is reflected at the output of flip flop 89 as a low while blank or no mark information is reflected at the output thereof on conductor 94 as a high, it will be seen that the operation of the flip flop 72 acts to effectively set an initial mark bit condition into AND gate 89 until the first clock pulse is read whereupon the output of the AND gate 89 will then follow the mark or no mark condition read by placing a high level at the output thereof on conductor 95 for mark information and a low level on conductor 95 for no mark information. The output of the AND gate 89 is applied through conductor 95 to the data input of the first shift register means 90.

The first and second shift register means 90 and 91 may each take the conventional form of an 8 bit serial in, parallel out shift register such as are well known to those of ordinary skill in the art. For instance, Ser. No. 74164 shift register chips, as conventionally available from Texas Instrument Corporation, may be employed as can any other standardized 8 bit shifting configuration. The first and second shift register means 90 and 91 act in the conventional manner to shift a bit of information applied to the D input in response to each clock pulse applied to the clock (CK) input thereof and may be cleared upon the application of a high clear or reset level thereto. The eighth output conductor ($B_8$) of the first shift register 90 is connected in the well known manner to the D input of the second shift register means 91 through conductor 86 so that in effect a 16 bit serial in, parallel out shifting configuration is formed.

The clock input to each of the first and second shift register means 90 and 91 are connected, as aforesaid, through conductor 79 to the output of AND gate 73 which applies, as will be recalled, a low going clock pulse thereto for each of the 17 clock pulses read from the clock track scanned. Therefore, if it is recalled that a mark or high level output is initially set into the AND gate 89 prior to the reading of the first clock pulse and thereafter 16 bits of information are read from column A interspaced by the application of clock pulses to conductor 79, it will be appreciated, assuming that bit location 16 is read first and bit location 1 is read last, that 17 bits of information will be shifted through the serially connected first and second shift register means 90 and 91 and upon the completion of the reading of the column of information and the application of the associated seventeen clock pulses, bit 16 from the data card will reside on output $B_{16}$ of the second shift register configuration 91 while, bit 1 representing the first bit location in column 1, will reside in bit location $B_1$ of the shift register 90. Furthermore, the initial one loaded into AND gate 89 prior to the scanning of information will have been shifted out of bit location $B_{16}$ and applied to conductor 96 for insertion into the output control network indicated by the dashed block 51. Accordingly, after the complete column in the data card being scanned has been read, the first bit scanned will be located in storage location $B_{16}$ within the second shift register means 91 while the first bit read is located in bit position $B_1$ of the first shift register means 90 and intervening bit locations read are stored in bit locations $B_2 - B_{15}$ of the first and second shift register means 90 and 91. It will be appreciated that mark information is stored as a high level in the shift register means 90 and 91 while unmarked bit locations are represented by lows within the shifting configuration formed. The clear input to the first and second shift register means 90 and 91 are connected through conductors 97, 98, and 99 to the output of the monostable flip flop 53 and hence, as will be readily appreciated by those of ordinary skill in the art, the condition of the first and second shift register means 90 and 91 are established in a clear condition each time the leading edge of a new card to be scanned is detected.

The outputs of the first and second shift register means 90 and 91 are connected in parallel to the inputs of the first and second multiplexer means 92 and 93 in such manner, as illustrated in FIG. 2, that outputs $B_1 - B_4$ of the first shift register means 90 are connected to the first four inputs of the first multiplexer means 92 while the first four outputs ($B_9 - B_{12}$) of the second shift register means 91 are connected to the second four inputs of the first multiplexer means 92. Similarly, the second four outputs ($B_5 - B_8$) of the first shift register means 90 are connected to the first four inputs of the second multiplexer means 93 while the second four outputs ($B_{13} - B_{16}$) of the second shift register means 91 are connected to the second four inputs of the second multiplexer means 93. The first and second multiplexer means 92 and 93 may take the form of conventional eight input, four output multiplexer devices such as SN74157 data selectors conventionally available from the Texas Instrument Corporation, which act in the well known manner to accept eight input levels at the inputs thereof and apply either the first or second four of such inputs to the outputs thereof depending upon the selection level applied to a select input. From the manner in which the outputs of the first and second shift register means 90 and 91 are coupled to the inputs of the first and second multiplexer means 92 and 93, it will be apparent to those of ordinary skill in the art that depending upon the level applied to the selection input of the first and second multiplexer means 92 and 93, either the lower or upper eight bits will be applied to the multiplexer means connected to conductors $D_1 - D_8$.

The select inputs of the first and second multiplexer means 92 and 93 are connected to conductor 100 and results from a Process A Lower Or Upper Eight Bit Signal which is developed and explained in connection with the circuitry illustrated in FIG. 3. Here, however, it is sufficient to recall that even though 16 bits of information are present in each column, the instant invention acts to process channel information on the basis of 8 bits in parallel at a time and hence, when a high level is applied to conductor 100, bits $B_9 - B_{16}$ as read from channel A and loaded into the second shift register means 91 will be present on output conductors $D_1 - D_8$ of the first and second multiplexer means 92 and 93 while when a low level resides on conductor 100 the upper 16 bits read i.e., bits $B_1 - B_8$ as loaded into shift register means 90 will be applied to the outputs $D_1 - D_8$ of the first and second multiplexer means 92 and 93. The eight parallel outputs of the first and second multiplexer means 92 and 93 are applied in parallel, in accordance with the parallel channel organization employed by the instant invention to the channel A mark /care memory and compare network illustrated as block 3 in FIG. 1 and more fully detailed in conjunction with FIG. 4. Thus, it will be appreciated by those of ordinary skill in the art that the channel A format conversion network indicated by the dashed block 50a acts to accept mark and no mark information read in a serial format from channel A of a data card being scanned, to establish a one bit prior to the serial sequence of such mark and no mark information and to transform such serial information into a parallel format which may be further applied as two 8 bit parallel sequences to additional channel A selection circuitry while signaling a complete reading of seventeen clock marks or a card by the application of a high level to the output control network indicated by dashed block 51 on conductor 96.

The channel B format conversion network indicated by the dashed block 50B is identical to the channel format conversion networks 50C – 50E employed in the format conversion of mark and no mark information obtained from reading 16 bit data from columns C – E on a data card being scanned. For this reason, only the channel B format conversion network has been illustrated in detail while the apparatus employed for channels C – E have been shown in simple block format. It should be appreciated, however, that the outputs of channels C – E, though only generally indicated in FIG. 2, are in the same multiplexer parallel format described in conjunction with channels A and B and that two sequences of 8 bit parallel information are suppllied therefrom to independent mark/care memory and compare apparatus associated with that channel. The channel B format conversion network indicated by the dashed block 50B is similar in structure to that employed within the channel A format conversion network indicated by the dashed block 50a except this network, like networks 50c – 50E, does not concern itself with the loading of an initial marker bit to indicate when 17 clock pulses have been read and for this reason concerns itself solely with the shifting of bit information read from the 16 bit locations in the column of data being scanned. Therefore, less data manipulation is required and clock information for only the last 16 clock marks read are supplied thereto through conductor 82 connected to the output of AND gate 74 as described above.

The channel B format conversion network indicated by the dashed block 50B comprises a flip flop 103, first and second shift register means 104 and 105 and first and second multiplexer means 106 and 107. The flip flop 103 may take the same form as the flip flop 88 described in conjunction with the channel A format conversion network indicated by the dashed block 50A and in similar manner thereto, the set input thereof is connected to conductor 68b so as to receive mark and no mark information from the output of the channel B level control network 48b in the form of highs and lows respectively. In addition, the reset input thereto is connected to conductor 83 and thus the flip flop 103 is supplied with a resetting pulse at an interval after which each bit read should have been applied to the set input thereof, it being noted that only the last 16 clock pulses are applied to conductors 82 and 83 and hence to the reset input of the flip flop 103. In the channel B format conversion network indicated by the dashed block 50B a direct output of the flip flop 103 is employed so that highs representing mark information and lows representing unmarked bit locations as applied to conductor 68B are directly reflected at the output of the flip flop 103 rather than at an inverting output thereof as was the case for channel A. The output of the flip flop 103 is connected to the D input of the first shift register 104 and hence highs representing mark information read from the B column of the card being scanned and lows representing unmarked bit locations are directly loaded in series therein. The first and second shift registers 104 and 105 are each eight bit serial in, parallel out devices of the same type described in connection with shift register means 90 and 91 above and the last output of the first shift register 104 is connected to the D input of the second shift register 105 to thereby form a 16 bit serial in, parallel out shifting configuration. In addition, the clock input to the first and second shift register means 104 and 105 are connected through conductor 82 to the output of AND gate 74 and hence only receive clock pulses in the form of a low for the last 16 marks in the seventeen mark clock track read. However, in regard to actual data representing mark and no mark information on the card, the shifting thereof as highs and lows through the 16 bit shifting configuration formed by the shift register means 104 and 105 is virtually identical to that described in connection with the channel A format conversion network and will not be reiterated here. Similarly, the first and second multiplexer means 106 and 107 may take the same format as the first and second multiplexer means 92 and 93 above and are interconnected to the output of the 16 bit shifting configuration formed in the same manner as was described above for the first and second multiplexer means 92 and 93 employed in the channel A format conversion network indicated by the dashed block 50A. In addition, it will be appreciated that the same selection information applied on conductor 100 to the first and second multiplexer means 92 and 93 is applied to establish a selection of either the upper or lower 8 bits read and is applied to the selection input of the first and second multiplexer means 106 and 107 through the conductor 109. Thus, when a high level is applied to conductor 109 bits $B_9$–$B_{16}$ as loaded into the second shift register means 105 will be applied to the outputs $D_1$–$D_8$ of the first and second multiplexer means 106 and 107 while when a low level resides on conductor 109 bits $B_1$–$B_8$ as loaded into the first shift register means 104 will be applied to the outputs $D_1$ – $_{D8}$ of the first and second multiplexer means 106 and 107. Accordingly, the channel B format conversion network acts to receive mark and no mark information read from column B of a data card being scanned in a serial format and to transform such serial format into a parallel format which may be applied into groups of eight bits in parallel to the channel B mark/care memories and compare means 4 illustrated in FIG. 1. It should further be noted, that the same select input is applied to all of the plurality of channel format conversion networks 50A - 50E so that when a high is applied thereto, bits $B_9$ – $B_{16}$ are applied from each of the plurality of format conversion networks 50A - 50E to their respective channel mark/care memory and compare means while when a low level is applied thereto, bits $B_1$ – $B_8$ are applied from each of the channel format conversion networks 50A - 50E to their associated channel mark/care memory and compare means.

The output control network indicated by the dashed block 51 acts to perform a plurality of housekeeping tasks for the instant invention and to provide a start memory gating signal so as to actuate the read/write memory and address selection control means 2, as shown in FIG. 1, only at such time as the logic can be assured that all (17) clock marks on a data card being scanned have been read and the data card being scanned is otherwise appropriate for the imposition of selection processing to the mark and no mark information read therefrom. The output control network indicated by the dashed block 51 comprises first and second flip flops 111 and 112 arranged in a first counting configuration, third and fourth flip flops 113 and 114 arranged in a second counting configuration and a plurality of AND gates 116 – 119.

The first and second flip flops 111 and 112 may comprise conventional flip flop configurations adapted to store an input level applied thereto whenever a clock is supplied and to reset upon the application of a resetting level thereto. The reset inputs to each of the first and second flip flops 111 and 112 are connected to conductors 98, 99 and 60 to the output of the monostable flip flop 53 and hence, as will now be recognized, are reset each time the leading edge of a card to be scanned is detected and a threshold setting interval established. Furthermore, such reset level as is applied to conductors 60, 99 and 98 is maintained until the 20 millisecond threshold level established by the monostable flip flop 53 is terminated. The clock input to the first and second flip flops 111 and 112 is supplied through conductors 121 and 79 from the output of the flip flop 71. Thus it will be appreciated from the previously described operation of flip flop 71 that a high or clock level is supplied to conductor 121 each time a clock mark from the clock track is read by the clock track senser and hence a high level will be applied to conductor 121 to clock information into the first and second flip flop 111 and 112 regardless of the number clock pulses which may be scanned on a given data card.

The D input of the first flip flop 111 is connected through conductor 96 to the sixteenth parallel output of the second shift register 91 associated with channel A. Therefore, if the operation of the channel A format conversion network indicated by the dashed block 50A is recalled, it will be appreciated that a high or mark level is inserted into the AND gate 89 prior to the application of any mark information thereto and this high level is shifted out of the sixteenth output of the second shift register 91 upon the application of the seventeenth shift pulse thereto from the output of AND gate 73. This high level will be applied to the D input of the first flip flop 111 and upon the appearance of the seventeenth clock pulse as applied to conductor 121, the Q output of the first flip-flop 111, connected to conductor 122 will go high while the $\overline{Q}$ or complementary output thereof will go low. The Q output of the first flip-flop 111 is connected through conductor 122 to the input of the second flip flop 112 while the $\overline{Q}$ output of the first flip flop 111 is connected through conductor 80 to an input of the AND gate 73 as aforesaid. Therefore, upon the reading of seventeen clock pulses the Q output of the first flip flop 111 will go high, the $\overline{Q}$ output of the second flip flop 112, as connected to conductor 123 will stay high, while the $\overline{Q}$ output of the first flip-flop 111 will go low to apply a low or disabling level to conductor 80 to prevent the further application of negative going clock pulses to the output of the AND gate 73 and hence disable the clock input of the shifting configuration formed by the first and second shift registers 90 and 91 employed in the channel A format conversion network indicated by the dashed block 50A. Thus, when seventeen clock pulses have been read the Q output of flip flop 111 will be high as will be the $\overline{Q}$ output of the second flip flop 112. However, if either more or fewer clock pulses have been scanned, the connection of the Q output of the first flip flop 111 through conductor 122 to the D input of the second flip flop 112 will cause the output conditions for the $\overline{Q}$ outputs of the first and second flip flops thus connected in a two bit counting configuration to vary. The Q output of the first flip flop 111 is connected through conductor 124 to a input of AND gate 115 while the $\overline{Q}$ output of the second flip flop 122 is connected through a conductor 123 to a second input of the AND gate 115. The AND gate 115 may take any of the well known forms of this conventional logic device which acts to provide a high level output only when both of the inputs thereto are high while providing a low level output under any other set of input conditions. Therefore, it will be readily appreciated by those of ordinary skill in the art that the output of AND gate 115 will go high only when 17 clock pulses have been read from the data card being scanned as no other set of appropriate input conditions on AND gate 115 may exist for either a greater or fewer number of clock pulses being applied to the two bit counting configuration formed by the first and second flip flops 111 and 112.

The output of the AND gate 115 is connected through conductor 125 to one input of AND gate 116. The AND gate 116 may take the same form as the AND gate 115 and hence acts in the well known manner to produce a high output only when both inputs thereto are high. The input applied thereto on conductor 125 is indicative that seventeen clock pulses from the clock track of the data card presently being scanned have been read and hence such a data card is appropriate for selection processing within the purview of the exemplary embodiment of the instant invention presently being set forth. The second input to AND gate 116, as shall be seen below, in an enabling input which is produced for a 1.5ms interval upon a detection of the trailing edge of the card being scanned. Thus, when seventeen clock marks have been read from the clock track of a data card being scanned, a start memory cycle output in the form of a high level at the output of AND gate 116 is produced for a 1.5 ms interval upon the leaving of the card being scanned from the location of the scanning station. This start memory cycle signal is applied as an actuating signal to the write/read memory address and selection control circuit generally illustrated as block 2 in FIG. 1 and described in detail in conjunction with FIG. 3 to initiate a memory selection cycle. It will be appreciated by those of ordinary skill in the art that a failure to read 17 clock marks could be provided as a visual indication to an operator to thereby indicate that a card subject to a selection process has not been scanned.

The third and fourth flip flops 113 and 114 may take precisely the same form as the first and second flip flops 111 and 112 described above, and in addition, are connected in the same two bit counting configuration described therefor. Both the reset inputs and the clock inputs to the third and fourth flip flops 113 and 114 are commonly connected to the clocking and resetting input conductors for the first and second flip flops 111 and 112 and hence, are reset each time a threshold setting level is established and clocked from the output of flip flop 71 each time a clock mark from the clock track being scanned is read. The D input to the third flip flop 113, however, is connected through conductor 85 to the inverting or $\overline{Q}$ output of the flip flop 72 while the D input to the fourth flip flop 114 is connected through conductor 127 to the $\overline{Q}$ or noninverting output of the third flip flop 113.

The function of the second counting arrangement formed by the third and fourth flip flops 113 and 114 is to provide certain convenience indicators for operators employing the instant invention in electrophotographic printing apparatus such as is described in U.S. Pat. No. 3,700,324, in a sorting operation or the like. More particularly, when data cards are selectively sorted according to the teachings of the instant invention, it is desired to permit the alternative use of inappropriate data cards in an all select mode of operation and in addition, in selection mode employing the coded cards described herein, it is desired to count each data card processed while permitting the insertion and detection of specialized deck separator cards without counting or sorting. Thus, in processing apparatus employing the instant invention, it is frequently desired to count every card to be processed for selection purposes as long as such card may be classified according to the teachings of the instant invention or through an all select mode of operation such as is described in U.S. Pat. No. 3,700,324. However, when large deck of cards including, for instance, label information is loaded, separator cards are often interspaced therein to designate different portions of the deck. For example, separator cards might be inserted in a large deck to designate different zip code regional centers or other separator cards might be inserted to define by color or otherwise, places where different decks of data cards have been merged.

According to the instant invention, different separator cards may be coded by employing one or two clock marks in the clock tracks thereof and an output signal will be produced whenever such cards are detected. This output signal may be provided to inhibit the counting of the card being fed as it does not represent a legitimate data card for selection purposes and in an all select mode of operation, there would be no legitimate document information thereon to be printed and hence the printing thereof should be inhibited even though the selection apparatus according to the instant invention is not operative in this mole. Two types of separator designations are here employed; however, it will be appreciated by those of ordinary skill in the art that additional separator card accommodations may be added by increasing the number of flip flops within the second counter formed by the third and fourth flip flops 113 and 114 or alternatively, this feature of the instant invention could be deleted if not desired. However, in the exemplary embodiment of the instant invention, data cards having a single clock mark therein are designated as break 1 data cards and data cards having two clock marks in the clock track thereof are designated break 2 data cards. Therefore, it will be appreciated by those of ordinary skill in the art, that whenever a break one of break two output level is produced, the incrementing of the counter at the operator's console which counts cards may be inhibited, an indication that one of two types of separator cards has been scanned may be provided, and if an all select mode of printing has been established, the printing of information from the two types of separator cards may be inhibited.

The description of the operation of the flip flop 72 set forth above renders it manifest that the Q output thereof applied to conductor 84 will be low until the first clock pulse has been scanned and thereafter, the Q output goes high and stays high until the flip flop 72 is reset by the next threshold setting interval for a new data card to be scanned. This means that the $\overline{Q}$ output of the flip flop 72 which is connected through conductor 85 to the D input of the third flip flop 113 will be high until the first clock pulse is read and applied to the clock input thereto through conductor 79 and thereafter conductor 85 will go low and stay low for the duration of the scanning of the clock track on the card presently being read. Thus, a high on the input of the third flip flop 113 will cause the third flip flop 113 to be set upon the appearance of the first clock pulse and this high level will be applied through conductor 127 to the D input of the fourth flip flop upon the appearance of the second clock pulse scanned. Thereafter, for any succeeding clock pulses read, the level will be shifted out and lost and both the Q outputs of the third and fourth flip flops 113 and 114 will be low for any number of clock pulses scanned exceeding one or two. If only one clock pulse is read, the output of the third flip flop 113 as present on conductor 127 will be high and will be supplied through conductors 128 and 129 to one input of AND gate 117. The AND gate 117 may take the same form as AND gate 116 and hence will produce a high output level indicative of a break one condition or a separator card having only a single clock pulse thereon when it is gated on by the 1.5ms output pulse supplied to the second input thereof on conductor 126, as aforesaid. Similarly, whenever a data card is scanned having only two clock pulses thereon, the output on conductor 127 will be low, however the Q output of the fourth flip flop 114 as connected to conductor 130 will be high. This high level is supplied through conductors 130 and 131 to one input of AND gate 118. The AND gate 118 may take the same form as the AND gate 116, described above and hence, whenever a data card having only two clock marks is detected, the output of AND gate 118 will go high whenever it is enabled by a 1.5ms output pulse supplied to the second input thereof on conductor 126. Thus, when a data card having two clock marks in the clock track thereof is detected, a break two output level is established at the output of the AND gate 118.

In addition, both the Q outputs of the third and fourth flip flops 113 and 114 are connected through conductors 128 and 130 to the first and second inputs of an OR gate 132 whose output is inverted. The OR gate 132 acts in the well known manner to produce a high at the output thereof connected to conductor 133 only when both of the inputs thereto are low. Therefore, it will be appreciated by those of ordinary skill in the art that a high level is provided on conductor 133 to an input of AND gate 119 only when a data card has been scanned with something other than 1 or 2 clock pulses thereon. The AND gate 119 may take the same form as AND gates 116 - 118 and hence will gate a high indicating an all select operation is appropriate whenever the second input of AND gate 119 connected to conductor 126 is enabled for the 1.5ms output enabling interval established upon the detection of the trailing edge of each card read as discussed below. The all select level established at the output of AND gate 119 may be employed as an enabling signal for an all select operation initiated by an operator in a manner set forth in U.S. Pat. No. 3,700,324.

The conductor 126 employed to supply an enabling level to each of AND gates 116 - 119 is connected to the output of the card detector means 45 through a timing network comprising an inverter 135, an RC network formed by resistor 136 and capacitor 137 and an AND gate 138. If the operation of the card detector means 45 is recalled, it will be appreciated that a high level is established on conductor 152 whenever a card edge is detected and such level is maintained until the trailing edge of the card passes the card detector means 45 located at the scanning station. Whenever a high level is present on conductor 52, the capacitor 137 within the RC network formed stores such high level and the parameters of the resistor 136 and capacitor 137 are such that the capacitor 137 will discharge in an interval of approximately 1.5ms whenever a low level is establishd on conductor 140. Therefore, it will be appreciated by those of ordinary skill in the art that when the trailing edge of the card passes the scanning station, the low level now established on conductor 52 is transmitted through conductor 139 and through the inverter 135 to result in a high level at one input of AND gate 138. The low level supplied to conductor 140 however, will not immediately result in a low level being established on conductor 142 which forms the second input to AND gate 138 as it will take an interval of approximately 1.5ms for the capacitor to discharge from a high to the low state established by the passage of the trailing edge of the card on conductor 139. Therefore, during the interval required for the discharging of the capacitor 137, a high level is present on both conductors 141 and 142 which serve as inputs to the AND gate 138. Under these conditions, a high level will be provided at the output of AND gate 138 on conductor 136 for an interval of 1.5ms. Thereafter, the low is placed on conductor 127 to again disable the AND gates 116 - 119. Thus it will be seen that the network formed by inverter 135, the RC network formed by resistor 136 and capacitor 137 and the AND gate 138 establish an enabling or gating network for AND gates 116 - 119 so that for a 1.5ms interval after the data card being scanned has left the scanning station these gates are enabled. During this interval the start memory cycle signal provided at the output of AND gate 116 is applied to the logic or alternatively one of the housekeeping signals provided by AND gates 117 - 119 is gated thereto.

In the operation of the scanning, control and conversion apparatus depicted in FIG. 2, it will be seen that as each card is fed past the scanning station, whether such cards comprise program cards adapted to store information within the various memories present within each of the channel mark/care memory and compare means 3 - 7 and the control memory and decision means 8 or coded data records to undergo a selection operation, the leading edge of each card fed will be detected upon its arrival at the scanning station by the card detector means 45. As the leading edge of each card fed is detected, the output of the card detector means 45 will go high to trigger the monostable flip flop 53 and thus cause this one shot to apply a positive level on conductor 62 for a 20ms threshold setting interval. During this threshold setting interval, the plurality of level control networks 48A - 48F associated with the clock track and each of the five channels of data to be processed will establish a threshold upon the appropriate input to the threshold device 67 which corresponds to the ambient light or blank level on the card to be scanned. In addition, the positive level established during the threshold setting interval on conductor 60 will cause the flip flops 72, 111, 112, 113, and 114, as well as the first and second shift register means 90 and 91 present in the channel A format conversion network indicated by the dashed block 50A to be placed in a reset or clear condition. Upon termination of the threshold setting interval established by the monostable flip flop 53, the one shot automatically resets to allow data to be read and processed for each of channels A - E and the clock track. If it is assumed that a card appropriate for processing within the instant invention is being employed, it will be seen that the first information bit scanned will be the first clock mark present in the clock track as such clock mark precedes the location of any data bit locations in any of the five columns associated with channels A - E. As the AND gate 70 has now been enabled by the resetting of the monostable flip flop 53, the first clock mark read will be gated through AND gate 70, the flip flop 71, and the AND gate 73 to cause the application of a negative going clock pulse through conductor 79 to the first shift register means 90 within the channel A format conversion network indicated by the dashed block 50A. Furthermore, it will be recalled that the resetting of flip flop 72 during the threshold interval established will cause a high level marker bit to be inserted by the flip flop 72 into the AND gate 89 and hence the first application of a negative going clock pulse to conductor 79 will cause this high level marker bit to be gated into the first stage of the first shift register means 90 for the purpose of subsequently indicating when 17 clock pulses have been read.

The reading of the first clock pulse will also cause a high from the complemented output of flip flop 72 to be loaded into the first stage of the two bit counter arrangement formed by the third and fourth flip flops 113 and 114; however, the reading of the initial clock mark in the clock track being read will not result in the application of a negative going clock pulse to any of the shifting configurations within the format conversion networks associated with channels B - E as such clock pulses as are applied thereto result at the output of the AND gate 74 which is not responsive to the first clock pulse read due to the operation of the inverter 75 and the flip flop 72 as described above. Thereafter, the first bit location in channels A - E will be read and applied to the D input of the first shift register means present within the plurality of channel format conversion networks 50A - 50E in such manner that a marked bit location will result in a high being applied to the D input thereof while a blank or unmarked bit location will result in the application of a low level thereto. Thereafter, the second clock mark read will result in an application of a negative going clock pulse to each of the shift register configurations within the channel format conversion networks 50A - 50E so that, with regard to channels B - E, the first bit location read will be the first bit of data inserted therein while in channel A such first bit is preceded by the high level marker bit loaded thereinto upon the reading of the first clock mark on the data card being scanned.

This operation will continue until all of the 16 bits in each column of data being read have been scanned and shifted into the associated shifting configuration for each channel by an intervening clock pulse applied to such shifting configuration at instances calculated to follow the reading and application to the D input of each shift configuration of the mark or no mark information scanned. After the 16 bit locations from each channel being scanned have been read and the 17 clock pulses present in the clock track have been scanned and processed, each of the shifting configurations within the channel format conversion networks 50A - 50E will have highs and lows representing mark and no mark information, respectively, inserted into the 16 bit storage locations present therein. In addition, as will be recalled, the marker bit will have been clocked out of the last stage of the second shift register means 91 and inserted into the first stage of the two bit counting arrangement formed by the first and second flip flops 111 and 112 wherein such insertion to the D input has been achieved through conductor 96 and loaded when the last clock pulse is read. When the marker bit is established within the first flip flop 111, the complemented output thereof will go low to disable AND gate 73 and hence prevent the further application of clock pulses through conductors 79 or 82 to any of the shifting configurations within the channel format conversion networks 50A - 50E. However, any additional clock pulses which may be erroneously present on the card being scanned will appear at the output of the flip flop 71 and applied through conductors 86 and 121 to the first and second counting configurations formed by the flip flops 111-114.

If it is assumed that only 17 clock pulses are in the clock track of the data card being scanned, the sixteen bits read from each of the five columns on the card will be appropriately loaded into the 16 bit locations of the shift register configurations associated with each channel in the channel format conversion networks 50A - 50E and hence will be applied in the manner illustrated in FIG. 2 through the sixteen inputs of the first and second multiplexer means 92 and 93 present in each of such format conversion networks for subsequent gating in two parallel passes. Furthermore, if only 17 clock marks have been read, the input conditions on AND gate 115 will be appropriate to apply a high level input to the input of AND gate 116 connected to conductor 125. Therefore, when the trailing edge of the card being scanned is detected, the 1.5ms enabling signal established by the gating network formed by the inverter 135, the RC network and the AND gate 138 will enable the AND gate 116 to apply a high level representing a start memory cycle to the output thereof for application to the write/read memory address and selection control network 2 as shown in FIG. 1.

The write/read memory address and selection control network 2 will therefore apply appropriate signals to the conductors 100 and 109 associated with each of the multiplexing networks formed by the first and second multiplexer means in each of the channel format conversion networks 50A - 50E to cause the data read in each channel of the data cards scanned to be applied to the mark/care memories and compare means 3 - 7 associated with that channel in two passes wherein eight bits per pass are applied in parallel thereto. Of course, should either more or fewer than 17 clock marks be read, the AND gate will not be appropriately enabled and no start memory cycle signal will be produced thereby to cause the further processing of the bit information read and transformed into a parallel format while being separately maintained on a per channel basis. Furthermore, should a specialized coded card having one or two clock marks thereon read, an appropriate break 1 or break 2 separator card signal will be generated by one of the AND gates 117 or 118 and if no specialized card having either one or two clock marks thereon is read an all select signal will be generated at the output of AND gate 119 during the 1.5ms gating interval established so that an all select operation initiated by an operator will be properly enabled.

Thus it will be seen that the scanning, control and conversion apparatus depicted in FIG. 2 acts to read each bit location in each of the five columns of data present on a data card being scanned and to transform each bit of data read in series therefrom into a parallel format by looking for the appearance of a bit of data intermediate pairs of clock marks in the clock track of a card being processed. Furthermore, provisions are made for indicating when 17 clock marks have been read and when an indication is provided that a card having the appropriate 17 clock marks thereon has been read, a start memory signal is provided to allow the write/read memory address and selection control network to cause the data read from each channel in a parallel format to be further applied to individual ones of the channel mark/care memories and compare means 3 - 7 associated therewith. Accordingly, it will be seen that regardless of whether a program or data card is being scanned, 16 bits of information from each are read, transformed into a parallel format and arranged for further gating in a parallel format through a two pass gating arrangement to the further channel gating networks employed within the instant invention. The write/read memory address and selection network employed to control and address the various memories employed within the instant invention so that further processing can be achieved for the column bit information arranged in a parallel format by the scanning, control and conversion apparatus illustrated in FIG. 2 is described in detail in conjunction with FIG. 3 while an exemplary one of the mark/care memory and compare means for each channel is disclosed in conjunction with FIG. 4.

WRITE/READ MEMORY ADDRESS AND SELECTION CONTROL NETWORK

Referring now to FIG. 3, there is shown an exemplary embodiment of memory address and selection control apparatus suitable for incorporation into the embodiment of the invention illustrated in FIG. 1 and more particularly, apparatus whose function achieves that required for the write/read memory address and selection control network indicated by the block 2 in FIG. 1. It will be recalled from the description of FIG. 1 that the write/read memory address and selection control apparatus acts to provide the timing, memory addressing, program number storage, and program-read control for the selection sequences which are performed in accordance with the instant invention. In brief, these functions are achieved by the action of the write/read memory address and selection control apparatus depicted in FIG. 3 establishing either a program mode of operation or a read mode operation for the various memory configurations employed within the channel mark/care memory and compare means 3 – 7 and the control memory and decision means 8.

In the program mode, data to be stored from the control program card, the care/don't care program card and the mark/no mark program card as read for each program selection sequence to be inserted as selectively gated from the channel format conversion networks 50A – 50E, as shown in FIG. 2, into the appropriate memory configuration therefor while an appropriate memory address for the program being inserted is also supplied by the write/read memory address and selection control apparatus illustrated in FIG. 3. In the read mode, data to undergo a selection process as read from the various cards undergoing scanning and stored in the channel format conversion networks 50A – 50E, is forwarded to the channel mark/care memory and compare networks 3 – 7, as shown in FIG. 1 while the memory configurations employed therein are addressed for interrogation purposes so that appropriate comparisons therefrom can be made. In addition, the memory configuration within the control memory and decision means 3 is also addressed so that further comparison operations may be performed therein. Furthermore, as it will be recalled that data read from each column or channel is forwarded through the system upon the basis of 8 bits in parallel, the timing associated with which 8 bits are forwarded is also achieved by the write/read memory address and selection control apparatus depicted in FIG. 3.

Turning now specifically to FIG. 3, the exemplary write/read memory address and selection control network illustrated therein comprises the program/read flip flop 150, an interrogation flip flop 151, pulse generator means 152, memory control counter means 153, program mode sequence counter means 154, program number counter means 155, a four bit latch means 156, comparator means 157, and a control output arrangement indicated by the dashed block 158. The program/read flip flop 150 may take the conventional form of a flip flop arrangement formed with AND gates or the like which acts in response to a low going level applied to the input thereof to be set and is responsive to a high level applied to the reset input to be placed in a reset condition. Whenever the program/read flip flop 150 is in its set condition, a high will be applied to the Q output thereof connected to conductor 159 while whenever the program/read flip flop 150 is in its reset condition, a high level will reside on the $\overline{Q}$ output thereof connected to conductor 160. As shall become apparent below, whenever a high level is on conductor 159 and hence, the program/read flip flop 150 is in its set condition, the exemplary write/read memory address and selection control apparatus depicted in FIG. 3 is placed in a program mode while whenever the program/read flip flop 150 is in its reset condition, the high level on conductor 160 initiates a read mode of operation wherein bit information from data cards being scanned is subjected to a programmed selection operation within the channel mark/care memory and compare networks 3 – 7 and the control memory and decision means 8. The set input to the program/read flip flop 150 is connected through conductor 161 to the output of a one shot or monostable multivibrator 162. The one shot 162 may take the form of a conventional monostable multivibrator which acts, in this case, to be set whenever the instant invention is energized and to produce a low output on conductor 161 for the duty cycle thereof and thereafter resets to a high output condition. The duty cycle exhibited by the one shot 162 may exhibit any convenient interval and for the purposes of the instant disclosure may be assumed to be a few hundred milliseconds. Therefore, as the one shot 162 is set whenever the instant invention is energized, to thereby place a low level on conductor 161 for a few hundred milliseconds, it will be seen that whenever the instant invention is energized, the program/read flip flop 150 will be placed in a set state to place the write/read memory address and selection control network depicted in FIG. 3 into a program mode of operation. This technique of placing the write/read memory address and selection control apparatus depicted in FIG. 3 into a program mode of operation whenever the instant invention is energized is necessary, because virtual memory configurations requiring the continuous application of power for the maintenance of storage are employed and hence the insertion of new data to be stored therein is required each time a start up sequence is initiated.

In addition, the input to the one shot 162 is connected to a switch 163 annotated "Program" which connects the input of the one shot 162 to ground. The switch 163 may take any conventional mechanical or electrical format well known to those of ordinary skill in the art and is provided so that an operator may initiate a program sequence in the write/read memory address and selection apparatus depicted in FIG. 3 without going through a new start up sequence. It will be appreciated by those of ordinary skill in the art that the closure of switch 163 results in a grounding and hence a setting of the one shot 162 whereupon a low level is again placed on conductor 161 which subsequently reverts to a high upon the resetting of the one shot. Whenever a low level is placed on conductor 161, the program/read flip flop 150 will be placed in a set condition to thereby designate a program mode of operation and will remain in this condition until a high resetting level is applied to conductor 164 connected to the reset input of the program/read flip flop 150. The conductor 164 is additionally connected to the output of an AND gate 165 which may take any of the conventional forms described above and hence produces a high at the output thereof only when both of the inputs thereto are high.

The function of the AND gate 165, as shall be better appreciated below, is to reset the program/read flip flop 150 whenever the program sequence in which three card sets of programming cards are being scanned is terminated. For this reason one input to the AND gate 165 is connected through conductor 166 to a terminal marked Stop Program Cycle. If FIG. 4 of the disclosure of U.S. Pat. No. 3,700,324 is recalled, it will be appreciated that a four bit binary counter is incremented each time a card is fed by a roller in the card feed path mechanism and decremented each time a card is detected at the scanning station. Therefore, if no misfeed occurs, the count of the binary counter does not exceed one until such time as the cards are exhausted whereupon the feed roller actuated incrementing signal continuously acts to increment the counter as no decrementing signals by the edge detector are supplied thereto. Upon the detection of a count 15 condition, a signal is produced to indicate that the feeding operation is completed. This same mechanism is here employed to apply a stop program signal to the conductor 166 to indicate on one input to AND gate 165 that no further program cards are present and that all of the cards originally loaded have been scanned. For the purposes of the stop program signal applied to conductor 166 any convenient state in the counter such as twelve or fifteen count may be employed so long as such state of the counter is sufficiently removed from one to accommodate a misfeed. Thus it will be appreciated by those of ordinary skill in the art that whenever an end of the program deck is detected, a high level is applied to conductor 166 of the AND gate 165. In addition, as shall be seen below, a second input is applied to AND gate 165 through conductor 167. This input is derived from the program mode sequence counter means 154 and is high when a multiple of three program cards have been scanned. The purpose of the gating signal on conductor 167 is to assure that when an end of the program deck is detected, an appropriate number of program cards have been read. Therefore, as it will be recalled that each program loaded requires three program cards, an input indicating that the number of program cards read is a multiple of three will insure that only whole programs have been loaded into the memories and hence a real or selection operation is appropriate.

Although not illustrated in FIG. 3 it will be appreciated by those of ordinary skill in the art that additional conditions may be imposed on AND gate 165 to further insure that an appropriate programming operation has been completed and such an imposition of additional inputs on AND gate 165 will in no way alter the instant invention but instead provides additional convenience by way of indicia or the like to an operator. For instance, as shall be seen below, the number of programs loaded are counted in the program number counter 155 during a program mode of operation. Therefore, as the instant embodiment of the present invention has been assumed to provide storage for only eight programs, program numbers equal to eight or less programs may be derived from the output of the program number counter 155, in a manner well known to those of ordinary skill in the art, and be employed to impose a third gating condition at an input of AND gate 165.

However, for the purposes of the instant description, it will be assumed that only the two inputs shown in FIG. 3 are imposed as gating conditions on the AND gate 165 and hence when a multiple of three program cards has been read and an input indicating an end of the program deck is suppled as a high level on conductor 166, the AND gate 165 will produce a high level on conductor 164 to place the program/read flip-flop 150 in a reset condition and thus defined a read mode of operation. The inverting output of the program/read flip flop 150 as applied to conductor 160 is additionally applied through conductors 168 – 171 for purposes to be subsequently described. Here however, it is sufficient to appreciate that whenever the program/read flip flop 150 is in a program mode of operation a low level resides on conductors 160 and 168 – 171.

Similarly, the Q output of the program/read flip flop 150 is connected through conductor 159 to conductors 172 – 176 for purposes which will be more clearly described below. Here however, it is again sufficent to appreciate that whenever the program/read flip flop 150 is in a program mode, conductors 159 and 172 – 175 will reside at a high level while being placed at a low level whenever the program/read flip flop 150 is in a read mode. The conductor 172 is connected to a first input of AND gate 177 whose output is inverted. The AND gate 177 may take any conventional form of AND gate which acts in the well known manner to produce a low level, which in this case represents a clock, when both of the inputs thereto are high while producing a high level output for any other set of input conditions. The second input to the AND gate 177 is supplied from the memory control counter means 153 and as shall be seen below is high whenever one memory control cycle has been completed. The AND gate 177 functions as a write end of cycle reset for the interrogation flip flop 151 in a manner to be described below. Here however, it is sufficient to note that the output of AND gate 177 is connected to a clock input of the flip flop 151. The flip flop 151 may take any conventional form of flip flop which acts in the well known manner to be set in response to a high level applied to the preset input (P) thereto while acting during the presence of a rising edge of a clock pulse to follow the input thereto applied to the D input. In addition, the interrogation flip flop 151 is supplied with a reset input on conductor 178 which acts in the well known manner upon the application of a low or reset level thereto to reset the flip flop to an initial set of conditions.

The interrogation flip flop 151 acts, as shall be seen below, to initiate one or more cycles of the memory control counter 153 upon the application of a start memory cycle input thereto from the output of AND gate 116 in FIG. 2. However, the number of cycles initiated thereby for the memory control counter 153 will differ depending upon whether or not the write/read memory address and selection control apparatus depicted in FIG. 3 is in a program or read mode of operation. More particularly, when a program mode of operation is established as determined by the setting of the program/read flip flop 150, the interrogation flip flop 151 will initiate only a single complete cycle for the memory control counter 153 and will thereafter be reset by the action of the memory control counter 153 acting in conjunction with the write end of cycle reset AND gate 177 which is enabled only during the program mode of operation. During a read mode operation however, the interrogation flip flop 151 will act to initiate one complete cycle of the memory control counter 153 for each program which has been stored and accordingly, will not be reset by an input applied to conductor 178 until all cycles for the number of programs stored have been performed.

From the input conditions specified for the interrogation flip flop 151, it will be appreciated by those of ordinary skill in the art that the interrogation flip flop 151 will be set whenever a high level is applied to the preset input thereto (P) and will be reset whenever a reset level is applied to conductor 178 or a low level is applied to the D input thereto while a rising edge of a pulse is applied to the clock input thereto. As plainly indicated in FIG. 3, the preset input P of the interrogation flip flop 151 is connected to the terminal marked Start Memory Cycle which is developed at the output of AND gate 116, as illustrated in FIG. 2, whenever a data card containing 17 clock marks has been read and the trailing edge of the card scanned has been detected. Furthermore, it will be recalled that the output produced by the AND gate 116, which represents a start memory cycle signal is a high level which is generated for an interval of 1.5 ms. Thus, each time a data card containing seventeen clock marks is scanned and the end of the card is detected, the interrogation flip flop 151 will be placed in a set state and remain in this state until it is reset by one of the two techniques mentioned above.

The D input to the interrogation flip flop 151 is connected directly to ground or a suitable low level so that, as will be readily appreciated by those of ordinary skill in the art, each time a rising edge of a clock pulse is applied to conductor 179 from the output of the AND gate 177, the interrogation flip flop 151 will be reset. As one input to AND gate 177 is connected through conductor 172 to the Q output of the program/read flip flop 150 and since this output is only high during a program cycle of operation, it will be appreciated that resetting through a clock pulse generated by the AND gate 177 is only available during a program mode of operation. The second input to AND gate 177 is connected through conductor 180 to an output of the memory control counter 153 and as shall be seen below, a high level is placed on conductor 180 near the completion of one full cycle of the memory control counter 153. Therefore, during a program mode of operation the interrogation flip flop 151 will be reset by the low level which resides on the D input whenever a clock pulse is generated on conductor 179; however, during a read mode of operation, the interrogation flip flop 151 will remain in a set condition until it is reset by the application of a reset level to conductor 178 connected to the resetting input thereto.

The conductor 178 is connected to the reset input of the interrogation flip flop 151 and to the output of an OR gate 181 whose output is inverted. The OR gate 181 whose output is inverted may take any of the conventional forms of this well known class of logic device and acts to produce a low or reset level on the output thereof whenever any one of the inputs thereto are high. A first input to the OR gate 181 is connected through conductors 182 and 183 to a terminal annotated Start. In the instant invention, whenever power is applied to the data card feeding circuits employed, a start signal is generated which is effectively a high level that is maintained for about 150ms and thereafter resets to a low. This initial high level, as applied to the terminal marked Start, is employed within the write/-read memory address and selection control network depicted in FIG. 3 to reset a plurality of devices and it will be appreciated that whenever a high level is applied to the terminal marked Start for a 150ms interval such high level will be applied to conductors 183 and 182 and will result in the application of a low or resetting level at the output of OR gate 181 connected to conductor 178 to effectively reset the interrogation flip flop 151. Furthermore, as shall be apparent to those of ordinary skill in the art as the description of FIG. 3 proceeds, the initial high applied to the terminal mark start is also employed to reset the program mode sequence counter means 154, the program number counter means 155 and through the interrogation flip flop 151 to reset the memory control counter 153.

The second input to the OR gate 181 on conductor 134 is connected, as shall be seen below, to the output of the comparator means 157 which applies a high level thereto when, during the read mode of operation, the number of programs for which cycles of the memory control counter means 153 and the program number counter means 155 have been initiated correspond to the full number of programs stored during a previous program mode of operation. Thus it will be appreciated by those of ordinary skill in the art that the interrogation flip flop 151 is reset by a low level applied to the reset input thereof on conductor 178 only when a start up cycle is initiated or a number of cycles corresponding to the full number of programs stored have been completed.

The Q output of the interrogation flip flop 151 is connected through conductor 186 to the memory control counter 153 and to one input of an AND gate 188 within the control output arrangement indicated by the dashed block 158. It is a feature of the instant invention to provide an operator with a count indicative of the number of program cards read and the output of the AND gate 188 supplied on conductor 189 is indicative of this count. The AND gate 188 may take the same forms of conventional devices described above and acts in the well known manner to produce a high level for the purposes of incrementing a counter (not shown) connected to the output thereof whenever both of the inputs thereto are high while producing a low for all other input conditions. As it will be recalled that a start memory cycle pulse is applied to set the interrogation flip flop 151 each time a data card having seventeen clock marks thereon is scanned, it will be seen that the Q output thereof will go high to place a high level on conductor 186 to clear the memory control counter 153 and produce a high level at the output of AND gate 188 if the other input to this AND gate has been properly enabled. The second input to AND gate 188 is connected through conductor 174, 173 and 172 to the Q output of the program/read flip flop 150 and hence will be high whenever the write/read memory address and selection control apparatus depicted in FIG. 3 is in a program mode of operation which means program cards are being fed and scanned. Thus, a high level will be applied to conductor 189 whenever a program card is scanned and such highs as are produced thereon may be counted in the conventional manner well known to those of ordinary skill in the art.

The $\overline{Q}$ output of the interrogation flip flop 151 is connected through conductor 187 to the input of pulse generator means 152. It will be appreciated by those of ordinary skill in the art that whenever a high going start memory cycle signal is applied to the P input of the interrogation flip flop 151, the Q output thereof on conductor 186 will go high while the Q output thereof connected to conductor 187 will go low and such output conditions will be maintained until the interrogation flip flop 151 is either reset or set to a low state by the combination of the D input and a clock level applied to conductor 179.

The pulse generator means 152 may take any conventional form of pulse generator means, such as an oscillator or the like, capable of generating pulses to be counted at a predetermined rate. In the instant case, the pulse generator means 152 may have a one millisecond cycle or otherwise be capable of generating three discrete pulses in a 3 ms interval. The pulse generator means 152 is triggered on by a low level applied to the input thereof on conductor 186 and will continuously generate pulses at a predetermined repetition rate until the input thereto goes high. Thus, whenever the start memory cycle signal is applied to the interrogation flip flop 151, and the $\overline{Q}$ output thereof goes low, the pulse generator means 152 will initiate pulse generation and such pulse generation will be continued until the input level on conductor 187 goes high upon the resetting of the interrogation flip flop 151. The output of the pulse generator means 152 is connected through conductor 190 to a counting input of the memory control counter means 153.

The memory control counter means 153 may here be considered to take the form of a conventional three bit counter means formed by a pair of flip flops, a binary counter, or similar well known circuit expedients conventionally known to those of ordinary skill in the art and hence exhibits a reset state, a first count condition and a second count condition. Therefore, it will be appreciated by those of ordinary skill in the art that, assuming the counter means is in a reset state upon the application of pulses thereto by the pulse generator means 152, the first pulse applied thereby will place the counter means in a first count condition, the second pulse applied thereto will place the memory control counter means 153 in a second count condition while the third pulse applied by the pulse generator means 152 will again cause the memory control counter means 153 to be reset and this sequence of operation is repeated for each group of three pulses applied thereto by the pulse generator means 152. Although the memory control counter means 153 exhibits three discrete states, only the first and second states thereof are employed for control purposes wherein the first count condition represents a load the upper eight bits command (bits $B_1 - B_8$) while the second count condition thereof represents a load the lower eight bits command (bits $B_9 - B_{16}$). Accordingly only the outputs of the memory control counter means 153 associated with the first and second states have been shown in FIG. 3. Thus, the output of the memory control counter means 153 connected to conductor 191 and annotated 1 will go high after a first pulse has been counted and represents a load the lower bits command while the second output of the memory control counter means 153 connected to conductor 192 and annotated 2 will go high after two pulses have been counted by the memory control counter means 153 and represents a load the eight upper bits command as shall be more clearly seen below. It will be recalled that information read in the form of 16 bits and subsequently transformed into a parallel format for each column on the data card read is processed in two eight bit parallel sequences and hence it will be appreciated that the gating of the upper or lower 8 bits is controlled by the condition of the memory control counter means 153.

The memory control counter means 153 has a clear input connected to the Q output of the interrogation flip flop 151 and will be cleared each time a start memory cycle signal is applied thereto; however, as rising or positive edge triggering is employed, the memory control counter means 153 will not be held in a reset condition but merely will be cleared at the beginning of each cycle initiated by the receipt of a start memory cycle signal at the Q input of the interrogation flip flop 151. The count 2 output of the memory control counter means 153 is connected through conductors 192 and 180 to the second input of AND gate 177 whose output is inverted. Therefore, it will be appreciated that whenever the input to AND gate 177 applied on conductor 172 is properly enabled by the establishment of a program mode of operation by the program/read flip flop 150 whereupon a high level is present on conductor 172, the counting of the second clock pulse by the memory control counter means 153 will cause a high level to be gated onto conductors 192 and 180 to thereby cause the output of AND gate 177 to go low. Thereafter, when the third pulse is counted by the memory control counter 153 and the output of the AND gate 177 again goes high, the trailing edge of the negative pulse thereby generated will clock the interrogation flip flop 151 thereby loading the low level applied to the D input to cause resetting. Thus in the program mode, a complete counting cycle of the memory control counter means 153 will cause the interrogation flip flop 151 to be reset by a clocking of a low present at the D input thereinto however, during read mode operation, such resetting will not take place as the AND gate 177 is disabled by the low level then present on the input thereof connected to conductor 172.

The output of the memory control counter means 153 connected to conductor 192 is directly connected to the termnal in the lower right hand portion of FIG. 3 annotated Memory Address Lower/Upper Bits and is applied through conductor 193 to the input of the program mode sequence counter means 154. As was previously explained, the first and second states of the counter means 153 are employed to gate either the upper or the lower eight bits to be processed to the various memory configurations and compare networks employed within the mark/care memories and compare networks 3 – 7 and the control memory and compare decision means 8 depicted in FIG. 1. Therefore, as a high level on conductor 191 represents a command for gating the upper 8 bits (bits $B_1 - B_8$) while a high on conductor 192 represents a command for gating the lower eight bits (bits $B_9 - B_{16}$), it will be appreciated by those of ordinary skill in the art that a low level applied to conductor 192 and hence to the terminal marked Memory Address Lower/Upper Bits may be employed to gate the upper 8 bits (bits $B_9 - B_{16}$) while a low level on conductor 192 may be relied upon as a gating signal for the lower 8 bits (bits $B_1 - B_8$). The terminal marked Memory Address Lower/Upper Bits is connected through the select inputs associated with conductors 100 and 109 in FIG. 2 and is additionally employed for the memory configurations within the channel mark/care memory and compare means 3 – 7 and the control memory and decision means 8 as shall be seen in conjunction with FIGS. 4 and 5.

The outputs of the memory control counter means 153 connected to conductors 191 and 192 are additionally connected to a plurality of gating arrangements which are subsequently described and these connections will be omitted at this juncture of the disclosure in the interest of clarity. Though only a three state counter configuration has been disclosed as utilized for the memory control counter means 153 for the purposes of the instant disclosure, it will be appreciated by those of ordinary skill in the art that a six stage counter might be used to appropriately interspace the two loading commands provided to avoid race conditions or the like in the logic employed.

The program mode sequence counter means 154 like the memory control counter means 153 may take the conventional form of a three stage counter formed by a pair of interconnected flip flops or the like and exhibits three distinct count conditions. Unlike the memory control counter means 153, however, the three distinct counting states of the program mode sequence counter means 154 are all employed within the write/read memory address and selection control network depicted in FIG. 3 and for this reason three output conductors 194 – 196 have been illustrated as connected to three independent outputs thereof. Therefore, as will be readily appreciated by those of ordinary skill in the art, a high on output conductor 194 is indicative that the program mode sequence counter 154 is in a reset condition, a high on output conductor 195 of the program mode sequence counter means 154 is indicative that one pulse has been counted and similarly a high level on output conductor 196 will be indicative that two pulses have been counted and upon the receipt of the third pulse, the output conductor 194 will go high.

The function of the program mode sequence counter means 154 is to act solely during a program mode operation to convey data read from each of the three program cards required for each program to be loaded to appropriate ones of the memories within the channel mark/care memory and compare networks 3 – 7 and the control memory and decision means 8 as generally illustrated in FIG. 1 and described in detail in conjunction with FIGS. 4 and 5. Therefore, as it will be recalled that the three card sequence required for loading a program requires a control card, a care/don't care program card, and a mark/no mark program card loaded in the order named, the output conductor 194 has been annotated 1-control, the output conductor 195 has been annotated 2-care and the output conductor 196 has been annotated 3-mark to aid the reader in a recognition of the function performed by the program mode sequence counter means 154. Thus, just as it is the function of the memory control counter means 153 to provide appropriately timed gating information for accessing either the lower or upper eight bits of each 16 bit column read in both program and selection operations, it is the function of the program mode sequence counter means 154 to act solely during a program mode of operation to supply appropriately timed control information to segregate and apply to the appropriate memory configuration data read from the control program card, the care/don't care program card and mark/no mark program card for each program entered during a given program sequence. The input to the program mode sequence counter means 154 is applied through conductor 193 from the output of the memory control counter means 153 connected to conductor 192, as aforesaid. Therefore, it will be appreciated by those of ordinary skill in the art, that whenever the memory control counter means 153 completes a counting sequence wherein both the lower and upper bits of a 16 sequence read from data cards being scanned have been appropriately gated and hence, processed, the state of the program mode sequence counter means 154 will be incremented unless it is held in a reset condition.

A reset input is provided for the program mode sequence counter means 154 connected to conductor 198. The conductor 198 is also connected to the output of an OR gate 199 whose output is inverted. A first input to the OR gate 199 is supplied on conductor 200 from the conductor 183 associated with the start input terminal. The second input to the OR gate 199 is connected through conductors 160 and 171 to the $\overline{Q}$ output of the program/read flip flop 150. The OR gate 199 may take the same form as OR gate 181 described above and hence acts in the well known manner to produce a low or resetting level on conductor 198 when either of the inputs thereto are high. From the discussions set forth previously, it will be readily appreciated by those of ordinary skill in the art that the program mode sequence counter means 154 is reset by a high level applied to the input of OR gate 199 on conductor 200 each time a card feeding sequence is initiated. Furthermore, as was also discussed above, the program mode sequence counter means 154 is not to be employed during a read mode operation as the sequencing of bit information read from cards representing different types of program information is only necessary during a program mode operation. Therefore, it will be seen that whenever a read mode operation is established by the program/read flip flop 150, a high level will be applied to conductor 160 defining the read mode operation and this high level is applied to the input of OR gate 199 connected to conductor 171 and results in a resetting or low level on conductor 198 which effectively acts to hold the program mode sequence counter 154 in a reset condition.

The count 1 output of the program mode sequence counter means 154 connected to conductor 194 is applied to the center input of a three input AND gate 202 present within the control output arrangement indicated by the dashed block 158. The AND gate 202 may take any of the conventional forms of this well known class of device which acts to provide a high level output only when all of the inputs thereto are high while providing a low level output for all others sets of input conditions. The function of the AND gate 202 is to provide an appropriately timed gating signal at the output terminal annotated Program Control Memory connected to conductor 203 whenever the write/read memory address and selection control apparatus depicted in FIG. 2 is in a program mode of operation, and the control card within the three card program sequence has been read. When these conditions are present, the four bits of program control information, which it will be recalled are present only in the first four bit locations of column A of the control program card and hence loaded in parallel into the channel A format conversion network indicated by the dashed block 50A must be gated into the memory configuration within the control memory and decision means 8 illustrated in FIG. 1 and described in detail in conjunction with FIG. 5. Thus, as shall be seen in conjunction with FIG. 5, a high level on conductor 203 is applied to the control memory and decision means 8 illustrated in detail in FIG. 5 and is employed to enable the loading of the memory configuration therein.

Whenever a high level resides on conductor 194, it will be indicative that the program mode sequence counter means 154 has counted one pulse; however, a requirement tha the write/read memory address and selection control apparatus be in a program mode of operation is also present. For this reason, a second input to AND gate 202 is connected through conductors 204, 173, 172 ad 159 to the Q output of the program/flip flop 150. Therefore as the Q output of the program/read flip flop 150 is only high when a program mode of operation for the write/read memory address and selection control network depicted in FIG. 3 has been established, it will be appreciated that when a second high is applied to the input of AND gate 202 connected to conductor 204 a second appropriate condition for loading data information from channel A of a program control card is established. A third input to the AND gate 202 is connected to conductor 191, which is connected to an output of the memory control counter means 153 and goes high upon a command to load the upper (8) bits from the 16 bits of information in parallel format read from each column on a card. Furthermore, if it is recalled that program information loaded into the memory configuration within the control memory and decision means 8 illustrated in FIG. 1 includes only four bits of data and such bits of data are marked within bit locations 1 – 4 of the program card, it will be seen that the loading of channel A information connected to the memory configuration of the control memory and decision means 8 is only appropriate during a load the upper 8 bits (bits $B_1 - B_8$) command. This condition is indicated by a high output on conductor 191 from the memory control counter 153 and imposed upon the input conditions of the AND gate 202. Accordingly, it will be appreciated by those of ordinary skill in the art that when a high level is established at each of the three inputs to AND gate 202, the loading of the four bit positions of the memory configuration thereof for a given program is appropriate because the control card of a program has been scanned, a program mode of operation is assured and a gating command for the upper eight bits (bits $B_1 - B_8$) has been issued.

The output of the program mode sequence counter means 154 connected to conductor 195 is connected through a conductor 206 to a terminal provided at the output of the control output arrangement indicated by the dashed block 158 marked Program Care/Mark Mode and to a first input of an OR gate 207. The output terminals of the control output arrangement indicated by the dashed block 158 annotated Program Care/Mark and Mode Read/Program are employed only to obtain appropriate addressing of functions within the care and don't care and mark and no mark memories within each of the channel mark/care memories and compare means 3 – 7 illustrated in FIG. 1. From the description of FIG. 1 set forth above, it will be recalled that there is both a care an don't care and mark and no mark memory configuration within each of the channel mark/care memory and compare means 3 – 7 and each of the memory configurations therein may load or interrogate eight bits of information for each program for a channel associated therewith and up to eight programs may be stored therein. The designation of an appropriate program location is achieved by the address described in conjunction with the program number counter means 155 below,; however, whether a care and don't care or mark and no mark memory configuration is addressed is determined by the output on the terminal designated program care/mark while whether such memory is interrogated or written into is determined by the output terminal designated mode read/program. The output terminal designated program care/mark is directly connected through conductors 206 and 195 to the second output of the program mode sequence counter means 154 and it will be appreciated by those of ordinary skill in the art that whenever a high level resides on conductor 206, indicating that the second card in a program sequence has been read, the care output condition at the Program Care/Mark terminal is indicated while whenever a low level resides thereon, the addressing of the mark memories is achieved assuming other appropriate conditions are present.

A second input to the OR gate 207 is connected to the third output of the program mode sequence counter means 154 and hence the OR gate 207 will act in the conventional manner to provide a high at the output thereof connected to conductor 208 whenever either one of the inputs thereto is high indicating that either the care/don't care program card has been read and loaded or the mark/no mark program card has been scanned and loaded into the channel format conversion networks 50A – 50E illustrated in FIG. 2, during a program mode of operation. The output of the OR gate 207 is connected through conductors 108 and 210 to a first input of AND gate 211 whose output is inverted and acts in the well known manner to provide a low level output only when both of the inputs thereto are high. The AND gate 211 is present within the control output arrangement indicated by the dashed block 158 and the output of AND gate 211 is connected to the mode read/program terminal as described above. The second input to AND/gate 211 is connected through conductor 212 to the output of an OR gate 214 whose inputs are connected respectively to the two outputs of the memory control counter means 153 connected to conductors 191 and 192 through conductors 215 and 216 respectively. Thus, the OR gate 214 acts in a similar manner to OR gate 207 to provide a high output on conductor 212 only when one of the inputs thereto from conductors 191 and 192 are high. A high on conductor 191 or 192, it will be recalled, represents a load the upper or lower eight bits command and it will also be appreciated that in a loading of the care/don't care and mark/no mark memories a two pass loading technique must be employed as sixteen bits of information must be loaded therein. Accordingly, it will be appreciated by those of ordinary skill in the art that the output of the AND gate 211 connected to the terminal mark mode read/program will go low only when both of the inputs thereto are high to thereby generate a signal that the mark/no mark or care/don't care memories are to be loaded with program information and the inputs to the AND gate 211 are such as to insure that the care or mark program card has been read and loaded, the write/read memory address and selection network depicted in FIG. 3 is in a program mode of operation and a command to load either the upper or lower eight bits of information in a two pass sequence has been issued by the memory control counter means 153.

When one of the inputs to the AND gate 211, however, is low, such as may be caused for instance by the establishment of a read mode operation in the write/ read memory address and selection apparatus depicted in FIG. 3, the output of AND gate 211 will go high to thereby apply an interrogate signal to one of the care and don't care or mark and no mark memories present in each of the mark/care memory and compare means 3 – 7 associated with each channel of information. Therefore, it will be appreciated by those of ordinary skill in the art, that the terminals marked Program Care/Mark and Mode Read/Program, which are used solely for the care and don't care and mark and no mark memory configurations within each of the channel mark/care memory and compare means 3 – 7, as more fully described in conjunction with FIG. 4, define which of the two memory configurations for each channel is to be enabled and whether such enabling is for the purposes of interrogation or programming.

The output of the OR gate 214 is also connected through conductor 212 to one input of AND gate 218. A second input to the AND gate 218 is connected through conductors 170 and 160 to the $\overline{Q}$ output of the program/read flip flop 150 which it will be recalled goes high upon the establishment of a read mode operation in the write/read memory address and selection control apparatus depicted in FIG. 3. Therefore, it will be appreciated by those of ordinary skill in the art that the output of AND gate 218 which is connected to the terminal annotated Read Interrogate will go high only when a read mode operation has been established in the write/read memory address and selection control apparatus depicted in FIG. 3 and the memory control counter means 153 has issued a command to load either the upper or lower eight bits of the data card scanned and presently undergoing selection. The output of the AND gate 218 annotated Read Interrogate is applied to the control memory decision means 8 illustrated in FIG. 1 and is employed to cause the comparison of data stored therein with processed data read from the data card in a manner to be described in detail in conjunction with FIG. 5.

The final terminal associated with the control output arrangement indicated by the dashed block 158 is connected to conductor 175 and is annotated Read Mode Print Inhibit. The conductor 175 is connected through conductors 204, 173 and 159 to the Q output of the program read flip flop 150 and is employed to inhibit printing during a program mode of operation. This output is developed because during a program operation so much information is being transferred that a print operation could well result due to spurious outputs to electrophotographic printing apparatus such as is disclosed in conjunction with U.S. Pat. No. 3,700,324. Therefore, the inhibit level generated on conductor 175 may be employed to prevent the forwarding of any erroneous select signal generated to logic and control circuit depicted in FIG. 4 of the patent.

The output of the program mode sequence counter 154 connected to conductor 194 is additionally connected to conductor 167 as an input to AND gate 165. As conductor 194 will have a high level thereon each time three program cards have been read, such high level is gated through conductor 167 to enable AND gate 165 to accept a stop program command on conductor 166 as aforesaid. However, if a multiple of three program cards for each program sequence established has not been read, no high level will be established on conductor 194 and hence the AND gate 165 will be disabled. This input to AND gate 165 thereby provides insurance that prior to causing the program read flip flop 150 to revert to a read mode at the end of a program cycle, only complete sequences of three program cards have been processed and no partial program information loaded. Thus it will be seen that in a manner similar to that in which the memory control counter means 153 cycles through three steps to achieve two pass loading for each sixteen bits of channel information read from each data card or program card scanned, the program mode sequence counter means 154 cycles through a three step sequence for each of the three program cards required for the insertion of each program in the instant invention and it will be seen that outputs from both the memory control counter means 153 and the program mode sequence counr means 154 are logically processed to provide a plurality of control outputs assembled within the control output arrangement indicated by the dashed block 158 to assure that program information is inserted into or read from the appropriate memory configuration within the care/don't care memory configuration, the mark/no mark memory configuration and the control memory and decision means employed within the instant invention.

The AND gate 219 is connected through conductors 220 and 196 to the output of the program mode sequence counter means 154 and produces a high output each time the program mode sequence counter means 154 is operating on the third card of a three card counting sequence and hence goes low each time a three card program has been loaded during a program mode of operation. The AND gate 219 forms a write program gate which acts during the program mode of operation to supply the trailing edge of a positive pulse to the program number counter means 155 each time a program has been loaded. In this manner, the program number counter means 155 accumulates a count corresponding to the total number of programs stored during a program mode operation and through the conjoint action of the four bit latch means 156 and the comparator means 157, as shall be described below, may be recycled during a read mode operation as each program routine is run to provide an indication at the output of the comparator means 157 when all of the program routines loaded have been applied to the data read from the given card undergoing a selection. As the write program gate formed by the AND gate 219 may take the form of a conventional AND gate, it acts in the well known manner to produce a high output whenever both of the inputs thereto are high while producing a low output for all other input conditions. A second input to the AND gate 219 is connected through conductors 221 and 159 to the Q output of the program/read flip flop 150 so that the AND gate 219 is properly enabled only during such times as the write/read memory address and selection control network depicted in FIG. 3 is in a program mode of operation. When thus properly enabled, each time the program mode sequence counter means 154 completes the second card of a three card counting sequence, the output of the AND gate 219, as connected to conductor 222, will go high until one of the inputs to the write program gate formed by AND gate 219 again goes low either by a completion of the cycling of the count of the program mode sequence counter means 154 or the termination of the program mode of operation established by the program/ read flip flop 150. The output of the write program gate formed by AND gate 219 is connected through conductor 222 to one input of an OR gate 223.

The OR gate 223 may take any of the conventional forms of this well known class of devices which acts to produce a high level at the output thereof whenever any of the inputs thereto are high. The output of the OR gate 223 is connected through conductor 224 to the counting input of the program number counter means 155. In similar manner, the second input to OR gate 223 is connected through a conductor 225 to the output of an AND gate 226 which, as indicated in FIG. 3, forms a read program gate. The read program gate 226 functions only during the read mode to apply positive going pulses to the input of the program number counter 225 through OR gate 223 to indicate the number of program sequences to which a given set of data read from a data card being scanned has been subjected. As the read program gate formed by AND gate 226 is to be operative only in the read mode of operation, a first input thereto is connected through conductors 169 and 168 to the $\overline{Q}$ output of the program/read flip flop 150. Therefore, as will be readily appreciated by those of ordinary skill in the art, the read program gate formed by AND gate 226 will only be properly enabled so as to be capable of applying positive going pulses to the input of the program number counter means 155 whenever the Q output of the program/read flip flop 150 is in a high condition indicating that a read mode operation is established.

In a read mode of operation, the program mode sequence counter 154 is disabled by the reset level established on conductor 198 as the number of programs which have been run will here be measured by the number of complete cycles run in the memory control counter means 153 as information read from a data card undergoing a selection process is loaded into the appropriate channel format conversion network 50A – 50E associated therewith and thereafter applied in pairs of eight bit passes to each program stored in the channel mark/care memory and compare networks and the control memory and decision network 8. Therefore, as will be appreciated by those ordinary skill in the art, each time a high level is applied by the memory control counter means 153 to output conductor 192, the sequencing of a given program for the data card scanned is indicated. For this reason, the conductor 192 is connected through conductor 227 to the second input of the read program gate formed by AND gate 226 and it will be appreciated by those of ordinary skill in the art that whenever the read program gate formed by AND gate 226 is enabled by the establishment of a read mode of operation, each high level applied to conductors 192 and 227 will cause the output thereof to go high to thereby indicate one program sequence has been completed. Each high level present at the output of AND gate 226 will be applied through conductor 225 to the OR gate 223 and result in a positive pulse at the input of the program number counter means 155 in the same manner as was described for the write program gate formed by AND gate 219.

The program number counter means 155 may take the form of a conventional four bit binary counter such as is available in standard form from the Texas Instrument Corporation as chip Ser. No. 7493. The program number counter means 155 is thus capable of storing a count up to 16; however, as only 8 programs are considered in the instant invention, it will be appreciated that effectively only the first three stages thereof need be employed. The counting input to counter means 155 is connected, as aforesaid, to the output of the OR gate 223 while the reset input thereof is connected through conductor 228 to the output of an OR gate 229. The trailing edge of a positive or high level pulse applied to conductor 224 will cause the incrementing of the program number counter means 155 while a high level applied to the conductor 228 will cause the resetting thereof. A first input to the OR gate 229 is connected through conductor 183 to the terminal annotated Start and hence the high level applied thereto during the initial portion of a program card or data card feed cycle will serve to clear any count left in the program number counter 155. The second input to the OR gate 229 is connected through conductor 230 to the output of a conventional delay network 231, such as an RC network or the like. The delay network, receives an input on conductor 232 whose purpose will be described below, and after a delay of approximtely 1.5ms, acts to apply an input signal received on conductor 232 to the input of the OR gate 229. Thus as the OR gate 229 is conventional, it will be appreciated that any high level applied to either of the inputs thereto on conductors 183 or 230 will result in the resetting of the program number counter means 155.

The four outputs of the program number counter 155 are connected through conductors 234 – 237 to inputs $A_0 - A_3$ of the comparator means 157 and through conductors 238 – 241 respectively, to corresponding inputs $D_1 - D_4$ of the four bit latch means 156. Although four outputs from the program number counter means 155 are employed, it will be appreciated that only the three outputs thereof on conductors 234 – 236 and 238 – 240 are required to indicate a loading of eight programs within the program number counter means 155 and hence the fourth output thereof as applied to conductors 237 and 241 may be omitted or alternatively might be relied upon in the decoding of a condition which would indicate the loading of more than eight programs which then may be imposed as an additional input condition for the AND gate 165, as aforesaid. Additionally, the three outputs of the program number counter 155 on conductors 238 – 240, which three conductors are effectively used to designate a loading of programs 1 – 8 for a full program loading sequence, are connected to the terminals annotated Bit A, Bit B and Bit C. These terminals are employed to address the various memories present within the channel mark/care memory and compare means 3 – 7 and the control memory and compare decision means 8 and may designate, as it will be appreciated by those of ordinary skill up to eight program storage locations. The terminal annotated Memory Address Lower/Upper Bits indicated in FIG. 3 is employed to address either the upper or lower bits of each memory address defined by bits A – C when a sixteen bit sequence is divided in two eight bit passes.

The four bit latch means 156 may be conventional and acts as in the well known manner to load each input applied to inputs $D_1 - D_4$ thereof and apply such inputs to the outputs $Q_1 - Q_4$ when properly enabled but upon the disabling thereof to retain the last inputs loaded at the outputs thereof. A typical four bit latch which is suitable is exemplified by a latch configuration chip Ser. NO. 7475 available from the Texas Instrument Corporation. The enable input to the four bit latch means 156 is supplied through conductors 243 and 168 and the inverter 245 from the $\overline{Q}$ output of the program read flip flop 150. Therefore, as it will be recalled that the $\overline{Q}$ output of the flip flop 150 is high during a read mode and low during a program mode, the inversion of this output by the conventional inverter 245 will result in an enabling of the four bit latch means 156 during a program mode operation and a disabling thereof during a read mode operation. This means that the four bit latch means 156 will store the bit count manifested by the program number counter means 155 during a program mode of operation and then be disabled so that the count of programs stored is maintained therein until a new programming operation is initiated. Each of the outputs of the four bit latch means 156 is applied through conductors 246 – 249 to the inputs $B_0 - B_3$ of the comparator means 157. Accordingly, it will be appreciated by those of ordinary skill in the art, that during a program mode of operation, the program count manifested by the program number counter means 155 is applied to inputs $D_1 - D_4$ of the four bit latch means 156 and stored therein so as to be reflected at the outputs thereof connected to conductors 246 – 249. However, upon the reversion of the write/read memory address and selection control apparatus depicted in FIG. 3 into a read mode of operation, the last count of the program number counter means 155, achieved during the program mode of operation, is maintained in the four bit latch means 156 and thereafter this count is reflected at the outputs thereof and applied through conductors 246–249 to the inputs $B_0 - B_3$ of the comparator means 157.

The comparator means 157 may take the conventional form of a four bit comparator which acts, when enabled, to compare each of the corresponding inputs applied to two sets of four inputs $A_0 - A_3$ and $B_0 - B_3$ and to supply a high level at the output thereof when an identity between each of the inputs compared results. The comparator means 157 has the enable input thereto connected through conductors 250, 170, and 160 to the $\overline{Q}$ output of the program/read flip flop 150 and it will be appreciated by those of ordinary skill in the art that whenever the program/read flip flop 150 is in a read condition a high level is applied to the enable input of the comparator means 157 to enable the comparator means to effect a comparison operation between corresponding bits of the two, four bit inputs supplied thereto. The output of the comparator means 157 is applied to conductor 251 connected to the terminal annotated Output Decision and it will be appreciated that whenever a favorable comparison results, a high level will reside on conductor 251 and the terminal annotated Output Decision connected thereto.

The output present at the terminal marked Output Decision is employed, as shall be seen in conjunction with FIG. 5, to gate the control memory and compare decision means 8 so that a select signal may be gated therefrom after all program sequences loaded for a given selection operation have been run for a set of data obtained from a data card scanned and undergoing selection. Thus, the output level on conductor 251 connected to the terminal annotated Output Decision is employed to provide an indication and an appropriately timed gating signal indicative that all selection processing for all programs loaded have been run for a given card undergoing a selection processing operation.

From the functions of the program number counter means 155, the four bit latch means 156 and the comparator means 157 detailed, it will be seen that the network formed thereby provide two distinct functions within the write/read memory address and selection control network depicted in FIG. 3. The first function, is achieved during a program mode of operation wherein the comparator means 157 is disabled by a low level which resides on conductor 250. Thus, in a program mode of operation, each program loaded as indicated by the cycling of the program mode sequence counter means 157 is counted by the program number counter means 155 and loaded into the four bit latch means 156. At the completion of the programming sequence being conducted, the four bit latch means 156 will be disabled and hence, maintain a count which corresponds to the total number of programs loaded during the program mode as originally counted in the program number counter means 155. The program number counter means 155 is then reset and is active to count each program cycle against which data read from a data card undergoing a selection operation is processed. During the read mode, the comparator means 157 is enabled, and hence as each program cycle is initiated for a given group of data as indicated by the cycling of the memory control counter means 153, the program number counter is incremented and the state of the count thereof is applied through conductors 234 – 237 to inputs $A_0 - A_3$ of the comparator means 157. In addition, the comparator means 157 receives a count indication through conductors 246 – 249 of the total number of programs stored as maintained in the four bit latch means 156. When the total number of program routines run for a given batch of data obtained from a card undergoing a selection routine, as indicated by the output of the program number counter means 155 corresponds to the total number of programs loaded during a program mode as indicated by the count condition maintained in the four bit latch means 156, a high will be produced at the output of the comparator means connected on conductor 251 to thereby provide a logical indication that the data read from the card undergoing a selection routine has been exposed to each program sequence of selection information stored and hence a final decision with regard to the selection conditions imposed by the various programs may be outputted.

The output conductor 251 connected to the output of the comparator means 157 is connected through conductors 252, 232 and 184 and it will be appreciated that a high output is only applied thereto during a read mode operation as it is only in this mode of operation that the comparator means 157 is enabled. The conductor 232 is connected, as aforesaid, to the input of the delay means 231 and hence whenever a high output is provided by the output of the comparator means 157 on conductor 251, a resetting pulse will be applied by the delay means 231 to the OR gate 229, through conductor 230, to cause the resetting of the program number counter means 155 in the manner described above. Therefore, as it will be appreciated that the program number counter means 155 is effectively reset 1.5 ms after the output of the comparator means 157 goes high and that upon resetting the inputs to comparator means 157 on conductors 234 – 237 will no longer compare to those on conductors 246 – 249, it will be seen that the action of the delay means 231 effectively gates the output of the comparator means 157 so that the high level applied to conductors 251 and 252 when a comparison is obtained will only manifest a duration of a 1.5 ms due to the subsequent resetting of the program number counter means 155 in this interval. In addition, the application of the high level on conductor 251 through conductors 252 and 184 to the input of OR gate 181 will act to reset the interrogation flip flop 151 in the manner described above. Therefore, it will be appreciated by those of ordinary skill in the art that in a read mode operation, once the interrogation flip flop 151 is set by a start memory cycle pulse applied to the preset input thereof, it will enable the pulse generator means 152 for continuous cycling of the memory control counter means 153 until all the programs stored have been read and thereafter the interrogation flip flop 151 wil be reset. The write/read memory address and selection control apparatus depicted in FIG. 3 will be more fully appreciated from a consideration of the operation thereof in each of the program and read modes of operation established.

PROGRAM MODE OPERATION

If it is assumed that the instant invention is employed within electrophotographic printing systems such as are disclosed in U.S. Pat. No. 3,700,324, it will be appreciated by those of ordinary skill in the art, that a typical selection run, as it concerns the write/read memory address and selection control apparatus depicted in FIG. 3, will involve the energizing of the electrophotographic printing apparatus, the loading of an appropriate program deck and thereafter the loading of appropriate data cards which are to undergo the programmed selection process. When the electrophotographic printing system is energized and the program deck feed initiated, an initial high level will be applied to the terminal annotated Start connected to conductor 183 which will persist for a short interval and then go low, as aforesaid. The initial high level established on conductor 183 will be applied through OR gate 229 to cause a resetting of the program number counter 155, and be further applied to conductor 182. The high level on conductor 182 is applied through conductor 200 and OR gate 199 to effect the resetting of the program mode sequence counter 154 and through OR gate 181 and conductor 178 to similarly effect the resetting of the interrogation flip flop 151 so that a low level is present on the Q output thereof which is conveyed through conductor 186 to reset the memory control counter means 153. In addition, when the energization of the electrophotographic printing system here being considered is established, the one shot 162 will go high to apply a high level to conductor 161 and thereby set the program/read flip flop 150. The one shot 162 will then automatically reset to place a low level on conductor 161; however, the program/read flip flop 150 will be retained in the set condition established and hence in a program mode until it is reset by the application of a high level to conductor 164.

After these initial conditions are established, each of the program cards loaded will be individually fed in sequence and scanned and the data obtained therefrom processed in the manner described in conjunction with FIG. 2. As data from each card is scanned and transformed into a parallel format and loaded in the channel format conversion networks 50A – 50E, a start memory cycle signal will be produced by the AND gate 116 illustrated in FIG. 2 in the manner described above. If an appropriate program deck has been loaded, the first card in each three card sequence will be a control program card, the second card will be a card/don't care program card and the third card loaded will be a mark-/no mark program card wherein the control program card only contains four bits of appropriate program information in the column thereof associated with channel A while both the care/don't care and mark/no mark program cards may contain a full five columns of appropriate program information associated with the function of the card and a full three card sequence is required for the loading of each program. Thus it will be seen that program information from the control card of each program sequence is only loaded in the first 4 bit locations of the channel A format conversion network 50A shown in FIG. 2 while both care/don't care program information and mark/no mark program information may be loaded in all five of the channel format conversion networks 50A – 50E illustrated in FIG. 2.

When the first start memory cycle pulse is applied to the interrogation flip flop 151, program information from the program control card will have thus been loaded into the channel A format conversion network 50A depicted in FIG. 1. The first start memory cycle pulse applied to the preset input of the interrogation flip flop 151 will cause the interrogation flip flop 151 to be placed in its set state whereupon a high level is applied to conductor 186 and a low level is applied to conductor 187 connected to the complementary output thereof. As the write/read memory address and selection control network depicted in FIG. 3 has been initially established in a program mode operation as aforesaid, the high level placed on conductor 186 together with the high level on conductor 174 will provide the appropriate input conditions for AND gate 188 to produce a high at the terminal annotated Program Count whereupon an indication that the first program card has been read and scanned is provided and may be counted.

When the output of the interrogation flip flop 151 conncted to conductor 187 goes low, the pulse generator 152 will be gated on to produce pulses, as aforesaid, until the input thereto connected to conductor 187 again goes high. As each pulse is applied to the conductor 190 by the pulse generator means 152, it is counted and the various states of the count therein indicated on conductors 191 and 192. When the first pulse is applied by the pulse generator means through conductor 190 to the memory control counter means 153, the state of the count therein is incremented from the set state initially established and a high level is provided on conductor 191. The conductor 191 is connected to one input of AND gate 202 and hence the high level thereon establishes one of the appropriate input conditions for the production of a high at the output thereof connected to conductor 203 and the terminal marked Program Control Memory. The terminal marked Program Control Memory acts, as aforesaid, to control the loading of information from a control program card into the control memory configuration present within the control memory and compare decision means 8 shown in FIG. 1 and described in great detail in conjunction with FIG. 5. A second input to this AND gate is connected to conductor 194 at the program mode sequence counter means 155 while the third input to this gate is connected through conductors 204, 173, 172, and 159 to the Q output of the program/read flip flop 150. As the program/read flip flop 150 is in a set condition indicative of a program mode of operation, and the program mode sequence counter means 154 is in a reset state wherein a high level resides on the one count output thereof connected to conductor 194, it will be appreciated by those of ordinary skill in the art that all of the input conditions for AND gate 202 are present and a high level will be applied thereby to conductor 203 to provide a load the program control memory signal.

In addition, when only one pulse has been counted by the memory control counter means 153, while a high level is present on conductor 191, a low level will be present on conductor 192. This conductor, is connected to the terminal annotated Lower/Upper bits in the lower right hand corner of FIG. 3 and hence, as will be appreciated by those of ordinary skill in the art, the low level thereon is employed, in this case, in conjunction with the first and second multiplexer means 92 and 93 associated with the channel A format conversion network 50A in FIG. 2 to cause the application of bits $B_1 - B_8$ to be outputs of the first and second multiplexer means 92 and 93 and in addition, may be employed as part of the memory address for each of the memory configurations to be loaded with such information. Furthermore, as the first control card of the first program loaded is here being considered, the program number counter means 155 will reside in its reset condition whereupon a low output may be present on each of conductors 238 – 240 and hence the terminals marked bits A – C will all reside at a zero state to designate the appropriate address for all of the memory configurations for the first program to be loaded. In addition, as the program read flip flop 150 is in a set state indicative of the program mode of operation established, the high level present on conductor 159 is applied through conductors 173 and 175 to the terminal annotated Read Mode Print Inhibit. The output of this terminal, as previously indicated, is employed to inhibit any printing in electrophotographic printing apparatus of the type described in U.S. Pat. No. 3,700,324 during a program mode of operation and hence a high will reside on this conductor throughout the interval of the program mode of operation. Thus, it will be appreciated by those of ordinary skill in the art, that when a program mode of operation is established and the first or control card of the first program loaded is read, the first pulse counted by the memory control counter means 153 will result in a gating signal for the program control memory on conductor 203, the program counter terminal connected to conductor 189 will have a high level thereon indicating the first program card has been fed, the Read Mode Print Inhibit terminal will have an inhibit level established thereon while the bit address terminals connected to conductors 253 – 256 will provide an appropriate address for loading the upper 8 bits (bits $B_1 - B_8$) in a first program memory location within the memory configurations employed within the instant invention.

When the second pulse is generated by the pulse generator means 152 and counted by the memory control counter means 153, the output on conductor 191 goes low while the output on conductor 192 goes high to provide a load the lower 8 bits (bits $B_9 - B_{16}$) command at the terminal connected to conductor 256. As the program number sequence counter means 155 is still in a reset condition, a zero condition is still present on conductors 253 – 255 and hence a first program address is still reflected thereon. When the output condition of conductor 191 goes low, the AND gate 202 will be disabled whereupon the output level on conductor 203 goes low to thereby remove the load the program control memory signal previously established. However, as it will be recalled that a control program card has been read and that control program information resides only in the first four bit locations of channel A of this card, a disabling of the load signal for the program control memory is here appropriate as no legitimate data is reflected in bit locations $B_9 - B_{16}$ of channel A. The remaining control outputs associated with the control output arrangement indicated by the dashed block 158 remain in the condition previously described above; however, the high level present on conductor 192 will also cause the input of the AND gate 177 connected to conductor 180 to go high. As the first input to AND gate 177 is high due to its connection through conductor 172 to the Q output of the program/read flip flop 150, which is high for a program mode of operation, the output of the AND gate 177, which forms the write end of cycle reset for the interrogation flip flop 151, goes low. Thereafter, when the third pulse generated by the pulse generator 152 is counted by the memory control counter 153 and the output on conductors 192 and 180 goes low to thereby disable AND gate 177, the trailing edge of the negative pulse previously generated will act to clock the interrogation flip flop 151 and hence cause it to load the low level connected to the D input thereto causing resetting which places a high level on conductor 187 and disables the pulse generator means 152. In addition, the resetting of the interrogation flip flop 151 will cause the high level present on conductor 189 associated with the program count terminal to go low.

Similarly, as also will be obvious to those of ordinary skill in the art, when the second pulse applied to the memory control counter means 153 caused the output conductor 192 to go high, such high level was applied through conductor 193 to the program mode sequence counter means 154 and hence the resetting of the memory control counter means 153 will cause the state of the count reflected thereby to be incremented upon the appearance of the negative trailing edge produced on conductor 193. Thus, after 3 pulses from the enabled pulse generator means 152 have been counted by the memory control counter means 153 in association with the reading of the first card of the program deck inserted, the interrogation flip flop 151 will be in a reset condition, the memory control counter means 153 will be in a cleared condition, and the program mode sequence counter means 154 will have been incremented so that a high now resides on the conductor 195 connected to the one output thereof. Furthermore, it will be appreciated that during the first cycle of the memory control counter means 153, a first program count output was produced on conductor 189, a load the program control memory signal was produced on conductor 203 at an instant appropriately timed to the loading of the upper bits (bits $B_1 - B_8$) which contain control program information, and a read mode print inhibit signal on conductor 175 was established. In addition, an address for the first program was established on conductors 253 – 255 and selective gating signals for the upper and lower bit sequences of information was presented; however, for the case of the control program card discussed above, a load the program control memory signal on conductor 203 was only established in association with the loading of the upper bits since it is only these bits which contain suitable information for programming the program control memory configuration.

When the second card in the program deck loaded is scanned, program information from each of the columns therein will be loaded into the channel format conversion networks 50A – 50E and when the same has been appropriately processed a start memory cycle signal will be applied to the present input of the flip flop 151 to again enable the pulse generator 152 and cause the program count output on conductor 189 to go high to indicate the second program card has been scanned. In addition, it will be appreciated that as the program mode sequence counter means 154 has previously been incremented as a result of the first complete cycle of the memory control counter means 153, a high level is on conductor 195 and is transmitted through conductor 206 to produce a high or program the care memory signal on the output terminal annotated Program Care/Mark. This signal, it will be recalled, is employed to cause selective storing of information in either the care or mark memory configurations within each of the channel mark/care memories and compare means 3 – 7 during a program mode of operation. Furthermore it will be appreciated that the address specified on conductors 253 – 255 remains as specified above.

When the first pulse generated by the pulse generator means 152 in response to the second start memory cycle signal applied to the interrogation flip flop 151 is counted by the memory control counter means 153, the output thereof connected to conductor 191 will go high. This output of the memory control counter means 153 is connected through conductors 191 and 216 to an input of the OR gate 214. The OR gate 214 acts in the well known manner to produce a high whenever any input thereto goes high and hence when the first pulse generated by the pulse generator means 152 is counted by the memory control counter means 153, a high output is produced by OR gate 214 and applied through conductor 212 to one input of the AND gate 211 whose output is inverted. The output of AND gate 211 is connected to the terminal marked Mode Read/Program employed, as aforesaid, for the operation of the mark/care memory configurations in each of the channel mark/care memory and compare networks 3 – 7 illustrated in FIG. 3. A second input to the AND gate 211 is connected through conductors 210 and 208 to the output of an OR gate 207. The inputs to OR gate 207 are connected to the care and mark outputs of the program mode sequence counter means 154 and hence as a high has previously been established on conductor 195, the OR gate 207 will act in similar manner to the OR gate 214 to place a high level on the output thereof connected to conductors 208 and 210. Accordingly, as both of the inputs to AND gate 211 are high, a low level indicative of a program the care and mark memory configuration signal, as aforesaid, is applied to the terminal annotated Mode Read/Program. Thus, it will be appreciated by those of ordinary skill in the art, that as a high or a care memory level is present on the conductor 206 connected to the Program Care/Mark terminal and a low is present on the Mode Read/Program terminal associated with a control output for the mark/care memories, a pair of outputs designating a programming mode for the care memory is also provided by the control output arrangement indicated by the dashed block 158.

In addition, as a low level is present on conductor 192 connected to the second output of the memory control counter means 153, a load the upper eight bit signal will be provided to each of the multiplexing networks associated with the plurality of channel format conversion networks 50A – 50E as depicted in FIG. 2 while this signal will also be employed, as shall be seen in conjunction with FIG. 4, to further address the care and don't care memory configurations within the mark/care memories and compare means associated with each channel. The state of the program number counter 155, however, remains reset and hence, the memory address provided by the terminals connected to conductors 253 – 255 remains appropriate for the first program.

When the second pulse generated by the pulse generator means 152 is counted by the memory control counter means 153, the output thereof connected to conductor 192 goes high while the output on conductor 191 goes low. As the second input to the OR gate 214 is connected through conductor 215 to the conductor 192, a high remains at the output of the OR gate 214 and hence, the state of the AND gate 211 remains unchanged. However, the level on the output conductor 256 connected to conductor 192 and the terminal marked Memory Address Lower/Upper Bits here goes high and hence although the program care/mark and mode read/program outputs as well as the memory address outputs on conductors 253 – 255 remain constant, a control level is supplied on conductor 256 which is appropriate for gating the lower eight bits for each channel of care/don't care information to be programmed into the care memory configurations present within each of the mark/care memory and compare means 3 – 7. In addition, the high level on conductor 192 in applied through conductor 180 to the input of the AND gate 177 which forms the write end of cycle reset, as aforesaid and through conductor 193 to the counting input of the program mode sequence counter 154. Therefore when the third pulse generated by the pulse generator 152 in the second cycle being considered is counted by the memory control counter means 153 to cause the resetting thereof, the trailing edges of the pulses generated on conductor 179 will reset the interrogation flip flop 151 by loading the D input thereof and cause the state of the count of the program mode sequence counter 154 to be incremented.

Thus at the completion of the second cycle of the memory control counter 153 which is associated as aforesaid with the reading of the second or care/don't care program card for the first program being loaded, the output on conductor 206 connected to the terminal Marked Program Care/Mark goes low to now designate the mark memory configurations within the channel mark/care memory and compare means 3 – 7 while the output of the AND gate 211 connected to the terminal marked Mode Read/Program which is employed for the mark and care memory configurations as aforesaid, goes high due to the removal of a high level at the output of the OR gate 214. Additionally, the output on conductor 256 associated with the lower/upper bit control signal again goes low. Therefore it will be appreciated by those of ordinary skill in the art that during the second cycle of the memory control counter means 153, 16 bit care/don't care information read from a care don't/care program is loaded into the care/don't care memory configurations associated with each channel in two eight bit sequences and the address employed in loading such information into these memory configurations is that associated with the first program.

When the third or mark/no mark program card for the initial program loaded is fed, thhe output on the Program Care/Mark terminal connected to conductor 206 will be low as the program mode sequence counter means 154 has been incremented twice to thereby place a high on conductor 196, so that the mark memory configurations within each of the channel mark-/care memories and compare networks 3 - 7 are defined by the output thereof. In addition, the program number counter means 155 is still in a zero state as no negative transition has yet been produced by AND gate 219 and hence the address defined by the terminal annotated Bit A - Bit C are appropriate for storage of the first program while a low level resides on conductor 256. Therefore, when the start memory cycle signal is generated indicating that mark and no mark information from each channel of the mark/no mark program card has been loaded into the channel format conversion networks 50A - 50E, the pulse generator 152 will again be enabled and a high level will be produced by the AND gate 188 to increment any counter connected to the program counter output terminal on conductor 189. When the first pulse generated by the pulse generator means 152 is counted by the memory control counter means 153, the output thereof connected to conductor 191 goes high whereupon a high is applied through conductor 216 to the OR gate 214. The OR gate 214 will generate a high level output in response thereto whereupon a high level output is again applied through conductor 212 to one input of the AND gate 211 whose output is inverted. As the second input to AND gate 211 is connected through conductors 210 and 208 to the output of OR gate 207, which remains high due to the connection of the second input thereto to conductor 196 or the mark output of the program mode sequence counter means 154, a low will again be generated at the output of the AND gate 211 connected to the terminal annotated Mode Read/Program. In addition, the low level on conductor 206 will be retained so that, as now will be apparent to those of ordinary skill in the art, the terminal annotated Program Care/Mark will designate the mark memory configurations, the terminal annotated Mode Read/Program will designate a program or write sequence therein, while the conductor 256 will indicate that the upper eight bits $B_1 - B_8$ are to be loaded into the address within the mark memory configurations associated with the first program. Thus, in this manner, the first 8 bits. of each channel of information loaded from the program card associated with mark/no mark information will be loaded into the channel mark and no mark memory configurations provided therefor and such loading will take place in the memory slots assigned to the first program.

When the second pulse generated by the pulse generator means 152 is counted by the memory control counter means 153, the output on conductor 191 goes low while the output on conductor 192 goes high. As the input to OR gate 214 is also connected to the conductor 192, the output of OR gate 214 remains high and hence since the program mode sequence counter means 154 has not yet been incremented, the output of the AND gate 211 will remain low to thereby designate a program mode of operation for the mark memory configurations. Similarly, the bit address defined by conductors 253–255 will remain in an all zero state; however the level on conductor 256 will go high to now define and cause the gating of bits $B_9 - B_{16}$ into the mark and no mark memory configurations present in each of the channel mark/care memories and compare means 3 - 7. The high level present on conductor 192 is also applied through conductor 180 to the input of the write end of cycle reset and through conductor 193 to the input of the program mode sequence counter 154 so that, upon the counting of the next pulse generated by the pulse generator means 152, the interrogation flip flop 151 is reset while the program mode sequence counter means 154 is incremented to thereby complete one full cycle and again be placed in a reset condition wherein a high level is applied to conductor 194 to thereby establish the write/read memory address and selection control apparatus depicted in FIG. 3 in an appropriate condition to accept control information from the control program card of the next program to be inserted.

When the program mode sequence counter means 154 is reset from a mark condition to a state wherein a high level is present on conductor 194, a negative transition is gated through conductor 196 and conductor 220 to one input of the write program gate formed by AND gate 219. As this AND gate has been previously enabled by the high level indicative of the program mode of operation established thereon through conductors 159 and 221 as well as the high level which previously resided on conductor 196, the negative transition generated results in an application of a negative transition to conductor 222 causing the output of the OR gate 223 to go from high to low and hence apply a negative transition to conductor 224 which is connected to the input of the program number counter means 155. This negative transition acts, in the well known manner, to increment the state of the program number counter means 155 and hence increment the count manifested thereby by one digit. The incremented output of the program counter means 155 is applied through conductors 238 - 240 to conductors 253 - 255 so that the memory address manifested by the next programming cycle initiated by the next three program cards fed will result in the insertion of data in appropriate locations within the memory configurations employed for the second program. In addition, the current count of the program number counter 155 is applied through conductors 238 - 241 to inputs $D_1 - D_4$ of the 4 bit latch means 156. The four bit latch means is enabled, as aforesaid, by the high output on conductor 243 which results from an inversion of the low level established on conductor 168 when the program/read flip flop 150 in a program mode of operation. Thus, the current address of the program number counter means 155 is set into the now enabled four bit latch 156 and applied to the outputs thereof ($Q_1 - Q_4$), connected to conductors 246 - 249.

As each succeeding three program card sequence is fed and the data read therefrom and loaded into the appropriate channel format conversion networks 50A – 50E therefor, the program sequencing operation controlled by the memory control counter means 153, the program mode sequence counter means 154 and the program number counter means 155 will be repeated in the same manner described above for the initial program stored. Therefore, it will be appreciated by those of ordinary skill in the art, that as each card of the program sequence is read, the memory control counter means 153 will control the application of each of the two 8 bit sequences per channel read therefrom onto the line and into an appropriate location within the memory configurations employed, the program mode sequence counter means 154 will control the enabling of the appropriate memory configuration which is to receive such information while the state of the count of the program number counter means 155 controls the addressing of an appropriate word in the memory selected so that the program is stored therein in the appropriate sequence. In addition, the 4 bit latch means 156 stores the last count manifested by the program number counter means 155 so that, when the four bit latch means 156 is subsequently disabled pursuant to the initiation of a read mode of operation, and the program number counter means 155 is reset, the state of the count stored in the four bit latch means 156 will reflect the total number of programs stored for the selection sequence about to be initiated.

After the last program card in the program deck has been loaded, no further program cards will be fed and after 12 to 15 feed cycles in which no card is detected, a high level input will be produced at the terminal annotated Stop Program Cycle. So long as a whole number multiple of a three card sequence has been counted by the program mode sequence counter means 154, a high level output will reside on conductor 194 and will be applied through conductor 167 to the second input of AND gate 165. Therefore, as under these conditions, a high level will be present at both of the inputs to AND gate 165, the output thereof will go high to reset the program/read flip flop 150 in the manner described above. When the program/read flip flop 150 is placed in a reset condition, the Q output thereof will go low and the $\overline{Q}$ output goes high to thereby establish a read mode of operation, disabling the four bit latch means 156 so that the last program count stored in the program number counter means 155 is maintained therein while the program mode sequence counter 154 is held in a reset condition due to the application of a low level to the output of the OR gate 199. In addition, the Read Mode Print Inhibit terminal which has been maintained at a high level throughout the program mode of operation established, is released, so that a low level now resides thereon.

READ MODE OPERATION

When a read mode operation is established in the write/read memory address and selection control apparatus illustrated in FIG. 3, a deck of data cards which are to undergo selection processing in accordance with the teachings of the instant invention will be loaded in the same manner as described for a deck of program cards. Here, however, each card represents an independent entity whose contents are to be completely evaluated for selection purposes and hence, the program mode sequence counter means 154 is unnecessary because all data will be available at once. It is for this reason that the program mode sequence counter means 154 is held in a reset state when a read mode is established by the resetting of the program/read flip flop 150. It should also be noted, that upon the reversion of the program/read flip flop 150 to the read state wherein a high level is applied to the $\overline{Q}$ output connected to conductor 160, the write program gate formed by AND gate 219, the write end of cycle reset formed by AND gate 177, the program count output gate formed by AND gate 188, the AND gate 202 which controls the enabling of the program control memory configuration as well as the output terminal annotated Read Mode Print Inhibit are all disabled so that low levels reside thereon as the outputs provided thereby are not employed during a read mode operation. In addition, the output of the AND gate 211 is established at a high level due to the disabling of the program mode sequence counter means 154 so that a read mode or interrogate the mark and care memory mode is established by the setting of the program/read flip flop 150 to its reset state.

After a deck of data cards which are to undergo selection processing have been loaded, the first card has been fed and scanned and the information read from each of the channels thereon appropriately loaded within the channel format conversion networks 50A – 50E, a start memory cycle input will be applied to the interrogation flip flop 151. The interrogation flip flop 151 is in a reset state due to the high level produced on conductor 183 when the card feed sequence for data cards is initiated. Therefore, when the start memory cycle pulse associated with the first card to undergo selection processing is applied to the input of the interrogaton flipn flop 151, the interrogation flip flop 151 is placed in a set state. The low level thereby applied to conductor 187 will start the pulse generator means 152 and the memory control counter means 153 will begin the same counting cycle described above.

When the first pulse generated by the pulse generator means 152 has been counted, the output of the memory control counter means 153 connected to conductor 191 will go high. As this output of the memory control counter means 153 is connected to conductor 216 which serves as an input to the OR gate 214 as aforesaid, the output of OR gate 214 connected to conductor 212 will go high to thereby place a first high at one input of the AND gate 218. The second input of AND gate 218 is connected through conductors 170 and 160 to the $\overline{Q}$ output of the program read/flip flop 150 and hence, as both of the inputs to AND gate 218 are high, this AND gate will respond tereto in the conventional manner to apply a high level to the output thereof connected to the terminal annotated Read Interrogate. The read interrogate signal generated at the output of the AND gate 218, as shall be seen below, is employed in connection with the gating of information in the control memory and compare decision means 8 which is described in detail in connection with FIG. 5, however, here it is sufficient to note that this signal is employed in the processing of information associated with that read from the data card in the control memory and compare decision means 8. The output of the OR gate 214 is additionally supplied to one input of the AND gate 211; however, a high well be retained on the output of this gate due to the reset condition of the program mode sequence counter means 154. The high level thus applied to the terminal annotated Mode Read Program will designate that a read or interrogate mode is to be employed for the information being forwarded to the mark/care memory configurations in each of the channel mark/care memory and compare means 3 – 7.

Additionally, when a high output is on conductor 191, the output on conductor 192 of the memory control counter means 153 will be low and thereby provide a low level on conductor 256 indicative that the upper 8 bits $B_1 - B_8$, of the data read from each channel of the card being processed and the corresponding eight bits of program data stored in the mark and care memories present within each of the channel mark/care memory and compare means 3 – 7 is to be compared. It will also be noted that, as the program number counter means 155 was reset at the start of the feeding of the document cards to be selectively processed by the start up procedure described in association with the start terminal, an appropriate address for the first program is present on conductors 255 – 253 and is applied to each of the memory configurations within the mark/care memories and compare means 3 – 7 and the control memory and compare decision means 8. Thus, it will be appreciated by those of ordinary skill in the art that when the first pulse generated by the pulse counter means 152 is counted by the memory control counter means 153 in response to a data card being scanned, the first eight bits for each channel from the data card read and the first 8 bits of the stored information in the mark and care memory configurations for the first program stored are compared and a read interrogate processing signal is applied to the control memory and compare decision means 8 which also is addressed for a first program.

When the second pulse generated by the pulse generator means 152 is counted by the memory control counter means 153, the output thereof on conductor 191 goes low while the output on conductor 192 goes high to provide a gate the lower eight bits i.e., bits $B_9 - B_{16}$, command on the conductor 256. As the state of the program number counter means 155 has not been incremented, the address defined by conductors 253 – 255 remains set for the first program stored. Similarly, as the output conductor 192 of the memory control counter means 153 is connected through conductor 215 to a second input of OR gate 214, the high output of OR gate 214 will be retained even though the high input required therefor has switched from conductor 191 to conductor 192. Thus, the high output of OR gate 214 continues to hold the AND gate 218 in a high output condition whereupon the read interrogate signal provided at the output terminal thereof for application to the control memory and compare decision means 8 is continued. Furthermore, as will be appreciated by those of ordinary skill in the art, the remaining output conditions associated with the control output arrangement indicated by the dashed block 158 stay the same as that specified above for a high level on conductor 191 of the memory control counter means 153. Thus, the output of AND gate 211 defines a read or interrogate mode for the mark and no mark and care and don't care memory configurations present within the channel mark/care memories and compare means 3 – 7 while the remaining outputs associated with the control output arrangement indicated by the dashed block 158 are disabled. Accordingly, during the second portion of the three part cycle of the memory control counter means 153, the lower eight bits read from each column of the data card scanned are gated from the multiplex means associated with each of the channel format conversion networks 50A – 50E and compared within the associated channel mark/care memories and compare means 3 – 7 with the mark and care data stored in the lower 8 bit positions of the first program stored therein. Thus, at this juncture, the data read from each channel for the record card being scanned has been applied in two eight bit sequences and compared for selection purposes with the data stored for the first program which has been loaded in each of the memory configurations of the mark/care memory and compare means 3 – 7 and the control memory and compare decision means 8.

When the third pulse associated with the data card being read has been produced by the pulse generator 152 and counted by the memory control counter means 153 both outputs on conductors 191 and 192 thereof will go low. This will cause the output of OR gate 214 to go low and hence disable the AND gate 218 to thereby remove the read interrogate level supplied to the control memory and compare decision means 8. In addition, it will be recalled that the read program gate 226 was placed in a primed condition by the high output established on the input conductor 169 thereto by the placement of the program/read flip flop 150 in a read condition. Therefore, when a high level was present on conductor 192, this high level was also supplied to the read program gate formed by AND gate 226 on conductor 227 causing the output thereof on conductor 225 to go high and this high output was coupled through conductor 225 to the input of OR gate 223 causing its output connected to conductor 224 and to the input of the program number counter 155 to go high. Thus, when the third pulse is counted by the memory control counter means 153, the input on conductor 227 to the AND gate 226 goes low and the output of that gate and OR gate 223 will also go low to apply a negative going transition to the input to the program number counter means 155. This negative going transition will act to increment the count manifested by the program number counter means 155 and accordingly, as will be appreciated by those of ordinary skill in the art, the count condition of the program number counter means present on condctors 234 – 237 and applied to conductors 253 – 255 to define a memory address will be incremented for the next program. Additionally, in the read mode, it will be appreciated that the comparator means 157 will be enabled by the high level established at the Q output of the program/read flip flop 150 through conductors 160, 170, and 250.

The comparator means 157 additionally receives a count representative of the number of programs stored during a program mode operation from outputs $Q_1 - Q_4$ of the four bit latch means 156 through conductors 246 – 249 and such count input is connected to the inputs of the comparator means $B_0 - B_3$. If the input of the program number counter 155 corresponds to the output of the four bit latch means 156, the comparator means 157 will produce a high output on conductor 251 in the manner described above. Such an input will be applied to the terminal marked Output Decision to be employed in conjunction with the control memory and compare decision means 8, as further described in conjunction with FIG. 5, and in addition thereto will be applied through conductor 252 and 184 to the input of OR gate 181 to reset the interrogation flip flop 151 and prevent further counting cycles in the memory control counter means 153 as an indication that all the program routines initially loaded have been run has been established by the output of the comparator means 157. In addition, the high output on conductor 252 is further applied through conductor 232 and the delay 231 to the input of OR gate 239 connected to conductor 230. After the 1.5ms delay provided by the delay means 231, the output of OR gate 229 will go high to thereby reset the program number counter means 155 and hence, once the program counter means 155 is reset, the high level output on conductor 251 will terminate as the inputs compared no longer correspond.

If however, the initial incrementing of the program number counter means 155 does not correspond to the number of programs indicated by the output of the four bit latch means 156, no high output will be provided at the output of the comparator means 157. Umder these conditions, the interrogation flip flop 151, which has not been reset, will be retained in a set state whereupon the pulse generator 152 will continue to apply pulses to the memory control counter means 153. For each three pulse sequence generated by the pulse generator means 152, the memory control counter means 153 will run though a complete cycle of operation in the manner described above, and upon the completion of a memory counter cycle, the state of the count in the program number counter means 155 will be incremented through the operation of the read program gate 226. Each time the program number counter 155 is incremented, the address for the next program selection sequence provided on conductors 253 - 255 to the various memory configurations within the channel mark/care memory and compare means 3 - 7 and the control memory and compare decision means 8 will be incremented by one address position so that, as will be appreciated by those of ordinary skill in the art, for each counting cycle of the memory control counter means 153 established, data read from a data card undergoing a selection sequence, will be compared on a per program basis to the data stored in each of the memory configurations in a manner more fully described in conjunction with FIGS. 4 and 5.

Thus it will be appreciated by those of ordinary skill in the art, that when the write/read memory address and selection control apparatus depicted in FIG. 3 is placed in a read mode operation, date read from a data card scanned for selection purposes is first loaded into the channel format conversion networks 50A - 50E associated therewith and compared during two 8 bit passes, as controlled by the memory control counter means 153, with up to eight 16 bit programs stored in the channel mark/care memory and compare means 3 - 7 associated with each channel and up to eight four bit programs stored in the control memory and compare decision means 8 in a manner more fully described in conjunction with FIG. 5. Furthermore, as will also be appreciated by those ordinary skill in the art, the addressing of such program within the various memory configurations employed is controlled by the program number counter means 155 and the programs stored therein are addressed in the same sequence in which storage occurred. The various functions for the outputs generated by the write/read memory address and selection control apparatus depicted in FIG. 3 during the program and read modes of operation established will be more clearly understood in conjunction with the description of the mark/care memory and compare illustrated in FIG. 4 and the control memory and decision means illustrated in FIG. 5.

CHANNEL MARK/CARE MEMORIES AND COMPARISON NETWORKS

Turning now to FIG. 4, there is shown an exemplary mark/care memory and comparison network suitable for use as one of the channel mark/care memory and compare means 3 - 7 illustrated in the exemplary embodiment of the scanning and selection apparatus shown in FIG. 1. As the exemplary scanning and selection apparatus depicted in FIG. 1 assumes a five channel scanning configuration, it will be appreciated by those of ordinary skill in the art, that the exemplary channel mark/care memory and compare network corresponds to only one of the channel mark/care memories and compare means 3 - 7 and should be the exemplary network illustrated in FIG. 4 be desired to be employed in a five channel scanning and selection arrangement such as depicted in FIG. 1, five of such networks may be utilized. The exemplary channel mark/care memory and compare network illustrated in FIG. 4 comprises first and second mark/no mark memories 260 and 261, first and second care/don't care memories 263 and 264, a mark/no mark decision gating arrangement indicated by the dashed block 265, an AND/OR decision gating arrangement indicated by the dashed block 266, a care/don't care gating arrangement indicated by the dashed block 267 and a partial selection output gate 268.

The first and second mark/no mark memories 260 and 261, and the first and second care/don't care memories 263 and 264 may each take the form of conventional 64 bit read/write memories well known to those of ordinary skill in the art. For instance, a conventional SN 7489 memory chip, as available from the Texas Instrument Corporation, may be employed for each of the memories 260 - 264 or otherwise, any suitable memory configuration having the necessary available storage may be relied upon. Furthermore, as will be readily appreciated by those of ordinary skill in the art as this disclosure proceeds, although the mark/no mark memory configuration and the care/don't care memory configuration are formed by a pair of 64 bit memory chips as the same as readily available in the marketplace, single memory chips having 128 bits of storage may be readily substituted therefore. Each of the four memories 260 - 264 is organized in such manner as to provide sixteen words for storage wherein each word contains 4 bits and hence in the conventional manner may be addressed by a four bit input. Furthermore, as will be readily appreciated by those of ordinary skill in the art, each of the memories 260 - 264 may have information stored in any word location thereof which is addressed upon the application of a high level to the enable input thereof while reading the contents of any word addressed when a low level is placed on such enable input. In addition, as will also be appreciated by those of ordinary skill in the art, for the virtual storage configurations employed for the memories 260 - 264, each bit of a word read during an interrogation operation will exhibit a state which is the complement of that which was stored. Thus, for instance, if a high designating a mark or care condition is stored in given bit location of the first and second mark/no mark memories 260 and 261 or the first and second care/don't care memories 263 and 264, when such bit is read the output provided by the memory will be low. Accordingly, it will be appreciated by those of ordinary skill in the art that whenever a high level representing mark or care information is read from one of the memories 260 - 264, at one of the outputs associated therewith, a low will appear on such output conductor while conversely, whenever a low level representing no mark or don't care information is read from one of the memories 260 - 264, a high will appear on the associated output conductor as the outputs of the memories 260 - 264 are effectively complemented.

The inputs to the first mark/no mark memory 260 and the first care/don't care memory 263, indicated as $D_1 - D_4$ in FIG. 4, are each connected in parallel to appropriate output lines from the channel multiplexer means in the channel format conversion network 50A - 50E associated therewith. Thus, if it is assumed for the purposes of description that the exemplary channel mark/care memory and compare network illustrated in FIG. 4 is associated with the channel A format conversion network 50A illustrated in FIG. 2, it will be readily seen that the inputs $D_1 - D_4$ to both the first mark/no mark memory 260 and the first care/don't care memory 263 are connected through conductors 270 – 273 respectively to the respective outputs of the first multiplexer means 92 as indicated generally by the terminals marked $D_1 - _{D4}$. Similarly, each of the four inputs $D_5 - D_8$ to each of the second mark/no mark and care/don't care memories 261 and 264 are connected in parallel through conductors 274 – 277 to respective ones of the four outputs of the second multiplexer means 93, as illustrated in FIG. 2, and generally indicated in FIG. 4 by the terminals annotated $D_5 - D_8$. Thus, in a program mode of operation, whenever appropriate ones of the memories 260 – 264 are enabled by a high input provided to the enable input thereof, 8 bits in parallel representing the eight bit outputs of the pair of multiplexer means employed in the channel format conversion network associated therewith will be loaded in parallel into the eight bit location addressed wherein a commonly addressed four bit word in each memory to be loaded is employed for the 4 bit output of each multiplexer. Therefore it will be seen that in the eight bit processing of data employed in the instant invention, sixteen bit column information supplied in two passes by the first and second multiplexer means 92 and 93 will be applied in the same two pass sequence to the conductors 270 – 277 and, as will be seen below, may be loaded into adjacent word locations merely by changing a single bit of the address as a function of the lower/upper bit command.

Each of the four memories 260 – 264 is also commonly addressed at the inputs thereof annotated $A_a - A_d$ wherein the letter designation has been employed to define an address input and the subscript designation has been employed to define the association of that address bit to the memory address bits generated in FIG. 3 by the program number counter means 155 and applied to conductor 253 – 255 therein and the lower/upper bits command applied to conductor 256 which has been given a subscript notation. Therefore, as will be readily apparent upon an inspection of FIG. 4, each of the $A_d$ address inputs to the memories 260 – 264 is connected through an associated conductor $278_d - 281_d$ to the conductor 282 connected to the input terminal marked Bits Lower/Upper and it will be appreciated by those of ordinary skill in the art that the conductor 282 is thereby connected to the correspondingly annotated Output Terminal connected to conductor 256 in FIG. 3 and that each channel mark/care memory and compare network employed would be similarly connected to that output conductor of FIG. 3. In a similar manner, the address input $A_a$ of each of the memories 260 – 264 is connected through associated conductors $278_a - 281_a$ to the conductor 283 which connects to the terminal annotated Bit A, the address input annotated $A_b$ to each of the memories 260 – 264 is connected through associated conductors $278_b - 281_b$ to the conductor 284 connected to the input terminal annotated Bit B and each address input annotated A is connected through an associated conductor $278_c - 281_c$ to the conductor 285 connected to the terminal annotated Bit C, therefore, it will be appreciated that the terminals mark Bit A - Bit C are connected to correspondingly annotated memory address terminals in FIG. 3. Thus it will be seen that each of the memories 260 – 264 employed in the exemplary channel mark/care memories and compare network depicted in FIG. 4 as well as the additional mark and no mark and care and don't care memories employed in the remaining channel mark/care memories and compare means 3 – 7, as illustrated in FIG. 1, are all addressed in parallel and this parallel address mode of organization is readily available since each individual channel of information for programming or selection purposes is independently processed and forwarded to the appropriate channel mark/care memory and compare means. Although, as will be readily appreciated by those of ordinary skill in the art, any convenient address assignments may be employed to designate each of the 16 bit word locations in each of the memories 260 – 264, it is preferred that such address assignments be selected in a manner such that a change in the condition of the address bit represented on conductor 282 will select an adjacent address to that previously selected so that the loading of 16 bit information for each program inserted will take place in adjacent four bit word locations in each of the two memories employed for such sixteen bits.

The enable input to the first and second mark/no mark memories 260 and 261 is connected through conductors 283 and 284 to the output of AND gate 285 which, as indicated in FIG. 4, acts as the write mark input gating arrangement. The first and second mark/no mark memories 260 and 261, as will be recalled, are placed in a read mode of operation, wherein any four bit word addressed is present at the outputs thereof annotated $S_1 - S_4$ and $S_5 - S_8$, when a low level resides at the enable input thereto connected to conductor 283 and will be placed in a condition to store a four bit word provided to the inputs thereof designated $D_1 - D_4$ and $D_5 - D_3$, in a word location designated by the address inputs at $A_a - A_d$, when a high level is presented to the enable input. The and gate 285, which forms the write mark gating arrangement, as aforesaid, may take the conventional form of an AND gate whose inputs are inverted and hence acts in the well known manner to provide a high level or write signal at the output thereof connected to conductor 284 whenever both of the inputs thereto are low. The inputs to the AND gates 285 are connected, as plainly indicated in FIg. 4, to the terminals annotated Mode Read/Program and Program Care/Mark and it will be appreciated that these are the same inputs described in conjunction with FIG. 3 in association with the control output arrangement indicated by the dashed block 158.

If the description of FIG. 3 is recalled, it will be appreciated that the terminal marked Mode Read/Program is connected to the output of the AND gate 211 and hence will go low, as determined by the operation of the memory control counter means 153 and the program mode sequence counter means 154, whenever either a care or mark program card has been scanned and a load the lower or upper 8 bit command has been issued.

At all other times, the output of the AND gate 211 connected to the terminal marked Mode Read/Program will be high to thereby designate a read mode. This is consistent with the desired operation of the memories 260 – 264 depicted in FIG. 4 because it is desired to only store data within the memories 260 – 264 in a program mode of operation and the storing of data should be gated to correspond in time with either a loading of the lower or upper 8 bits of a program sequence of selection information. Therefore, it will be seen that a low will be present at the terminal marked Mode Read/Program whenever a program mode of operation is in process, one of the care or mark program cards is being read and an instruction suitable for loading the upper or lower eight bits of information in that program has been issued. Furthermore, a recollection of the operation of FIG. 3 will reveal that the terminal marked Program Care/Mark has a high output thereon whenever the care card is being read while a low level resides thereon during other portions of the cycle of the program mode sequence counter means 154. Thus, the input conditions associated with the two inputs of AND gate 285 are such that a low will be applied to each of the inputs thereto when a program mode of operation is in progress, a load on eight bit sequence command has been issued, and the mark program cared has been read. The two lows present on the two inputs of the AND gate 285 whose inputs are inverted, will cause the output thereof to go high on conductor 284 to thereby apply an enable level on conductor 283 and hence allow mark information from the mark program card read and applied on conductors 270–277 to be stored in a pair of word locations within each of the first and second mark/no mark memories 260 and 261 defined by bits A – C of the address and the lower/upper address bit associated with conductor 282.

The enable input for the first and second care/don't care memories 263 and 264 are connected through conductors 286 and 287 to the output of AND gate 298 which forms the write care gate. The AND gate 238 may take any conventional format and acts in the well known manner to produce a high or write enable level at the output thereof whenever both of the inputs thereto are high while producing a low or interrogate level on the output thereof for any other set of input conditions. The first input to the AND gate 288 is connected through conductors 289 and 291 and a conventional inverter 290 to the input terminal annotated Mode Read Program. This input, as was described above, will only go low when a program mode is established, the mark or care program card has been read and a load the upper or lower eight bits instruction has been issued. As the conventional inverter 290 acts in the well known manner to produce a high level at the output thereof whenever the input thereto on conductor 291 goes low, it will be seen that a first enabling condition for the AND gate 288 is established for conditions where either the care or mark program card has been read, a program mode of operation has been established, and a load the upper or lower eight bit command has been issued.

The second input to the AND gate 288 is connected through conductor 292 to the terminal annotated Program Care/Mark. The operation of the write/read memory address and selection control apparatus depicted in FIG. 3 will render it apparent that a high level will be applied to this input terminal to thereby enable the write care AND gate 288, only during intervals when the care program card has been read as indicated by the program mode sequence counter means 154. Thus, whenever a program mode of operation has been established, the care memory card read, and a load an upper and lower eight bits command has been issued, the output of the AND gate 288 will go high to thereby apply an appropriate enabling level on conductor 286 for enabling the first and second care/don't care memories to accept the 4 bits of data read from the care/don't care program card and applied through conductors 270 – 277 to the inputs thereof annotated $D_1 - D_8$ and load such data in the appropriate word locations defined by the address information supplied on conductors 282 – 285. Accordingly, it will be seen that the enabling configuration employed to selectively enable either the first and second mark/no mark memories 260 and 261 or the first and second care/don't care memories 263 and 264 employs outputs of the write-read memory address and selection control apparatus depicted in FIG. 3 which ensure that the enabling of only one of the selected pairs of memories will be achieved at such a time when a program mode of operation has been established, either the care/don't care or mark/no mark program card has been loaded and a load the upper or lower eight bit instruction has been issued. Furthermore, a second input obtained from the write/read memory address and selection control apparatus depicted in FIG. 3 assures that the selective enabling for the first and second care and don't care memories 263 and 264 can only be issued when the care program card has been read, while the first and second mark/no mark memories 260 and 261 are selectively enabled for writing purposes at other times when the selected conditions at the input of the terminal annotated Mode Load/Program obtain. At all other times, a low level will reside on conductors 282 and 286 to place the memories 260 – 264 in a read mode of operation whereupon the commonly addressed words therein will be available at the outputs thereof in inverted form.

The outputs of the memories 260 – 264 are indicated at $S_1 - S_8$ wherein the subscript annotation has been selected to correspond to the subscript annotation associated with the inputs thereof and the data bits conveyed thereto on conductors 270 – 277. Therefore, as will be appreciated by those of ordinary skill in the art as this disclosure proceeds, such subscript notation has been employed hereinafter in all cases where a per bit processing technique is employed so that the relationships of the bits processed within a given logic configuration are readily apparent.

The outputs of the first and second mark/no mark memories 260 and 261 as present at the terminals indicated at $S_1 - S_8$ are applied through conductors $294_1 - 294_8$ to the input of the mark/no mark decision gating arrangement indicated by the dashed block 265. More particularly, the mark/no mark decision gating arrangement indicated by the dashed block 265 contains eight exclusive OR gates $296_1 - 296_8$ wherein each exclusive OR gate is associated with one bit read from each of the mark/no mark memories 260 and 261 and a commonly located bit as applied to conductors 270 – 277; it being recalld that only eight gates are necessary because the sixteen bits which are associated with each channel of information read are processed in accordance with the teachings of the instant invention in two passes wherein each pass is associated with either the lower or upper eight bits of each (16) bit channel. The exclusive OR gates $296_1 - 296_8$ present within the mark/no mark decision gating arrangement indicated by the dashed block 265 may take any of the conventional forms of this well known class of logic device which act in the usual manner to produce a low at the output thereof whenever both of the inputs thereto are the same while providing a high level output when each of the inputs thereto differ.

A first input to each of the exclusive OR gates $296_1$ – $296_8$ present within the mark/no mark decision gating arrangement indicated by the dashed block 265 is connected, as aforesaid, through associated ones of the conductors $294_1$ – $294_8$ to an associated bit output of one of the first or second mark/no mark memories 260 and 261. In addition, a second input to each of the exclusive OR gates $296_1$ – $296_8$ present within the mark/no mark decision gating arrangement indicated by the dashed block 265 is connected through an associated conductor $295_1$ – $295_8$ to one of the conductors 270 – 277 employed to convey a corresponding bit of information read from a data card being processed. It should be appreciated that the 8 bits of channel information applied to conductors 270 – 277 are employed for loading the content of the memories 260 – 264 only during a program mode of operation while during a read mode of operation in which selection processing takes place such bits of information as are conveyed for the channel of information with which the channel mark/care memory and compare apparatus depicted in FIG. 4 is associated are conveyed through conductors 270 -277 and $295_1$ – $295_8$ to the mark/no mark decision gating arrangement indicated by the dashed block 265 for selection purposes.

The function of the mark/no mark decision gating arrangement indicated by the dashed block 265 is to ascertain whether or not data read from an associated column of a data card being scanned for selection purposes and applied therto in two passes, compares to the mark/no mark information stored for each program in the first and second mark/no mark memories 260 and 261 and applied thereto for each program in two passes. During a read mode of operation, it will be recalled that each of the first and second mark/no mark memories will be enabled for a read operation and therefore inverted versions of the mark/no mark information stored therein for the program addressed is present on conductors $294_1$ – $294_8$ and applied to one input of the corresponding exclusive OR gate $296_1$ – $296_8$ within the mark/no mark decision gating arrangement indicated by the dashed block 265. Therefore, as an exclusive OR gate acts in the well known manner to produce a low level when each of the inputs thereto is the same while producing a high level only for different inputs, it will be appreciated by those of ordinary skill in the art that when data read from a card for a pass is compared with that stored for the program addressed a high will be produced at the outputs of the exclusive OR gates $296_1$ – $296_8$ for which a comparison indication for mark and no mark data has been obtained while when no comparison indication is available, a low level will be provided at the output of the appropriate exclusive OR gate. For instance, if a mark bit representing a high is read from the card in a bit position corresponding to that associated with $D_1$ and applied through conductors 270 and $295_1$ to the first input of exclusive OR gate $296_1$ while a mark has been stored in that bit position for the eight bit pass of the program addressed, a high level will be applied through conductor $295_1$ to the exclusive OR gate $296_1$ while a low level will be applied to conductor $294_1$, due to the inverting nature of the interrogated output of the memory, and applied to the second input of the exclusive OR gate $296_1$ which causes the output thereof to go high. However, if a mark bit has been read and a high applied to conductor 270 while the pass of the program stored indicates that no mark information should be present, a high level will be applied to conductor $294_1$, again due to the inverting qualities of the memory so that the output of the exclusive OR gate $296_1$ will go low indicating a no compare condition. Thus, the output of the exclusive OR gates $296_1$ – $296_8$ connected to conductors $297_1$ – $297_8$ will each produce a high or a low condition for each eight bit pass of data read from a card and compared with an addressed one of programs stored within the first and second mark/no mark memories 260 and 261 and this is repeated for each program stored.

Thus, if a full eight programs are stored in the first and second mark/no mark memories 260 – 261, a sixteen bit sequence of highs and lows will be provided at each of the outputs of the exclusive OR gates $296_1$ – $296_8$ where a high in such sequence is indicative that an appropriate comparison of mark or no mark information has been obtained while a low indicates that an appropriate comparison is not available for the bit on the data card compared against the program loaded. Furthermore, it will be appreciated by those of ordinary skill in the art, that each of the exclusive OR gates $296_1$ – $296_8$ conducts a comparison for mark and no mark information on a per bit basis for the bit locations assigned thereto. Accordingly, it will be appreciated, that the output of each of the exclusive OR gates $296_1$ – $296_8$ is indicative of whether an appropriate comparison of the mark or no mark information in a given bit location of the column associated with the channel mark/care memory and compare apparatus depicted in FIG. 4 favorably compares with the mark and no mark information stored for a corresponding bit location for the program addressed within the first and second mark/no mark memories 260 and 261. The output of each of the exclusive OR gates $296_1$ – $296_8$ within the mark/no mark decision gating arrangement indicated by the dashed block 265 is applied through conductor $297_1$ – $297_8$ to an input of the AND/OR decision gating arrangement indicated by the dashed block 266 and it will be appreciated by those of ordinary skill in the art that whenever a high level resides on one of the conductors $297_1$ – $297_8$, the compare condition for the bit tested will be indicated while a low level thereon is indicative that no valid comparison was obtained.

The AND/OR decision gating arrangement indicated by the dashed block 266 comprises a plurality of exclusive OR gates $298_1$ – $298_8$ wherein each of the plurality of exclusive OR gates therein may take the same form as described for the exclusive OR gates $296_1$ – $296_8$ and is associated with the same bit tested thereby. The function of the AND/OR decision gating arrangement indicated by the dashed block 266 is to impose the AND/OR conditions selected for a given program, as stored within the control memory and compare decision means 8 in a manner to be described below in conjunction with FIG. 5. Here, however, it is sufficient to appreciate that for each program loaded into the memory configuration within the control memory and compare decision means 8, an OR or AND condition for the mark or no/mark information is specified on a per card rather than a per channel basis and hence, when the selection operation is initiated, the same addressing sequence employed to interrogate the memory 260 – 264 is employed to read the AND or OR command associated with that program as stored within the memory configuration present within the control memory and compare decision means 8. Thus, depending on the AND or OR command issued for that program, the appropriate AND or OR data manipulation is conducted within the AND/OR decision gating arrangement indicated by the dashed block 266. For this purpose it should be noted that the logic has been designed so that when making an AND selection, it is assumed that the card is a select unless at least one bit location does not meet the selection requirements established and therefore has an inhibit output while conversely, the OR selection assumes that the card is a non-select unless at least one bit location meets the selection requirements imposed.

Whether an OR or AND condition is imposed, it is necessary that the information stored in the mark/no mark memories for the program being read match the data read from the data card undergoing selection. For this reason, the output of each of the exclusive OR gates $296_1 - 296_8$ is applied through conductors $297_1 - 297_8$ to a first input of the exclusive OR gate $298_1 - 298_8$ associated therewith within the AND/OR decision gating arrangement indicated by the dashed block 266. A second input to each of the exclusive OR gates within the AND/OR decision gating arrangement indicated by the dashed block 266 is commonly connected through conductors 299 – 301 to the terminal annotated AND-/OR. As shall be seen below in conjunction with the description of FIG. 5, whenever a selection operation is in process, the same inputs employed to commonly address the memories 260 – 264 are utilized to address the memory configuration present within the control memory and compare decision means 8 and when the same is addressed, the bit therein which designates an AND or OR operation for the program addressed is read out and applied to the terminal annotated AND-/OR in FIG. 3 in such manner that when an AND decision is required, a high level will be applied to conductor 301 and hence to the commonly connected inputs of the exclusive OR gates $298_1 - 298_8$ while if an OR decision is required, a low level is imposed on conductor 301 and commonly applied to the second inputs of each of the exclusive OR gates $298_1 - 298_8$.

For either an AND or OR selection, it is necessary that the information in the mark/no mark memories 260 and 261 match the information for commonly assigned bit locations on the card undergoing selection and hence, the inputs on conductors $297_1 - 297_8$ will provide a high input whenever a match condition obtains while a low input is present thereon whenever the condition for the bit on the card does not correspond to the condition of that bit location stored for the program addressed in the mark/no mark memories 260 and 261. Thus, when an AND condition is imposed by the application of a high level on conductors 301, 300 and 299, the output of each of the exclusive OR gates $298_1 - 298_8$ will be low whenever the other inputs supplied thereto on conductors $297_1 - 297_8$ are indicative of a match condition while the outputs of the exclusive OR gates $298_1 - 298_8$ will go high for an AND condition when the inputs supplied thereto on conductors $297_1 - 297_8$ is indicative that the mark and no mark information compared does not correspond. Conversely, when an OR selection condition is imposed, a low level will be applied to conductors 301, 300, and 299 so that when a match condition is indicated on selected ones of conductors $297_1 - 297_8$, the output of the exclusive OR gates $298_1 - 298_8$ will go high while when a no match condition is indicated, the output of the exclusive OR gates $298_1 - 298_8$ connected thereto will go low. The outputs of each of the exclusive OR gates $298_1 - 298_8$ are connected to conductors $302_1 - 302_8$ and it will be appreciated by those of ordinary skill in the art, that when a given program calls for an AND operation, a low on selected ones of the conductors $302_1 - 302_8$ will be indicative that a match has been achieved for the bit location read from the card being processed and the corresponding bit location of the program addressed while a high level is indicative that no match condition for those bits has been obtained. Conversely, for an OR selection, a high output on selected ones of the conductors $302_1 - 302_8$ is indicative of an appropriate match for the corresponding bits associated therewith while a low output is indicative that no match was obtained therefor. The outputs of each of the exclusive OR gates $298_1 - 298_8$ are applied through respective ones of the conductors $302_1 - 302_8$ to the care/don't care gating arrangement indicated by the dashed block 267.

The function of the care/don't care gating arrangement indicated by the dashed block 267 is to further qualify the per bit selection information generated in the mark/no mark decision gating arrangement 265 and the AND/OR decision gating arrangement 266 on a per bit basis in terms of the care/don't care information stored in the first and second care/don't care memories 263 and 264 for the program selection requirements then being addressed. More particularly, it will be recalled that the selection conditions which may be programmed provide for designating only those bits in a column of information to be processed which are to be considered in the mark/no mark selection process run on the basis of an AND or an OR operation. Thus, if the exemplary programming operations described above are recalled, it will be seen that if a care/don't care program card is loaded which has all of the bit locations thereon in a blank condition, a program which is tantamount to a select all data cards loaded program will have been inserted regardless of the mark/no mark information loaded on the mark/no mark program cards. Accordingly, it will be appreciated by those of ordinary skill in the art, that any bit location for which a don't care provision has been stored for a program being considered, should not affect the selection conditions previously established in processing operations calculated to achieve a select or inhibit output signal from the channel mark/care memory and compare apparatus depicted in FIG. 4. Therefore, for example, if an AND decision has been imposed at the AND/OR decision gating arrangement indicated by the dashed block 266, the designation of a care condition for the bit being processed should cause the results of previous operations on that bit to be a determinative factor in the logical processing which follows while if a don't care condition for that bit has been stored, the results of the previous processing steps should not adversely affect the derivation of a select condition from the remaining bit conditions which are cared about. Conversely, if a care condition is stored for a given bit in a program which results from an OR operation, the previous processing of that bit information should be treated as the determinative factor in obtaining a select signal while if a don't care condition has been stored therefor, selection information should not be derived solely therefrom. These functions, are achieved within the care/don't care gating arrangement indicated by the dashed block 267.

The AND/OR decision gating arrangement indicated by the dashed block 266 includes one AND gate $303_1 - 303_8$ whose output is inverted for each bit being processed in the eight bit logic configuration set forth within the channel mark/care memory and compare apparatus depicted in FIG. 4. Thus, each of the AND gates $303_1 - 303_8$ is connected at a first input thereof to one of the conductors $302_1 - 302_8$ connected to the output of the exclusive OR gates $298_1 - 298_8$ within the AND/OR decision gating arrangement indicated by the dashed block 266. In this manner, each one of the AND gates $303_1 - 303_8$ receives bit information which derives as a function of the mark/no mark comparison performed within the mark/no mark decision gating arrangement indicated by the dashed block 265 and the AND/OR decision gating arrangement within the dashed block 266 for the bit of information associated therewith. A second input to the AND gates $303_1 - 303_8$ within the care/don't care gating arrangement indicated by the dashed block 267 is connected through conductors $304_1 - 304_8$ and $305_1 - 305_8$ and conventional inverters $306_1 - 306_8$ to an associated output of the first and second care/don't care memories 263 and 264. The second input to each of the AND gates $303_1 - 303_8$ thereby receives the reinverted output of the first and second care/don't care memories 263 and 264 so that the bit information supplied thereto represents the actual information inserted on the care/don't care program card for the first or second bits being read in the program addressed. As will be appreciated by those of ordinary skill in the art, the conventional inverter $306_1 - 306_8$ connected to the outputs of the first and second care/don't care memories 263 – 264 could be disposed at the inputs thereto or alternatively directly in the conductors 270 – 277 prior to the inputs to the first and second mark/no mark memories 260 – 261 and/or the care/don't care memories 263 and 264. The output of the AND gates $303_1 - 303_8$ are connected through conductors $306_1 - 306_8$ to the respective inputs of the AND gate 268. As shall be more clearly understood below, the output conditions imposed for the output of the AND gate 268 are such that a select for a defined AND operation will be represented by a high at the output of AND gate 268 while conversely, a low output is definitive of a select for an OR operation.

The AND gate 268 may take the form of a conventional eight input AND gate which acts in the well known manner to provide a high level at the output thereof connected to conductor 308 only when all of the eight inputs thereto are high while providing a low level output when any other set of input conditions obtain. Therefore, it will be appreciated by those of ordinary skill in the art, that since a high level is representative of a select condition for an AND operation while a low level at the output on conductor 308 is representative of a select condition for an OR operation, an enabling input as provided at each of the outputs of AND gate $303_1 - 303_8$ for an AND condition is a high level while an enabling level for an OR operation at each of the outputs of AND gates $303_1 - 308_8$ is a low level. This means, that for an AND operation to be appropriately achieved, on a per bit basis, the storage of a care condition in the first and second care/don't care memories 263 and 264, must be cpable of inhibiting a high output at the associated one of AND gates $303_1 - 303_8$ whenever the results of an associated mark/no mark decision are adverse. Conversely, when a no care bit has been designated for the bit location being tested, the output of the associated AND gate $303_1 - 303_8$ must be enabled even though an adverse comparison for mark/no mark information was obtained. For an OR operation, the storage of a care designation for a given bit being tested should enable the output of an associated AND gate $303_1 - 303_8$ to go low if an appropriate mark/no mark decision was obtained; however, if an adverse mark/no mark decision results, the output of the associated AND gate $303_1 - 303_8$ may not be enabled. Conversely, if the associated bit stored in the care/don't care memories 263 and 264 is a don't care indication, no enabling of the output of the associated AND gate $303_1 - 303_8$ should result whether or not a favorable mark/no mark decision is obtained because the generation of a select output on conductor 308 should not derive from a bit location for which a don't care bit is stored. These functions are achieved by the care/don't care gating arrangement indicated by the dashed block 267 in the following manner.

Considering the AND case first, it was seen that when the high level defining an AND condition is applied through conductors 301, 300 and 299 to each of the commonly connected inputs of exclusive OR gates $298_1 - 298_8$, a low is present at the output thereof connected to conductors $302_1 - 302_8$ only if a favorable mark/no mark decision was obtained while a high is applied to the first input of AND gates $303_1 - 303_8$ if an unfavorable mark/no mark decision results. In addition, if a care condition is stored for the 8 bits of the program being processed within a given bit location within the first and second care/don't care memories 263 and 264 a high level is applied to the second input of AND gates $303_1 - 303_8$ through conductors $304_1 - 304_8$ as connected to the outputs of the inverters $306_1 - 306_8$. Conversely, if a don't care condition has been stored for a bit being considered, a low is applied to the inputs of the associated AND gates $303_1 - 308_8$ on the appropriate conductor $304_1 - 304_8$. Therefore, as the AND gates $303_1 - 303_8$, whose outputs are inverted act in the conventional manner to provide a low or disabling condition for an AND operation on their respective inputs to the AND gate 268 through conductors $307_1 - 307_8$ only when both of the inputs thereto are high, it will be appreciated that the only time that a disabling output for an AND condition is produced at one of the AND gates $303_1 - 303_8$ is when the mark/no mark decision was adverse and a care condition was stored for the bit being considered. For all other sets of input conditions, i.e., favorable mark/no mark decision and care or don't care or an unfavorable mark/no mark decision and a don't care condition, a high or enabling level for an AND operation will be presented at the output of the considered one of the AND gates $303_1 - 303_8$ so that if all of such AND gates are similarly enabled for an AND condition operation all of inputs to AND gate 268 will go high to produce a high level on conductor 308 which is the desired condition for the AND operation being considered.

Conversely, for an OR operation, it will be seen that the low level applied to conductors 299 - 301 to define this condition within the AND/OR decision gating arrangement indicated by the dashed block 266 will result in the application of a high level to an associated input of AND gates $303_1 - 303_8$ on conductors $302_1 - 302_8$, if a favorable mark/no mark decision obtains while a low level is produced at the output of a considered one of exclusive OR gates $298_1 - 298_8$ as applied to conductors $302_1 - 302_8$ if an unfavorable mark/no mark decision results. If a care condition for a bit being considered is stored in the first and second care/don't care memories 263 and 264, a high level is applied to the second input of an associated AND gate $303_1 - 303_8$ through an appropriate conductor $304_1 - 308_8$ while the storage of a don't care condition therein results in the application of a low level to that conductor of the AND gate $303_1 - 303_8$. This means that a low or enabling level for an OR operation will be produced at an appropriate or more of the AND gates $303_1 - 303_8$ only when a favorable mark/no mark decision has resulted and a care condition for that bit has been specified. Under the remaining conditions, i.e., unfavorable mark/no mark decisions and a care or don't care condition, a high level will be presented at the output of an associated AND gate $303_1 - 303_8$, it being appreciated that such a disabling condition is appropriate for an unfavorable mark/no mark decision even if a don't care indication is provided so that an enabling of AND gate 268 with a low level for an OR operation will not result from a bit location for which a don't care condition has been specified. Thus, it will be appreciated by those of ordinary skill in the art that a low or select level for an OR operation will be produced at the output of AND gate 268 whenever the output of one or more of the AND gates $303_1 - 303_8$ goes low in an operation for which an OR mode has been specified while a high or select condition for an AND operation will only be presented at the output of AND gate 268 when all of the inputs thereto from AND gates $303_1 - 303_8$ are enabled or produce a high level during an AND mode operation. The output of the AND gate 268 on conductor 308 is applied to the control memory and compare decision means 8 in a manner and for a purpose to be described in detail in conjunction with FIG. 5. Were, however it is sufficient to appreciate that as processing on an eight bit level is here employed, two outputs on conductor 308 will be supplied to the control memory and compare decision means 8 for each program loaded and all programs will be cycled through for each data card subjected to a selection process.

The exemplary channel mark/care memory and compare network illustrated in FIG. 4 has two discrete modes of operation associated with the program of the memory configurations employed therein and thereafter, in a read mode of operation the selection operations performed thereby. In the program mode of operation, the first and second mark/no mark and care/don't care memories 260 - 264 are loaded with care and mark information from the appropriate columns of the cure and mark program cards associated with the channel mark/care memory and compare network depicted. Thus, if it is assumed that the channel mark/care memory and compare network depicted in FIG. 4 is associated with the A channel or column of information for each card loaded, it will be appreciated by those of ordinary skill in the art that 16 bit channel A data will be read from each card in the program deck and loaded on a per card basis into the channel A format conversion network 50A illustrated in FIG. 3, while data from the remaining columns of each card in a program deck is loaded into its associated channel format conversion network 50B - 50E. Thus, furing a program mode when the second or control program card is read, the terminal marked Program Card/Mark in FIG. 4 will go high while the appropriate address for the first program will be present on conductors 283 - 285 as supplied to the terminals annotated Bit A - Bit C by the program number counter means 155 illustrated in FIG. 3. In addition, conductor 282 connected to the terminal marked Bits Lower/Upper, as controlled by the memory control counter means 153, as ilustrated in FIG. 3, will have a low level thereon indicating that bits $B_1 - B_8$ are to be read from the first and second multiplexer means 92 and 93 illustrated in FIG. 2 and this output, when applied as a part of the address in FIG. 4, will cause the appropriate addressing of the first eight bit portion for the first memory location designated. Under these conditions, the output of the first multiplexer means 92 will be applied to terminals $D_1 - D_4$ and through conductors 270 - 273 to the correspondingly annotated inputs of the first mark/no mark memory and the first care/don't care memory 260 and 263. Similarly, the outputs of the second multiplexer means 93 for channel A will be applied to terminals $D_5 - D_8$ and through conductors 274 - 277 to the correspondingly annotated inputs of the second mark/no mark memory and care/don't care memory 261 and 264.

When all the inputs are present, the terminal annotated Mode Read/Program will pulse low for a short interval to enable the care/don't care memories 263 and 264 to be loaded with the data on conductors 270 - 277 in the address specified by the conductors 282 - 285. Thereafter, the level at the input terminal annotated Bits Lower/Upper as connected to conductor 282 and controlled by the output of the memory control counter means 153 as shown in FIG. 3 will go high causing the output of the first and second multiplexers means 92 and 93 illustrated in FIG. 2 for the channel A format conversion network 50A to apply the lower eight bits (bits $B_9 - B_{16}$) to terminals $D_1 - D_8$. The address applied to both the first and second mark/no mark memories and the first and second care/dont't care memories 260 - 264 will also be changed so that the second eight bit storage location for the initial program read will be addressed. As none of the other inputs to the channel mark/care memory and compare means depicted in FIG. 4 has changed it will be appreciated by those of ordinary skill in the art that the second 8 bit storage location for the first program within the care/don't care memories 263 and 264 will be loaded with the lower eight bits of care/don't care information from channel A of the first care/don't care program card read. The high level on the input terminals annotated Program Care/Mark and bits Lower/Upper now terminates while the low level on the terminal marked Mode Read/Program goes high to thereby terminate the enabled write condition for the first and second care/don't care memories 263 and 264; however, the first program addressed by the levels on conductors 283 - 285 remains constant.

When the initial mark/no mark program card or third card in the program deck is read, information from channel A thereon will be inserted into the channel A format conversion network 50A illustrated in FIG. 2 while the level on conductor 282 has gone low as has the level on the terminal marked Program Care/Mark. Thus, when the terminal marked Mode Read/Program, as controlled by both the cycling of the memory control counter means 153 and the program mode sequence counter means 154, again goes low, channel A mark information associated with bits $B_1 - B_8$ and applied on conductors 270 - 277 will be loaded into the first program location associated with bits $B_1 - B_8$ within the first and second mark/no mark memories 260 and 261. Thereafter, the level on conductor 282 will no high to cause the gating of the lower eight bits ($B_9 - B_{16}$) of the channel A mark/no mark information to be applied to terminals $D_1 - D_8$ and loaded into the eight bit location within the first and second mark/no mark memories 260 and 261 associated with the lower 8 bits of the first program.

The terminals marked Bits Lower/Upper and Program Care/Mark will again go high as does the terminals marked Mode Read/Program to disable a write condition for a selected pair of the first and second mark/no mark and care/don't care memories 260 – 264. In addition, the program address defined by the terminals marked $B_a - B_c$ on conductors 283 – 285 and controlled by the program number counter means 155 will be changed to now address the second program location within each of the memories 260 – 264. Further care/don't care and mark/no mark information will be read from any additional care/don't care and mark/no mark program cards loaded in the program deck, if more than one program is present and appropriate three card sequences have been established. As each program is read, the channel A information from each care/don't care and mark/don't mark program card will be loaded in the appropriate pair of care/don't care memories 263 and 264 and mark/no mark memories 260 and 261 and as each program is read, the program address defined on conductors 283 – 285 will be incremented to define a new sixteen bit storage location within the first and second mark/no mark memories 260 and 261 and the first and second care/don't care memories 263 and 264 for each program loaded and in the instant embodiment of the present invention up to eight different programs may be loaded. Of course, should it be desired to provide additional programming capability, the memories and addressing techniques could be suitably expanded.

After a programming sequence such as described above has been completed, a deck of data cards to undergo selection processing may be loaded and the feeding of such cards initiated. When the program mode of operation is disabled, as will be recalled from a description of FIG. 3, the program mode sequence counter means 154 is disabled so that the Mode Read/Program input applied to the channel mark/care memories and compare means depicted in FIG. 4 will go high to disable the write conditions for the first and second mark/no mark and care/don't care memories 260 – 264 so that no further write operations may be performed therein unless the switch means 163 as shown in FIG. 3 is pressed. Furthermore, when a feeding of the data cards for a selection process is initiated, the program number counter means 155 will be placed in a zero condition so that the address reflected on conductors 283 – 285 will again be appropriate for the first program while the level on conductor 282 is low.

Under these conditions, the program information stored in the first and second mark/no mark and care/don't care memories 260 – 264 for the upper 8 bits of the first program stored will be applied to outputs $S_1 - S_8$ thereof in inverted format, as aforesaid. This means, as will be appreciated by those of ordinary skill in the art, that the upper eight bits (bits $B_1 - B_8$) of mark/no mark information for the first program stored in the first and second mark/no mark memories 260 and 261 will be applied to conductors $294_1 - 294_8$ in inverted format and similarly, the upper eight bits of care/don't care data for the first program stored in the first and second care/don't care memories 263 and 264 will be applied in inverted format to output conductors $305_1 - 305_8$ and in original format to output conductors $304_1 - 304_8$ due to the action of the inverters $306_1 - 306_8$. In addition, the mark/no mark information read from column A of the first data card scanned will have been loaded into the channel A format conversion network 50A and the upper eight bits thereof (bits $B_1 - B_8$) will be applied to the outputs $D_1 - D_8$ of the first and second multiplexer means 92 and 93 and applied through conductors 270 – 277 and $295_1 - 295_8$ to one input of each of the exclusive OR gates $296_1 - 296_8$ within the mark/no mark decision gating arrangement indicated by the dashed block 265. As the complement of the first 8 bits of mark/no mark information stored for the first program in the first and second mark/no mark memories 260 and 261 is applied to the second input of each of the exclusive OR gates $296_1 - 296_8$ through conductors $294_1 - 294_8$ it will be appreciated that the output of each of the respective exclusive OR gates $296_1 - 296_8$ within the mark/no mark decision gating arrangement indicated by the dashed block 295 will go high if the bit of information read from the data card and applied thereto favorably compares with the bit of mark/no mark information stored in the first and second mark/no mark memories 260 and 261, while when an unfavorable comparison is obtained for one or more bits being compared, the output of the exclusive OR gates $296_1 - 296_8$ associated therewith will go low to indicate this condition.

The mark/no mark decision in the form of a high output for a favorable comparison and a low output for an unfavorable comparison as resented at the output of the each of the exclusive OR gates $296_1 - 296_8$ is applied through conductors $297_1 - 297_8$ to an exclusive OR gate $298_1 - 298_8$ within the AND/OR decision gating arrangement indicated by the dashed block 266 which is associated with the bit within the 8 bit group sequence being tested. If it is assumed at this juncture of the description of the read mode operation being considered that an AND operation is established for the first program and inserted during a program mode operation into the memory configuration present within the control memory and compare decision means 8, a high level will have been applied thereby to the terminal annotated AND/OR and be further applied through conductors 299 – 301 to the second input of each of the exclusive OR gates $298_1 - 298_8$ present within the AND/OR decision gating arrangement indicated by the dashed block 266. Under these conditions, it will be appreciated by those of ordinary skill in the art, that the outputs of the exclusive OR gates $298_1 - 298_8$ which receive an input indicating a successful comparison of mark/no mark information will go low while the output of the exclusive OR gates $298_1 - 298_8$ which receive an indication of an unsuccessful comparison of mark/no mark information will go high.

The output of each of the exclusive OR gates $298_1 - 298_8$ present within the AND/OR decision gating arrangement indicated by the dashed block 266 are applied through conductors $302_1 - 302_8$ to a first input of an AND gates $303_1 - 303_8$ associated with a common bit undergoing a selection process. The second input of each of the AND gates $303_1 - 303_8$, as applied on input conductors $304_1 - 304_8$, is representative of the care/don't care information stored for the upper eight bits ($B_1 - B_8$) of the first program stored in the first and second care/don't to care memories 263 and 264, as aforesaid. Therefore, it will be appreciated by those of ordinary skill in the art that the outputs of each of the AND gates $303_1 - 303_8$ present within the care/don't gating arrangement indicated by the dashed block 267 will go high, the enabled condition for an AND operation, if the inputs provided thereto reflect a successful comparison of mark/no mark information and either a care or don't care condition or an unsuccessful mark/no mark indication and a don't care condition for the bit. However, if an indication of an unsuccessful comparison of mark/no mark information is obtained together with a care indication, the output of the AND gates $303_1 - 303_8$ receiving this pair of input conditions will go low to thereby reflect a disable level for the AND conditions imposed.

It all of the outputs of the AND gates $303_1 - 303_8$ as applied to conductors $307_1 - 307_8$ are enabled or go high, the AND gate 268 will provide a high level at the output thereof connected to conductor 308 which represents a select level for the AND conditions assumed as aforesaid. However, if any of the outputs of AND gates $303_1 - 303_8$ is low, a low level will be present at the output of the AND gate 268 on conductor which represents a non-select condition for the AND operation assumed. Thus it will be seen that either a select or nonselect, in the form of a high or low level, respectively, for the AND operation assumed is provided for the upper 8 bits (bits $B_1 - B_8$) for channel A of the initial data card read when processed in accordance with the first eight bits of the first program loaded during the program mode of operation. Although a AND operation has been here assumed, it will be appreciated by those of ordinary skill in the are from the descriptive materials set forth above, that if a OR operation was designated for the first program to be run, a select in the form of a low or a nonselect in the form of a high would be presented on conductor 308 for the upper 8 bits for channel A of the initial data card read when processed in accordance with the first 8 bits of the first program loaded.

The select or nonselect output of the AND gate 268 as applied to conductor 308 is forwarded to the control memory and compare decision means for accumulation purposes so that a composite select or nonselect signal which is further defined may be provided therefrom, in a manner to be described in conjunction with FIG. 5, upon the running of all program routines loaded. Upon the completion of the processing operation for the first eight bits of the first program loaded, the level on the terminal annotated Bits Lower/Upper connected to conductor 282 will go high to change the address supplied to each memory on conductors 282 – 285 so that an address for the lower 8 bits of the first program is designated. Similarly, the first and second multiplexer means 92 and 93 associated with the channel A format conversion network 50A will be gated so as to now apply the lower eight bits (bits $B_9 - B_{16}$) to input terminals $D_1 - D_8$ associated with conductors 270 – 277 in FIG. 4. The mark/no mark information read for the lower 8 bits in channel A of the data card will now be processed for the mark/no mark and care/don't care information loaded for the lower 8 bits of program 1 in precisely the same manner described above for the upper eight bits thereof, it being noted that an AND mode of operation will be retained since only one AND or OR operation may be designated per program. Upon the completion of the per bit processing described above, a select in the form of a high level or a nonselect in the form of a low level, for the AND operation assumed, will be provided at the output conductor 308 connected to the AND gate 268 and forwarded to the control memory and compare decision means 8.

Upon the completion of the selection processing for the lower eight bits of the first program it will be appreciated by those of ordinary skill in the art that the program number counter 155 as shown in FIG. 3 is incremented so as to now designate the second program address on the terminals annotated Bit A – Bit C while a second pair of processing cycles for each eight bits is again initiated since the interrogation flip flop means 151 as shown in FIG. 3 will not be reset until the number of programs stored in the four bit latch means 156 compares with the state of the count manifested by the program number counter means 155. Thus, the channel A information read from the first data card processed and loaded into the channel A format conversion network 50A, as shown in FIG. 2, is again processed in two 8 bit sequences and a pain of select signals, non-select signals, or a combination thereof are provided for the second program run. This mode of sequencing will continue until the interrogation flip flop 151 is reset when the state of the count of the program number counter means 155 corresponds to the state of the count stored in the 4 bit latch means 156. After all the program routines have been run on the 16 bits of data read from channel A of the initial data card scanned, the next data card will be scanned and similarly processed.

It will be appreciated by those of ordinary skill in the art that channel information from the remaining channels on the initial data card scanned are also being processed in the same manner described for channel A in independent channel mark/care memories and compare means associated therewith. Therefore, as simultaneous processing or each channel is taking place in each of the channel mark/care memories and compare means utilized, it will be appreciated that each processing operation for each channel will result in the application of a select or non-select level in parallel to the control and memory compare decision means 8 for each eight bits of each program loaded for each channel. However it should be noted, that as the AND or OR decisions specified for a given program is established on a per card basis, the evaluation of each high or low level in terms of select or nonselect information, for the nature of the processing operation specified will be consistent for each of the parallel inputs representing each channel supplied to the control memory and compare decision means 8. The manner in which the select and nonselect information generated for each eight bits of each program on a per channel basis is accumulated and processed to achieve a further defined select bit for the various programs loaded will be described in conjunction with the control memory and decision apparatus depicted in FIG. 5.

CONTROL MEMORY AND DECISION APPARATUS

Referring now to FIG. 5, there is shown an exemplary embodiment of control memory and decision apparatus suitable for use within the exemplary embodiment of the scanning and selection apparatus illustrated in the generalized block diagram according to FIG. 1. The exemplary control memory and decision apparatus depicted in FIG. 5 performs two primary functions with the instant invention. The first such function is to store the AND/OR, skip/print, auxillary counter 1 and auxillary counter 2 information entered on the control program card for each program inserted during a program mode of operation. The second function of the control memory and decision apparatus depicted in FIG. 5 takes place during the read mode of operation and takes the form of a combining of all select or nonselect information obtained from each channel of a data card undergoing selection processing and transforming any selection information which may be obtained into a single resultant signal for all the programs run which defines an operation for which such select signal is to be employed. More particularly, it will be recalled that select information may be obtained in two 8 bit passes from each channel of data being processed. Thus, for the exemplary five channel system here being discussed, up to two select signals may be achieved for each channel processed for each program routine run. Therefore, as up to five channels may be present, up to ten select signals per program routine may be received and since up to eight programs may be stored in the exemplary embodiment being disclosed, up to 80 select signals may require processing before a resultant select or nonselect condition is generated. Thereafter, the resultant select signals generated may be treated as a print signal, a skip signal, and/or incrementing signals for the first or second auxillary counters described in conjunction with FIG. 1. The combining of select signals within the control memory and decision apparatus depicted in FIG. 1 is achieved, as shall be seen below, by initially combining each select or nonselect signal obtained for each channel for a first 8 bit pass into a single signal in accordance with the nature of the AND/OR decision defined by the program in process and subsequently combining the select or non-select signals obtained for each channel in the second 8 bit pass to thereby obtain first and second signals whose nature is a function of the AND or OR processing employed. Thereafter, such first and second signals are combined in accordance with the AND or OR operation being conducted and employed to generate an appropriate print or skin indication for a print mode operation, and first and second auxillary counter mode operations. These signal indications are accumulated as a function of each program run and after all of the program routines stored have been completed, the resultant signals accumulated are generated to provide a single signal in each case when appropriate. Furthermore, a skip decision is always accorded priority so that once a skip decision is loaded, no print or increment signal indications associated therewith will persist for output gating purposes at the completion of all the program routines run for the card undergoing selection processing.

The control memory and decision apparatus depicted in FIG. 5 comprises a control information memory means 309, a channel AND/OR combining network indicated by the dashed block 310, a program output gating arrangement indicated by the dashed block 311, a plurality of skip flip flops 312 – 314, and a plurality of function enable flip flops 315 – 317. The control information memory means 309 may conveniently take the same form of memory configuration employed for any of the first or second mark/no mark or care/don't care memories described in conjunction with FIG. 4; however, as only 32 bits of storage are required for the five channel, eight program embodiment of the invention being discussed herein, a smaller memory configuration may be employed if desired. The 32 bits of storage utilized in the control information memory means 309 may be organized into eight 4 bit words so that up to eight 4 bit programs, as presented on the control program card as aforesaid, may be loaded therein. Furthermore, it will be assumed that the control information memory 309 acts in the same manner as the memory configurations described in conjunction with the first and second mark/no mark and care/don't care memories in that whenever a high level is applied to the enable input thereof, any 4 bit word presented at the data inputs thereto, annotated $D_1 - D_4$ in FIG. 5, will be stored in any of the eight word locations addressed at the address inputs $A_1 - A_3$. However, when no high level is applied to the enable input, the complement of any four bit word stored therein and addressed at the address inputs thereof will be applied to the outputs $s_1 - S_4$.

It will be recalled from the description of the programming operations employed within the instant invention that only the first four bits of column A of the control program card are employed for each program to designate, respectively, AND/OR information, print/skip information, auxillary counter 1 information and auxillary counter 2 information; wherein the designation of an auxillary counter precludes the availability of a print function for that program. Thus, as control program information is effectively supplied on a per card basis in only the A channel, the inputs to the control information memory 309 need only be connected, as shown in FIG. 1, to the channel A format conversion network 50A and furthermore, as plainly indicated in FIG. 5, only the first four bits thereof associated with the first multiplexer means 92 need be applied. Accordingly, as shown in FIG. 5, the data inputs $D_1 - D_4$ of the control information memory means 309 are respectively connected to outputs $D_1 - D_4$ of the first multiplexer means 92 through conductors 318 – 321 so as to derive therefrom bit information contained in the first 4 bit locations of a control program card when the first multiplexer means 92 is enabled to provide the upper 4 bits read at the outputs thereof.

The address inputs $A_1 - A_3$ to the control information memory means 309 are connected through conductors 322 – 324 to the terminals annotated Bit A – Bit C in the same manner described for the mark/no mark and care/don't care memories depicted in FIG. 3 and it will be appreciated that these terminals to the control information memory means 309 are connected to the correspondingly designated terminals illustrated in FIG. 3 and derived as a function of the state of the count in the program counter means 155. It will be appreciated by those of ordinary skill in the art that only a 3 bit address is here required as only eight, 4 bit words are addressed for the control information programmed.

The enable input to the control information memory means 309 is connected through conductor 325 to the terminal annotated Program Control Card From Memory Control and it will be appreciated by those of ordinary skill in the art that this terminal is connected to the terminal is connected to the terminal annotated To Program Control Memory connected to conductor 203 at the output of AND gate 202 in FIG. 3. Furthermore, from the description of FIG. 3 set forth, it will be appreciated that a high or enable level is only provided on conductor 203 when the write/read memory address and selection control apparatus depicted therein is in a program mode of operation, the upper eight bits, bits $B_1 - B_8$, are being gated from the multiplexer means 92 and 93 and the first or control program card has been read as determined by the program made sequence counter means 154. Thus, it will be apparent that the control information memory means 309 will only be enabled by a high level on conductor 325 during a program mode of operation and during an interval therein when the control program card has been read and the first 8 bits of information therefrom are being gated from the channel A format configuration network 50A.

The outputs from the control information memory means 309 are connected to conductors 326 - 329 for purposes to be subsequently explained. Here it is sufficient to note that whenever a low level is provided at the enable input to the control information memory means 309, the inverted bit content of the program stored in a word addressed is supplied at the respective outputs on conductors 326 - 329 and to recall that since AND and print information was represented by a blank mark on the card, a high level on outputs $S_1$ and $S_2$ will represent AND and print information while as a mark was provided on a card for the auxillary counters 1 and 2 low levels at outputs $S_3$ and $S_4$ will indicate an enable for the first and second auxillary counters.

The channel AND/OR combining network indicated by the dashed block 310 comprises a plurality of AND gates 330 - 332, an upper bits flip flop 333, a plurality of OR gates 334 and 335 and an exclusive OR gate 336. The AND gate 330 comprises a five input AND gate whose output is inverted and hence acts in the well known manner to produce a low level output only when all of the inputs thereto are high. The five inputs to the AND gate 330 are connected through conductors 337 - 341 to the selection decision output associated with each of the channel mark/care memories and compare means 3 - 7, as shown in FIG. 1, and hence if it is assumed that the exemplary channel mark/care memories and compare network such as shown in FIG. 4 is employed for each channel, each of the conductors 337 - 345 would be connected to the output of the AND gate 268 therein on conductor 308. Thus, the AND gate 330 functions in a manner to be described below, to combine each select or non select output provided by each channel mark/care memory and compare network in response to selection processing of a given 8 bits of data and to produce an output on conductor 342 representative of the results of such combination.

Although the instant invention is being described in accordance with an exemplary embodiment which employs five discrete channels of information, it will be appreciated that the exemplary embodiment of the scanning and selection apparatus disclosed herein may be readily modified for a reduced number of channels on data cards being scanned by merely omitting the discrete channel circuitry illustrated in FIG. 2 for the channels which are sought to be deleted and by only providing channel mark/care memories and compare means, such as illustrated in FIG. 4, for the channels of information actually utilized. However, as the exemplary control memory and decision apparatus depicted in FIG. 5 need not be substantially modified for the number of channels employed, it may well be desired to employ the exemplary apparatus shown therein regardless of the number of channels of information for which a given embodiment is to be fabricated. For this reason, although not specifically illustrated in FIG. 5, pull up resistors associated with a positive voltage level may be connected to the channel inputs associated with conductors 338 - 341 so that channels of information which are not in use will exhibit a positive or high level.

Such a high level in the absence of other select information imposed thereon, will act, as will be appreciated by those of ordinary skill in the art, so as not to cause a select condition to be presented at the output of the AND gate 330 while not inhibiting any select condition which may otherwise be established. Thus, when such pull-up resistors are connected to conductors 338 - 341, the control memory and decision apparatus depicted in FIG. 5 may be employed with any number of channels of information, from one to five, so long as at least one valid channel is connected to the conductor 337.

The description of FIG. 4 set forth above, will render it manifest that a select condition indicated at the output of AND gate 268 for each channel employed will manifest a high condition if a valid AND operation was present for the 8 bits tested while a low level will be present for a valid OR operation. Conversely, should a low level be present at the output of AND gate 268, as shown in FIG. 4, during an AND mode of operation, the nonselect or inhibit condition is indicated while for an OR operation, a high will indicate an inhibit or nonselect condition. Therefore, for a valid AND operation which results in a select at the output of each of the channel mark/care memories and compare means for channels A - E, a high level will reside on each of the conductors 337 - 341 and hence, a low level will be produced by the AND gate 330 and applied to output conductor 342. As the AND or OR conditions specified in a program is established for the card as a whole, and hence each channel of information thereon, it will be seen that if, for an AND operation a low is present on any one or more of the input conductors 337 - 341, the output of the AND gate 330 connected to conductor 342 will go high and indicate that an invalid ANDing operation was obtained for the selection information imposed for the eight bits per channel tested. Conversely, for an OR operation, a low level on any one of conductors 337 - 341 will indicate that at least one channel of information tested on an eight bit basis has resulted in a valid OR condition and hence, for the OR operation being discussed, the output of AND gate 330 will go high thereby indicating a valid OR operation. However, should all of the inputs on conductors 337 - 341 be high during an OR operation, it will be appreciated that no valid OR in any channel was obtained for the selection conditions imposed and hence the output of AND gate 330 will go low to indicate that an invalid OR operation has taken place for the selection conditions imposed on the eight bits of information tested. Thus, to summarize, a high level at the output of conductor 342 will indicate that either a valid OR or invalid AND operation has taken place while a low level at the output of AND gate 330 will be indicative that a valid AND operation or an invalid OR operation has taken place for the 8 bits of information tested. Therefore, it will be appreciated by those of ordinary skill in the art, that the AND gate 330 functions to combine the select and/or nonselect information produced by each channel mark/care memories and compare means 50A-50E for an 8 bit sequence tested and to produce a high or low level indicative that a valid OR or invalid AND operation or a valid AND or invalid OR operation, respectively, has taken place when the select and nonselect inputs supplied from each channel mark/care memories and compare means 50A - 50E is logically combined in the manner defined by the logical AND or OR operation imposed.

The output of the AND gate 330 is supplied through conductors 342 and 343 to the input of the upper bits flip flop 333 and through conductors 342 and 344 to one input of an OR gate 334 whose output is inverted. As will be seen immediately below, the function of the upper bits flip flop 333 is to store the combined select or nonselect conditions produced by the AND gate 330 for an AND or OR operation specified for the upper bits read during a first eight bit pass. The function of the OR gate 334, however, is to receive from the output of the AND gate 330, the select of nonselect output condition which results from a combination of the channel A - channel E inputs for the lower eight bits processed and to additionally combine the condition stored by the upper bits flip flop 333, representing the upper eight bits, to thereby provide a logical signal representing the resultant of the selection information obtained for all channels for the upper and lower eight bits tested wherein such combining produces a resultant signal on the basis of the AND or OR operation which has been programmed.

The upper bits flip flop 333 may take the conventional form of a bistable multivibrator configuration well known to those of ordinary skill in the art, which acts to store a given bit of data applied to the D input thereto only when a high level clock pulse is received thereby. The D input of the upper bits flip flop 333 is connected through conductors 343 and 342 to the output of the AND gate 330, as aforesaid, to thereby receive a combined select or non-select signal from channels A - E for each eight bits tested. The clock input to the upper bits flip flop 333 is connected through a conductor 345 to an output of the AND gate 331 which may take the conventional format and produces a high level at the output thereof whenever both of the inputs thereto are high. The first input to the flip flop 331 is connected through conductors 346 and 347 to the terminal annotated Read Interrogate. The read interrogate input is connected to the correspondingly annotated output of the AND gate 218, as depicted in FIG. 3. From the description of the write/read memory address and selection control apparatus depicted in FIG. 3, it will be recalled that the read interrogate output of the AMD gate 218 will only go high when the program/read flip flop 150 is set to a read mode operation and either a load the upper or lower eight bits signal, as controlled by the memory control counter means 153, is present on conductor 256. Thus, the input to AND gate 331 connected to conductor 346 goes high when a read mode operation has been established and either the upper or lower eight bits are being gated.

The second input to AND gate 331 is connected through conductors 348 - 350 and a conventional inverter 351 to the input terminal annotated Bits Lower/-Upper. It will be recalled from the descriptions of FIGS. 3 and 4 set forth above, that this gating signal is produced as a function of one of the outputs of the memory control counter means 153, as shown in FIG. 3, and will go low when a load the upper bits command has been issued. As the output on the terminal marked Read Interrogate is applied directly to one input of the AND gate 331 through conductors 346 and 347, it will be appreciated by those of ordinary skill in the art that this terminal of AND gate 331 is enabled whenever a read mode is established and the memory control counter means 153 in FIG. 3 has issued a load the upper or lower bits command. However, as the second input to the AND gate 331 is applied through conductors 350 and 349, the conventional inverter 351, and conductor 348 this input to the AND gate 331 will be enabled whenever a low is applied to the terminal annotated Lower/Upper bits or when the memory control counter means 153 has not issued a load the lower bits command. Therefore, it will be appreciated by those of ordinary skill in the art that the AND gate 331 will apply a clock pulse to conductor 345 to the clock input of the flip flop 333 only when a read mode has been established and a load the upper bits command has been issued and hence the D input of the upper bits flip flop 333 will only be loaded thereinto at such time as select information derived from the upper eight bit cycle is applied to conductors 337 - 341. This means, as will be apparent to those of ordinary skill in the art, that the resultant logical signal produced at the output of AND gate 330 for the first eight bit cycle of each sixteen bit processing operation necessary for the processing of select information in accordance with one program is loaded into the upper bits flip flop 333 for temporary storage therein. Thus, if an AND operation has taken place, a low will be loaded into the upper bits flip flop 333 if a valid selection sequence is present while a high will be loaded therein for an invalid AND sequence and conversely, if an OR operation has taken place a high level will be loaded into the upper bits flip flop 333 if a valid selection operation took place while a low will be loaded therein to indicate a don't select or an inhibit for an invalid OR condition.

The output of the upper bits flip flop 333, which follows the condition of an input loaded thereinto when a clock pulse is present is applied to conductor 352 to one input of the OR gate 334 whose output is inverted. When the second resultant signal representing the composite channel selection information associated with the lower eight bits of a cycle is produced at the output of AND gate 330 connected to conductor 342, a high level will be present at the terminal annotated Bits Lower/Upper and applied through conductor 350 and 349 to the inverter 351. This high level will be inverted and hence applied as a low to the second input of AND gate 331 so that, no high clocking level will be produced at the output thereof connected to the clock input of the upper bits flip flop 333. This means that the second composite signal representing a composite select signal for an AND or OR operation associated with the lower bits of a cycle will be applied through conductor 344 to the input of the AND gate 334 whose output is inverted.

Due to the action of the upper bits flip flop 333 and more particularly, the clocking logic configuration employed therefor, when the composite selection signal associated with the lower bits cycle is applied to the input of OR gate 334 connected to conductor 344, a high or low associated with the composite signal previously derived for the upper eight bits of information will be applied from the output of the upper bits flip flop 333 through conductor 352 to the second input of the OR gate 334. As the OR gate 334 is a conventional OR gate whose output is inverted, it will be appreciated by those of ordinary skill in the art that a high will be produced at the output thereof only when both of the inputs thereto are low while a low level will be produced at the output thereof and applied to conductor 353 whenever any of the inputs thereto are high. Furthermore, it will be appreciated that the NOR'd output of the OR gate 334 represents a logical combination of the channel composite signal produced at the output of the AND gate 330 for the both the upper and lower bit selection sequence for each channel of a given program run.

Returning to a consideration of the various outputs which may be produced by the AND gate 330, it will be recalled that for an AND operation, a low level is representative of a valid selection sequence for each of the channels while a high represents an invalid AND condition for the channel select information combined. Therefore, as an AND is assigned on a per card basis, two low levels applied to both inputs of the OR gate 334 will indicate that a valid select on an AND basis has been obtained for each of the channels combined in each of the two eight bit sequences. In response to a low level on each of the inputs thereto, the output of the OR gate 334 will go high and such high will represent, as aforesaid, that a valid AND operation has been performed for each channel of the data card read on a 16 bit basis for the program sequence and in process. Of course, should one or both of the inputs to OR gate 334 be high during an AND mode of operation, the output of OR gate 334 will go low to thereby indicate that an invalid AND operation has taken place and hence the don't select or inhibit condition is present on a composite.

Conversely, for an OR operation, a high level output at the output of AND gate 330 will indicate that a valid OR operation has taken place in at least one of the channels and hence the application of a high to one or both inputs of the OR gate 334 will be indicative that a valid OR operation has taken place so that a select condition in the form of a low will be provided at the output of OR gate 334. As an OR operation is assigned on a per card basis, an invalid OR or inhibit condition should be indicated at the output of the OR gate 334 only when both of the inputs thereto are low indicating that a composite inhibit signal was generated for each channel during both eight bit cycles and hence, under these conditions, the output of OR gate 334 will go high to indicate for an OR mode of operation that an invalid OR operation has taken place.

The output of the OR gate 334 is connected through conductor 354 to one input of the exclusive OR gate 336. The second input to the exclusive OR gate 336 is connected through conductor 326 to the $S_1$ output of the control information memory 309 and will receive, it will be recalled, the complement of the AND/OR information bit stored for the program being addressed whenever the control information memory means 309 is in a read condition. It may also be noted that the output $S_1$ of the control information memory means is connected through conductors 326 and 355 to an output terminal annotated AND/OR and it is this terminal which is connected to the correspondingly annotated terminal in FIG. 4 and employed to supply an appropriate logic level to the AND/OR decision gating arrangement indicated by the dashed block 266.

If the output conditions at the output of OR gate 334 are recalled, it will be appreciated that a high is produced thereby when a valid AND or select condition for an AND operation is present while a low is produced thereby when a valid OR selection operation has taken place. However, a low is produced for an AND operation not meeting the selection requirements imposed while a high is produced for an invalid OR operation.

Therefore, since an exclusive OR gate will produce a low at the output thereof when both of the inputs are the same while producing a high for different outputs, it will be appreciated that whenever a high is present on conductor 354 indicating that a select condition is present for an AND operation, and a high is read from the control information memory means 309 indicating that an AND operation has been specified for the program addressed, the output of the exclusive OR gate 336 will go low. Similarly, when a low is present at the output of the OR gate 334 indicating that a select condition is present for an OR operation and a low is read from the control information memory means 309 indicating that an OR operation has been specified for the program addressed, the output of the exclusive OR gate 336 will again go low so that, in effect, a low is produced at the output of the exclusive OR gate 336 to indicate a select condition for a given program regardless of whether or not the condition specified is an AND or an OR operation. Conversely, it will be seen that the low level is indicative of an inhibit for an AND operation while a high level is indicative of an inhibit for an OR operation and hence the output of the exclusive OR gate 336 will go high whenever an inhibit condition for the logical AND or OR operation program is obtained. The output of the exclusive OR gate 336 is connected through conductor 356 to one input of the OR gate 335 whose output is inverted.

The OR gate 335 whose output is inverted may take any conventional format and hence acts in the well known manner to produce a high only when both of the inputs thereto are low while producing a low level output for any set of input conditions in a typical NOR mode operation. As a first input to the OR gate 335 is connected through conductor 356 to the output of the exclusive OR gate 336 it will be appreciated that this OR gate is primed to produce a high level at the output thereof only when a select information output is generated as a low by the exclusive OR gate 336 while producing a low level at the output thereof whenever a high is present at the output of the exclusive OR gate 356 to thereby indicate an inhibit or nonselect condition. As shall be appreciated by those of ordinary skill in the art, the output of OR gate 335 going high will indicate a select condition for the program cycle run and now combined while a low level at the output thereof is indicative that an inhibit or nonselect condition was obtained for the program run. The second input to the OR gate 335 is connected through conductor 357 to the output of AND gate 332 whose output is inverted. The two inputs to the AND gate 332 are connected through conductors 350 and 347 to the terminals marked Bits Lower/Upper and Read Interrogate. From the discussions of the inputs to these terminals it will be appreciated that a high level will be present on both terminals only when a read mode of operation is in progress and a gate the lower bits command is present. When a high is present at each of the inputs to the AND gate 332 a low level will be produced thereby and applied through conductor 357 to the second input of OR gate 335. Thus, it will be appreciated by those of ordinary skill in the art, that a low level is applied to conductor 357 only when the logic may be assured that the second 8 bit sequence of a two pass sequence for the program being run has been read. Therefore, whenever a high is presented at the output of the OR gate 335 whose output is inverted, a select bit of information for a completed program cycle is indicated.

The output of the OR gate 335 whose output is inverted is connected through conductor 358 to an input of the program output gating arrangement indicated by the dashed block 311. The program output gating arrangement indicated by the dashed block 311 functions to transform any select information provided thereto in the form of a high from the output of the OR gate 335, whose output is inverted, into an operation signal of the nature specified in the program being addressed. For example, it will be recalled that when a given program sequence is established, any data cards selected through the mark/no mark, care/don't care and AND/OR conditions specified in the program may result in a print function, a skip function, or an incrementing function for the first and second auxillary counters. Thus, the program output gating arrangement indicated by the dashed block 311 acts in response to a select signal obtained for a given program sequence to define, as shall be seen below, whether a select signal is to be printed or skipped, or employed to increment or inhibit the first or the second auxillary counters.

The program output gating arrangement indicated by the dashed block 311, comprises first and second AND gates 360P and 360S associated respectively with the print/skip function, first and second AND gates 361C and 361S associated with the incrementing or inhibiting of the first auxillary counter and first and second AND gates 362C and 362S associated respectively with the incrementing or inhibiting of the second auxillary counter. Each of the AND gates present within the program output gating arrangement indicated by the dashed block 311 may take any conventional form of AND gate whose output is inverted and thereby acts in the well known NAND manner to provide a low or setting level for a flip flop at the output thereof only when all of the inputs thereto are high. One input to all of the AND gates present within the program output gating arrangement indicated by the dashed block 311 is connected in common through conductor 363 to the output of the OR gate 335 on conductor 358 and hence, as will be appreciated by those of ordinary skill in the art, a threshold enabling level for each of the AND gates present within the program output gating arrangement indicated by the dashed block 311 is that select information for a program is present. Thus, if no select is provided for a given program, no enabling of any of the AND gates within the program output gating arrangements indicated by the dashed block 311 will take place and, as will be seen hereinafter, should all of the program cycles run for a given card fail to provide a select output, no function of any kind will be generated at any of the outputs of the AND gates present within the program output gating arrangement indicated by the dashed block 311.

If the mode of programming the instant invention set forth above is recalled, it will be appreciated by those of ordinary skill in the art that a print or skip function may be established in the second bit location on the control card while an increment the first and second counter instruction is established in the third and fourth bit locations on the control card. Furthermore, it will be recalled that an increment a counter instruction is mutually exclusive of a print or skip function under the mode of programming elected and hence whenever a counter is incremented, the print or skip function will be rendered inoperative. The operation of the print or skip selection function is controlled by the pair of AND gates 360P and 360S. The first input to each of these AND gates is connected, as aforesaid, through conductors 363 and 358 to the output of the OR gate 335 and hence this pair of AND gates will only be enabled in response to a select condition. As a print level is produced as a high at the output of the control information memory 309 connected to conductor 327, this conductor is connected through conductor 364 to one input of the AND gate 360P which acts to control the print function. Similarly, as a skip function will be generated as a low level on conductor 327, this conductor is connected through conductors 365 and 366 and an inverter 367 to a second input of the AND gate 360S so that whenever a skip level is generated at the output of the control information memory means 309, a high level will be applied to the AND gate 360S while a low level is applied to the AND gate 360P and conversely, whenever a print function is indicated for a program being read, a high level is applied through conductors 327 and 364 to the input of AND gate 360P, while a low level is applied through conductors 327, 365 and 366 to the input of the AND gate 360S which controls the skip function.

In addition, as an incrementing of either counter is to inhibit the print or skip function associated with AND gates 360P and 360S, one input of each of the AND gates 360P and 360S is connected through conductors 368 and 369 to the output of an OR gate 370 whose output is inverted. The first and second inputs to the OR gate 370 are connected through conductors 371 and 372 and inverters 373 and 374 to the first and second auxillary counter outputs on conductors 328 and 329 of the control information memory means 309. As it will be appreciated by those of ordinary skill in the art that the OR gate 370 whose output is inverted acts in the conventional manner to produce a high any time a low is present at one of the inputs thereto, and that the inverted output of conductors 328 and 329 are applied thereto through the inverters 373 and 374, it will be appreciated that any time a low level indicating an increment the count instruction is generated at one or both of the $S_3$ and $S_4$ outputs of the control information memory means 309; the low level will result in the production of a low level at the output of the OR gate 370 to inhibit both of the AND gates 360P and 360S and conversely, whenever a high level is present on both of the conductors 328 and 329, indicating that no increment a counter instruction has been stored for the program addressed, a pair of low levels will be applied through conductors 371 and 372 to the inputs of the OR gate 370 to thereby place a high level on conductors 368 and 369 to enable both of the AND gates 360P and 360S for the print or skip function which may otherwise be established.

Thus it will be appreciated by those of ordinary skill in the art that a low level will be produced at the output of the AND gate 360P connected to conductor 375 only when a select bit for a program has been produced at the output of OR gate 335, a print operation as indicated by a high is present at the $S_2$ output of the control information memory means 309 for the program addressed and no increment the counter instruction as represented by low at the outputs $S_3$ and $S_4$ of the control information memory means 309 is present for the program addressed. Similarly, it will be seen that a low is present at the output of AND gate 360S which controls the skip function, as aforesaid, on conductor 376 only when a select condition has been generated at the output of conductor 335, a skip condition as represented by a low is present at the $S_2$ output of the control information memory means 309 for the program addressed, and no increment the counter instruction is present on either conductors 328 or 329 for a program addressed. Furthermore, it will be appreciated that any time a print function is generated at the output of the control information memory means 309, the AND gate 360S will be inhibited and conversely any time a skip condition is generated thereat the AND gate 360P is inhibited.

The output of the AND gate 360P is connected through conductor 375 to the print flip flop 315 which controls a print mode of operation. Similarly, the output of the AND gate 360S is connected through conductor 376 to the skip flip flop 312 which is also associated with the print function in that, depending upon the condition of the print and skip flip flops 312 and 315, a signal will either be gated or not gated to enable selective printing such as by an application or non-application of a signal generated to the logic and control circuit depicted in FIG. 4 of U.S. Pat. No. 3,700,324 which controls selective printing operations in the electrophotographic printing apparatus disclosed therein. Both the print flip flop 315 and the skip flip flop 312 may comprise conventional flip flop apparatus which acts in response to the application of a low to the input thereto to be placed in a set condition and thereby present a low at the output thereof. The output of the skip flip flop 312 is connected through conductor 377 to the reset input of the print flip flop 315 while the output of the print flip flop 315 is supplied through conductor 378 to the input of an AND gate 380 whose output is inverted. The function of the print and skip flip flops 315 and 312 is to accumulate print or skip information generated for each of the programs in a given selection operation for a card of data to be scanned and generate either a print or no print signal in response to the total number of print and skip signals generated for the programs run. Furthermore, as was described above, a priority arrangement is established such that if any skip function is generated, it will inhibit printing for all programs in a cycle while if no skip function is generated and print function is obtained for any of the program cycles run, a print output will be generated at the output of the AND gate 380 connected to conductor 381 and forwarded to initiate a printing cycle.

A second input to the AND gate 380 is supplied through conductor 382 from the terminal annotated Output Decision and the description of FIG. 3 set forth above will render it apparent that a high level will be present thereon only when the number of programs processed during a given read cycle compares with the total number of programs stored in the 4 bit latch means 156 illustrated in FIG. 3. Thus, the AND gate 380 whose output is inverted will only be enabled to provide a print or low level on the output thereof when the output decision pulse is generated on conductor 382 and a high or enabling level resides on the input conductor 378.

The print flip flop 315 may be set to thereby apply a high to conductor 378 any time a print signal in the form of a low is generated on conductor 375 by the output of AND gate 360P which controls the print function, provided that the print flip flop 315 is not held in a reset condition. The reset input to the print flip flop 315 is connected through conductor 377 to the output of the skip flip flop 312 and hence it will be appreciated by those of ordinary skill in the art that any time a low or setting level is established on conductor 376 by the output of the AND gate 360S, the skip flip flop 312 will be set to reset the print flip flop 315 and hold the same in a reset condition until the output state of the skip flip flop 312 is reset.

The reset input to the skip flip flop 312 is connected through conductor 383 whose input will be further described below. Here however, it is sufficient to appreciate that a reset input will be supplied to the skip flip flop 312 each time a new data card to be scanned is detected and hence, if the skip flip flop 312 is set during any time that selection processing for a given data card being scanned takes place, the setting of the skip flip flop 312 will reset the print flip flop 315 and hold the same reset so that no print output indication may be supplied thereby on conductor 378 to the input of AND gate 380 during the programs being run for that data card. Therefore, when the output decision pulse on conductor 382 enables the AND gate 380 at the completion of all the program routines run, the input to this AND gate on conductor 378 will be low to prevent a print or low output level on conductor 382 from being produced as a function of all the program selection routines run for that data card. Accordingly, it will be appreciated by those of ordinary skill in the art, that the action of the skip flip flop 312 in holding the print flip flop 315 reset, under these conditions, establishes the appropriate priority between a skip and a print condition in that regardless of the number of print signals supplied on conductor 375 to the print flip flop 315, if a skip signal is generated and loaded into the skip flip flop 312 during any selection sequence associated with a given card, the skip flip flop 312 will prevent a print indication from being provided for the card being scanned. Furthermore, it will be appreciated that the print and skip flip flops 312 and 315 act to accumulate print and skip information obtained from each of the programs run for a given data card undergoing a selection process so that at the completion of all the program routines stored, only a single print or skip indication will be provided.

The pair of AND gates formed by AND gates 361C and 361S control the incrementing and the skip functions associated with the first auxillary counter 9 as illustrated in FIG. 1. This counting function, as was explained above, is provided as an additional feature and although a counting and printing function are mutually exclusive within a given program, both functions may be achieved within the plurality of programs which may be established for each data card to be scanned and subjected to a selection process. The AND gate 361C controls, as aforesaid, the incrementing of the couner while the AND gate 361S controls any skip function with regard to that counter and it will be appreciated from the skip priority arrangement considered with regard to the print/skip function, that should a skip condition be set for any one of the several program sequences which may be established when a given data card is processed, such skip function will persist for the entire selection cycle run for a given data card and hence prevent the first auxillary counter from being incremented.

As the increment or skip functions associated with the first auxillary counter are only to be enabled in response to the production of a select signal for a given program for a data card being processed, a first input of each of the AND gates 361S and 361C is connected through conductors 363 and 358 to the output of the OR gate 335 and hence a first high or enabling condition will be applied thereto only when a select signal is generated for a given program for a data card being processed. In addition, as will be readily appreciated by those of ordinary skill in the art, functions associated with the first auxillary counter are only enabled in response to a program condition and therefor, one input to each of the AND gates 361C and 361S is connected through conductor 384, the inverter 373 and conductor 328 to the $S_3$ output of the control information memory means 309 to thereby receive an output therefrom. As it will be recalled that an auxillary counter function is established by marking the third bit location on the control program card and that the control information memory means 309 provides a complemented output, it will be seen that a low level is provided on conductor 328 whenever an auxillary 1 output is provided. This low level is inverted by the conventional inverter means 373 and applied as a high to conductor 384 to provide an enabling level to both of the AND gates 361C and 361S. Conversely, whenever an auxillary 1 counter indication is absent on a card, the output of the control information memory means 309 connected to conductor 328 will go high whereupon the low generated at the output of the inverter 373 and applied to conductor 384 will disable both of the AND gates 361C and 361S so that no enabling of the AND gates 361C and 361S will occur whenever a no mark indication has been stored within the control information memory means 309 for the third bit location on the control program card whose associated program is being addressed.

The third input to the AND gate 361C is connected through conductor 327 to the print/skip output of the control information memory means 309 while the third input to the AND gate 361S is connected through conductor 365 and inverter 367 to the conductor 327 and hence to the print/skip output of the control information memory means 309 at the output thereof designated $S_2$. Thus, in the same manner as was described for the AND gates 360P and 360S, the AND gate 361C will have a high or enable level applied thereto on conductor 327 if a print condition was stored while the AND gate 361S is inhibited by the low level present on conductor 365 under these conditions. Conversely, if a skip condition was stored by the marking of the second bit location on the control program card for the program being addressed, a high level will be applied on conductor 365 to enable the AND gate 361S while the AND gate 361C is disabled by the low level which resides, under these conditions, on the input connected thereto on conductor 327. Accordingly, it will be appreciated by those of ordinary skill in the art, that the AND gate 361C is enabled to produce a low at the output thereof connected to conductor 385 for a possible incrementing of the auxillary 1 counter associated therewith at the end of the program sequence being run if a select input was generated by the OR gate 335, an auxillary 1 counter condition was stored within the control information memory means 309 for the program cycle being run and a print condition was designated on the control card for this program; it being appreciated that even though a print function was specified on the card, no print function will be enabled by the output of the AND gate 360P for this program due to the inhibiting action of the OR gate 370 as explained above. Conversely, when a select condition is present for a given program, the auxillary 1 counter location has been specified in the program control card loaded and in addition a skip condition was specified thereon, the AND gate 361S will be enabled while the AND gate 361C remains disabled.

The output of the AND gate 361C is connected through conductor 385 to the input of the auxillary 1 counter flip flop 316 while the output of the AND gate 361S on conductor 386 is connected to the skip flip flop 313 so that when a low is established on conductor 385, the auxillary 1 flip flop 316 will be set provided it is not held in a reset condition while if a low is present on conductor 386, the skip flip flop 313 will be set. In addition, the auxillary 1 flip flop 316 and the skip flip flop 313 as well as AND gate $380_{A1}$ which is connected to the output of the auxillary 1 flip flop 316 are interconnected in precisely the same manner as was described for the print flip flop 315, the skip flip flop 312 and the AND gate 380 associated with the print signal output on conductor 381. Therefore, it will be appreciated that anytime the output of AND gate 361C goes low, the auxillary 1 flip flop 316 will be set to place a high on conductor 388, connected to the AND gate $380_{A1}$ provided the auxillary 1 flip flop 316 is not held in a reset condition by the previous setting of the skip flip flop 313.

The auxillary 1 flip flop 316 and the skip flip flop 313 will therefore accumulate any skip or increment information directed thereto for each of the program cycles being run and any time the skip flip flop 313 is set, it will reset the auxillary 1 flip flop and hold the same reset until the selection sequence for that card is terminated and the reset pulse generated by an edge detection of the next card to be scanned is applied to the reset input thereto connected to conductor 383. Thus, after all program cycles have been run and an enable level is provided to the AND gate $380_{A1}$ on conductor 382, an increment signal will be provided to the first counter on conductor 389 if the auxillary 1 flip flop 316 has been set during any of the previous program cycles run for the card and the skip flip flop 313 remains in a reset condition. However, if during any program cycle run for that card, the skip flip flop 313 is set, this set condition will cause the auxillary 1 flip flop 316 to be reset and maintained in that condition so that the auxillary counter may not be incremented for any of the program cycles run for the data card being scanned.

The pair of control gates formed by AND gates 362C and 362S control increment and skip infomation for the second auxillary counter in precisely the same manner that the AND gates 361C and 361S performed this function for the auxillary 1 counter. Thus in the same manner described for the AND gates 361C and 361S, the AND gates 362C and 362S are each connected to the output of the OR gate 335 so as to only be enabled when a select condition for a program cycle has been established and to the $S_4$ output of the control information memory through conductors 329 and 390 and the inverter 374 so as to only be enabled when the second auxillary counter has been specified by a mark within the fourth bit location of a control card for the program being addressed. One input of the AND gate 362C is also directly connected through conductor 364 to the print/skip output of the memory through conductor 327 so that the AND gate 362C is enabled in response to a print command and disabled in response to a skip command for the program being addressed. The remaining input of AND gate 362S is connected to the inverted output of the print/skip output of the control information memory means 309 through conductor 327, inverter 367 and conductors 365 and 366 so that this input to the AND gate 362S is enabled only in response to a skip condition for the program addressed while being diabled for a print condition.

The output of the AND gate 362C is connected through conductor 391 to an auxillary 2 flip flop 317 whose output is connected through conductor 394 to an AND gate $380_{A2}$ while the output of the AND gate 362S is connected through conductor 392 to an input of a skip flip flop 314 whose output on conductor 393 is connected to the rest input of the auxillary 2 flip flop 317. Thus, it will be appreciated by those of ordinary skill in the art, that the AND gate 362C and 362S control the possible incrementing or the skipping of the auxillary 2 counter on a per program basis while the skip flip flop 314 and the auxillary 2 flip flop 317 act to accumulate increment and skip signals for all of the program cycles run for a given card in such manner that an increment output will be applied through conductor 394 and the AND gate $380_{A2}$ to the output conductor 395 whenever an output decision input is applied to conductor 382 so long as the skip flip flop 314 has not been set. However, once this flip flop is set, it will retain the auxillary 2 flip flop 317 in a reset condition to establish the desired skip priority for the entire selection sequence for the card being read until a reset signal is applied to conductor 383. The resetting signal applied to conductor 383 from the terminal annotated Card Pulse may conveniently be derived from the output of the card detector means 45 or the flip flop means 53, shown in FIG. 2 as associated with the establishment of the threshold setting interval each time the leading edge of a new card to be scanned is detected, as aforesaid. This resetting signal, as indicated in FIG. 5, is employed to reset all of the skip and function enable flip flops 312 – 317 each time a new scanning operation is initiated.

Thus it will be appreciated by those of ordinary skill in the art that the program output gating arrangement indicated by the dashed block 311 acts to transform select outputs obtained from the OR gate 335 on a per program basis into the program controlled function specified for each program addressed. Thereafter, the various program functions which may be designated are accumulated within the three pairs of function and skip flip flops associated with each separately driven output until all of the programs established have been run. The output decision pulse generated on conductor 382 then acts to apply the resultant function outputs to the conductors 381, 389 and 395 to thereby indicate a print or no print condition for the card processed as well as possibly incrementing the first and/or second auxillary counters 9 and 10 illustrated in FIG. 1. Furthermore, although the output developed on conductor 381 in the form of a low for a print condition or a high for an inhibit condition is adapted to be directly applied to the logic and control circuit illustrated in FIG. 4 of U.S. Pat. No. 3,700,324, for an electrophotographic printing operation in a system such as disclosed therein, it will be appreciated by those of ordinary skill in the art, that the same output, may be used directly or logically modified so as to drive various deflector means employed in conventional sorting apparatus to thereby achieve a separation based on the selection conditions imposed rather than a selected printing operation.

In operation of the control memory and decision apparatus depicted in FIG. 5, it will be appreciated by those of ordinary skill in the art that when a program mode of operation is established, the first 4 bits in channel A of each control program card loaded will be written into an appropriate address within the control information memory means 309 due to the application of these bits to conductors 318 – 321 and the application of an enable level to conductor 325 from the program control output of the write/read memory address and selection control apparatus depicted in FIG. 3. Furthermore as the addressing of the eight, 4 bit word locations which may be employed within the control information memory means 309 is controlled by the output of the program number counter 155, as shown in FIG. 3, sequential and appropriate addressing for each program loaded will be assured.

Thereafter, when a read mode of operation is initiated, it will be appreciated by those of ordinary skill in the art that each time a select or nonselect condition for the first 8 bits of a program being run is generated at each of the channel mark/care memory and compare means 3 – 7, as shown in detail in conjunction with FIG. 4, the various select or inhibit signals generated for the particular AND or OR operations specified will be logically combined within the AND gate 330 so that a single output representative thereof is presented at the output of AND gate 330 and loaded into the flip flop 333. When the select AND/OR inhibit information generated for the second eight bit cycle of a program is applied from the channel mark/care memories and compare means 3 – 7 to the inputs of AND gate 330 connected to conductors 337 – 341, a similar logical combination for the second 8 bit cycle for all the channels is derived therefrom and applied through conductor 344 to the input of the OR gate 334. As the logical combination of the first eight bit cycle, as reflected at the output of flip flop 333, is already applied to one input of the OR gate 334, the output of the OR gate 334 will represent a combination of both eight bit cycles for all channels in accordance with the AND or OR operation being conducted for the program cycle run on the data card being loaded.

The output of the OR gate 384 is applied to a first input of an exclusive OR gate 336 which receives at its second input the AND or OR information stored within the control memory means 309 for the program presently addressed in such manner that the output of the exclusive OR gate 336 will go low to indicate that a select is present for either an AND or OR operation so long as valid select information was previously applied thereto from the output of OR gate 334. The output of the exclusive OR gate 336, however, will go high to indicate an inhibit signal when other conditions obtain. The output of the exclusive OR gate 336 in gated through OR gate 335 at a time which assures that the second eight bit cycle has been run and hence the output of the OR gate 335 will go high only in response to select information resulting from one completed program in the sequence established.

Each select bit generated for a program cycle at the output of the AND gate 335 is applied through conductor 358 to an input of the program output gating arrangement indicated by the dashed block 311. As each select bit is applied thereto, the pairs of AND gates 360P and 360S, 361C and 361S and 362C and 362S act in response to the select bit for the program being read and the program information stored in the control information memory means 309 for the program addressed to generate a print or print inhibit function or alternatively to increment or fail to increment one or both of the auxillary counters 9 and 10 illustrated to FIG. 1. These signals, once produced are applied on a selected basis to one of two enable or skip flip flops associated with the resultant function program.

This operation is continued for each program loaded in the system and functions are generated for the program control information loaded in the control information memory means 309 as each select signal is generated at the output of the OR gate 335. As each resultant bit of function information is developed within the program output gating arrangement indicated by the dashed block 311, it is supplied on a selective basis to one flip flop within the pair of flip flops associated therewith and accumulated. Each pair of flip flops associated with a given function is interconnected in such manner as to accumulate each function signal generated in a manner such that any skip signal generated for a predetermined one of the functions available will have priority and cause the enable flip flop associated with that function to be placed in a reset condition until the completion of all the program cycles run. Thus, once such a skip signal is generated for the programs imposed in a selection process for a given card is assured. At the end of all the processing associated with each program loaded, an output decision input will be applied on conductor 382 from the output of the comparison means 157 illustrated in FIG. 3 and the resultant function information loaded into each pair of flip flops will be selectively gated to the output conductors 381, 389 and 395, it being appreciated that a low level on each of such conductors will enable the function associated therewith while a high level will result in no further processing. In the read mode of operation, the sequential addressing of the control information memory means 309 at conductors 322 – 324 is controlled by the output of the program number counter means 155 so as to assure that the program information being transformed into select and function outputs is appropriate for the selection routines being initiated.

CONCLUSION

Although the present invention has been set forth in conjunction with a single, detailed exemplary embodiment thereof, it will be appreciated that the broad concepts for imposing a plurality of programmable selective conditions on a plurality of items to be selectively processed, as disclosed herein, admits of a wide ambit of variation and hence many modifications and alterations in the specific techniques set forth are available and contemplated by the instant invention. For instance, although the present invention has been disclosed in conjunction with programmable scanning and selection apparatus which provides suitable outputs for a selective electrophotographic printing system as well as a plurality of outputs to provide a count of certain conditions which may be selected, it will be appreciated by those of ordinary skill in the art that the scanning and selection techniques employed by the instant invention are available for any application wherein selection from a plurality of coded records is desired and the manner in which the selection achieved is manifested will not matter a whit. Therefore, it will be appreciated by those of ordinary skill in the art, that outputs from the instant invention may be employed in the displacement of deflectors in sorting apparatus or in the manipulation and conveyancing of coded records within any type of processing system.

Furthermore, it will be appreciated that although coded records of a type having noncoded document information additionally present thereon has been specifically described as the same are considered to represent an area of principal utility for the instant invention, coded records of any type may be selectively processed in accordance with the teachings of the present invention. For instance, coded records on the sides of cartons being processed in an automatic warehouse or the like could be logically selected and displaced in accordance with the scanning and selection techniques set forth herein. Similarly, although optical scanning techniques have been disclosed in specie for the purpose of disclosing an exemplary embodiment, it will be readily appreciated by those of ordinary skill in the art that coded records or the like may be coded according to punch code or magnetic coding techniques and the appropriate sensors for detecting the coded conditions thereon may be directly substituted for those disclosed herein without deviating from the teachings of the instant invention.

Further, although the exemplary embodiment disclosed in conjunction with this invention was set forth within the context of a five channel system to thereby accommodate data cards or the like having a full five columns of bit information, it will be appreciated that any number of columns may be accommodated by the teachings of the instant invention by merely adding or reducing the apparatus for processing discrete channel information set forth. In this regard, it will be appreciated that the per channel organization of the instant invention readily admits of modifications of this sort and the expansion or reduction in the memories provided. In addition, it will be appreciated that although columns having sixteen bits of information are processed in accordance with the exemplary embodiment set forth, the number of bits provided per column may be readily varied to suit practical applications of the various designs which may be derived therefrom, even though multiples of eight bit configurations are advantageous due to the off the shelf electronics available for the processing thereof.

In addition, although specific circuit configurations have been set forth for the scanning and selection logic described herein, it will be appreciated that many modifications may be made therein without any deviation from the inventive concepts taught by the present invention. For instance, although the utilization of OR logic configurations within the channel and/or combining network illustrated for the control and memory decision apparatus depicted in FIG. 5 has been employed to allow both AND and OR selection information derived from the AND or OR selection conditions imposed to be processed through a single logic configuration, it will be apparent to those of ordinary skill in the art that a separate AND and OR channel may be employed to derive a single select or nonselect bit through the use of additional circuitry.

Furthermore, although given conditions have been defined within the examplary circuitry in terms of a high or low logic level, it will be appreciated by those of ordinary skill in the art that complementary conditions may be provided by the use of more or less in the way of complementary logic and inversions within various portions of the circuitry disclosed may be readily provided to suit the needs of the logic configurations to be employed. Additionally, although specific logic configurations have been illustrated and described, any conventional logical arrangements which are calculated to achieve the same purpose may be substituted for the specific configurations shown while specific logic components may be varied at will to suit a choice of design. In addition, within the selection circuits more or fewer selection channels may be employed to meet the requirements of a specific design and either more or less selectivity within a given channel is readily available.

While the invention has been described in conjunction with a single exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. In an electrophotographic printing system including means for feeding a plurality of records having coded information thereon in succession, photosensitive means adapted for continuous rotation, optical means for imaging document information present on the successively fed records onto said photosensitive means, means for forming a developed electrostatic image on said photosensitive means, selectively actuated image transfer means for selectively transferring a developed electrostatic image onto a transfer member in response to activating signals and control means for activating said selectively actuated image transfer means in response to print selection information, the improvement in apparatus for selecting records which comprises:

memory means for storing coded information representing selection conditions therein and for additionally storing coded information defining a functional operation for each record having coded information thereon to be selected, said coded information defining a functional operation capable of designating at least one of a plurality of output functions for enabling at least a skip function and a selective transfer operation;

means for scanning a plurality of coded data records and producing signals indicative of the bit content of coded information thereon;

means responsive to signals indicative of the bit content of each of said plurality of coded data records and said selection conditions stored in said memory means for ascertaining whether coded information read from each of said plurality of coded data records scanned is in accordance with coded information representing selection conditions stored in said memory means and providing a selection signal indicative thereof; and means for transforming selection signals into a functional operational signal in accordance with coded information defining a functional operation stored in said memory means and for supplying any print selection information which results therefrom to said control means to selectively actuate said transfer means at a time when document information from a record which the print selection information was developed is present at said transfer station.

2. The apparatus according to claim 1 wherein the improvement further comprises:
   means for detecting specially coded data records; and
   means responsive to a detection of specially coded data cards for inhibiting a selection operation and said means for transforming to inhibit functional operations associated with a selection operation.

3. The improved printing system according to claim 1 wherein said coded information additionally stored in said memory means further defines at least a functional operation including a counting function.

4. In an electrophotographic printing system including means for feeding a plurality of coded data records having coded information thereon in succession, photosensitive means adapted for continuous rotation, optical means for imaging document information present on the successively fed coded data records onto said photosensitive means, means for forming a developed electrostatic image on said photosensitive means, selectively actuated image transfer means for selectively transferring a developed electrostatic image onto a transfer member in response to activating signals and control means for activating said selectively activated image transfer means in response to print selection information, the improvement in apparatus for selecting coded data records which comprises:

means for scanning a plurality of coded data records and producing signals indicative of the code information thereon, a first group of said plurality of coded data records adapted to contain coded information representative of selection conditions to be imposed and a second group of said plurality of coded data records to undergo selection processing and adapted to contain coded information subject to selection;

means for placing said scanning and selection apparatus in a first mode for storing selection conditions to be imposed and a second mode for initiating selection processing;

means responsive to an establishment of said scanning and selection apparatus in a first mode for storing coded information representing selection conditions read from said first group of said plurality of coded data records in memory means;

means responsive to an establishment of said scanning and selection apparatus in a second mode for reading coded information representing selection conditions from said memory means for each of said second group of said plurality of coded data records scanned; and means for ascertaining whether coded information read from each of said second group of said plurality of coded data records scanned is in accordance with coded information representing selection conditions stored in said memory means and providing a signal indicative thereof for each of said second group of said plurality of coded data records scanned, said selection indicative signal being applied to said control means to selectively actuate said transfer means whenever a print selection operation is specified to cause image transfer at a time when document information from a record from which the selection indicative signal was developed is present at said transfer station.

* * * * *